US007472825B2

(12) United States Patent
Fitch et al.

(10) Patent No.: US 7,472,825 B2
(45) Date of Patent: Jan. 6, 2009

(54) TRANSACTION TERMINAL

(75) Inventors: Timothy R. Fitch, Syracuse, NY (US); Garrison Gomez, Marietta, NY (US); William H. Havens, Marcellus, NY (US); Melvin D. McCall, Homer, NY (US); James F. O'Donnell, Camillus, NY (US); George S. Smith, Skaneateles, NY (US); David Sperduti, Auburn, NY (US)

(73) Assignee: Hand Held Products, Inc., Skaneateles Falls, NY (*) Notice: Subject to any disclaimer, the term of this patent is extended or adjusted under 35 U.S.C. 154(b) by 737 days.

(21) Appl. No.: 10/414,385

(22) Filed: Apr. 15, 2003

(65) Prior Publication Data

US 2004/0210759 A1 Oct. 21, 2004

Related U.S. Application Data

(63) Continuation-in-part of application No. 10/339,444, filed on Jan. 9, 2003, which is a continuation-in-part of application No. 10/252,227, filed on Sep. 23, 2002, which is a continuation-in-part of application No. 10/044,137, filed on Jan. 11, 2002, now abandoned.

(60) Provisional application No. 60/348,738, filed on Jan. 14, 2002, provisional application No. 60/347,708, filed on Jan. 11, 2002.

(51) Int. Cl.
*G06F 19/00* (2006.01)

(52) U.S. Cl. ................................. 235/379; 235/462.01

(58) Field of Classification Search ................. 235/379, 235/462.01, 454; 362/600
See application file for complete search history.

(56) References Cited

U.S. PATENT DOCUMENTS

| | | | |
|---|---|---|---|
| 2,357,378 | A | 9/1944 | Benford |
| 3,596,389 | A | 8/1971 | Drueck |
| 3,857,626 | A | 12/1974 | Rosenberger et al. |
| 3,954,244 | A | 5/1976 | Gopstein |

(Continued)

FOREIGN PATENT DOCUMENTS

| | | |
|---|---|---|
| AU | 645909 | 1/1994 |

(Continued)

OTHER PUBLICATIONS

From International Prelminary Examining Authority, Notification of Transmittal of International Preliminary Examination Report, Jun. 10, 2004, (4 pages).

(Continued)

*Primary Examiner*—Daniel A Hess
(74) *Attorney, Agent, or Firm*—Marjama Muldoon Blasiak & Sullivan LLP

(57) ABSTRACT

A transaction terminal including a motherboard and a display coupled to the motherboard. The transaction terminal further includes a removable data carrier reader coupled to the motherboard and an optical reader coupled to the motherboard, the optical reader having a field of view. The transaction terminal further includes a user interface coupled to the motherboard and a shroud disposed proximate to the optical reader, the shroud emitting light.

72 Claims, 44 Drawing Sheets

U.S. PATENT DOCUMENTS

| | | | | |
|---|---|---|---|---|
| 4,017,129 | A | 4/1977 | Boldt et al. | |
| 4,075,460 | A | 2/1978 | Gorgens | |
| 4,126,768 | A | 11/1978 | Grenzow | |
| 4,134,537 | A | 1/1979 | Glaser et al. | |
| 4,141,078 | A | 2/1979 | Bridges, Jr. et al. | |
| 4,273,996 | A | 6/1981 | Weimer | |
| RE30,773 | E | 10/1981 | Glaser et al. | |
| 4,313,035 | A | 1/1982 | Jordan et al. | |
| 4,317,957 | A | 3/1982 | Sendrow | |
| 4,375,032 | A | 2/1983 | Uchida et al. | |
| 4,390,968 | A | 6/1983 | Hennessy et al. | |
| 4,392,023 | A | 7/1983 | Sears | |
| 4,403,700 | A | 9/1983 | Manlove | |
| 4,417,136 | A | 11/1983 | Rushby et al. | |
| 4,432,020 | A | 2/1984 | Onose et al. | |
| 4,438,704 | A | 3/1984 | Hutcheon et al. | |
| 4,460,965 | A | 7/1984 | Trehn et al. | |
| 4,471,165 | A | 9/1984 | DeFino et al. | |
| 4,476,468 | A | 10/1984 | Goldman | |
| 4,501,958 | A | 2/1985 | Glize et al. | |
| 4,524,396 | A | 6/1985 | Schulz et al. | |
| 4,529,870 | A | 7/1985 | Chaum | |
| 4,534,562 | A | 8/1985 | Cuff et al. | |
| 4,582,985 | A | 4/1986 | Lofberg et al. | |
| 4,630,201 | A | 12/1986 | White | |
| 4,658,416 | A | 4/1987 | Tanaka | |
| 4,680,801 | A | 7/1987 | Etherington et al. | |
| 4,689,478 | A | 8/1987 | Hale et al. | |
| 4,689,742 | A | 8/1987 | Troy et al. | |
| 4,711,996 | A | 12/1987 | Drexler | |
| 4,747,050 | A | 5/1988 | Brachtl et al. | |
| 4,771,460 | A | 9/1988 | Tamada et al. | |
| 4,775,784 | A | 10/1988 | Stark | |
| 4,783,823 | A | 11/1988 | Tasaki et al. | |
| 4,803,347 | A | 2/1989 | Sugahara et al. | |
| 4,809,326 | A | 2/1989 | Shigenaga et al. | |
| 4,839,781 | A | 6/1989 | Barnes et al. | |
| 4,843,224 | A | 6/1989 | Ohta et al. | |
| 4,858,121 | A | 8/1989 | Barber et al. | |
| 4,868,376 | A | 9/1989 | Lessin et al. | |
| 4,870,503 | A | 9/1989 | Miura | |
| 4,897,865 | A | 1/1990 | Canuel | |
| 4,902,079 | A | 2/1990 | Kaplan et al. | |
| 4,910,767 | A | 3/1990 | Brugliera et al. | |
| 4,917,792 | A | 4/1990 | Murakami et al. | |
| 4,920,256 | A | 4/1990 | Marty et al. | |
| 4,920,567 | A | 4/1990 | Malek | |
| 4,928,001 | A | 5/1990 | Masada et al. | |
| 4,930,093 | A | 5/1990 | Houser et al. | |
| 4,941,090 | A | 7/1990 | McCarthy | |
| 4,943,868 | A | 7/1990 | Yoshinaga et al. | |
| 5,000,598 | A | 3/1991 | Jingu et al. | |
| 5,001,612 | A | 3/1991 | Odlum | |
| 5,012,512 | A | 4/1991 | Basso et al. | |
| 5,025,373 | A | 6/1991 | Keyser, Jr. et al. | |
| D319,434 | S | 8/1991 | Lund | |
| 5,055,660 | A | 10/1991 | Bertagna et al. | |
| 5,109,426 | A | 4/1992 | Parks | |
| 5,115,888 | A | 5/1992 | Schneider | |
| 5,151,581 | A * | 9/1992 | Krichever et al. | 235/454 |
| 5,202,826 | A | 4/1993 | McCarthy | |
| 5,202,922 | A | 4/1993 | Iijima et al. | |
| D336,464 | S | 6/1993 | Clough et al. | |
| 5,216,517 | A | 6/1993 | Kinoshita et al. | |
| 5,223,677 | A | 6/1993 | Kapp et al. | |
| D337,569 | S | 7/1993 | Kando et al. | |
| 5,227,614 | A | 7/1993 | Danielson et al. | |
| 5,229,588 | A | 7/1993 | Detwiler et al. | |
| D338,656 | S | 8/1993 | Spayde et al. | |
| 5,237,487 | A | 8/1993 | Dittmer et al. | |
| 5,249,103 | A | 9/1993 | Forsythe | |
| 5,258,604 | A | 11/1993 | Behrens et al. | |
| 5,287,268 | A | 2/1994 | McCarthy | |
| 5,288,980 | A | 2/1994 | Patel et al. | |
| 5,297,030 | A | 3/1994 | Vassigh et al. | |
| 5,297,202 | A | 3/1994 | Kapp et al. | |
| 5,298,897 | A | 3/1994 | Harrison et al. | |
| D345,966 | S | 4/1994 | Perez | |
| 5,311,325 | A | 5/1994 | Edwards et al. | |
| 5,317,136 | A | 5/1994 | Hasegawa et al. | |
| 5,324,922 | A | 6/1994 | Roberts | |
| D350,120 | S | 8/1994 | Tsuboi et al. | |
| 5,334,821 | A | 8/1994 | Campo et al. | |
| 5,341,428 | A | 8/1994 | Schatz | |
| 5,347,589 | A | 9/1994 | Meeks et al. | |
| 5,352,877 | A | 10/1994 | Morley et al. | |
| 5,353,331 | A | 10/1994 | Emery et al. | |
| 5,356,243 | A | 10/1994 | Vogel | |
| 5,357,563 | A | 10/1994 | Hamilton et al. | |
| 5,362,053 | A | 11/1994 | Miller | |
| 5,365,046 | A | 11/1994 | Haymann et al. | |
| 5,379,037 | A | 1/1995 | Harrison et al. | |
| 5,384,449 | A | 1/1995 | Peirce | |
| 5,386,104 | A | 1/1995 | Sime | |
| 5,406,619 | A | 4/1995 | Akhteruzzaman et al. | |
| 5,422,472 | A | 6/1995 | Tavislan et al. | |
| 5,444,226 | A | 8/1995 | Collins, Jr. | |
| 5,448,044 | A | 9/1995 | Price et al. | |
| D363,271 | S | 10/1995 | Peterson | |
| D363,511 | S | 10/1995 | Hui | |
| 5,455,829 | A | 10/1995 | Klingberg | |
| 5,455,861 | A | 10/1995 | Faucher et al. | |
| 5,464,971 | A | 11/1995 | Sutcliffe et al. | |
| 5,467,403 | A | 11/1995 | Fishbine et al. | |
| 5,479,530 | A | 12/1995 | Nair et al. | |
| D366,466 | S | 1/1996 | Lee et al. | |
| 5,489,773 | A | 2/1996 | Kumar | |
| 5,509,083 | A | 4/1996 | Abtahi et al. | |
| 5,521,966 | A | 5/1996 | Friedes et al. | |
| D372,730 | S | 8/1996 | Sasaki | |
| 5,559,885 | A | 9/1996 | Drexler et al. | |
| 5,561,282 | A | 10/1996 | Price et al. | |
| 5,568,357 | A | 10/1996 | Kochis et al. | |
| 5,577,118 | A | 11/1996 | Sasaki et al. | |
| 5,581,607 | A | 12/1996 | Richardson, Jr. et al. | |
| 5,586,166 | A | 12/1996 | Turban | |
| 5,625,534 | A | 4/1997 | Okaya et al. | |
| 5,638,457 | A | 6/1997 | Deaton et al. | |
| 5,640,002 | A | 6/1997 | Ruppert et al. | |
| 5,652,806 | A | 7/1997 | Friend | |
| 5,657,389 | A | 8/1997 | Houvener | |
| 5,659,431 | A | 8/1997 | Ackley | |
| 5,672,860 | A | 9/1997 | Miller et al. | |
| 5,679,943 | A | 10/1997 | Schultz et al. | |
| D385,857 | S | 11/1997 | Cohen et al. | |
| D385,903 | S | 11/1997 | Kim et al. | |
| D386,781 | S | 11/1997 | Sasaki | |
| 5,697,202 | A | 12/1997 | Totilo | |
| 5,703,349 | A | 12/1997 | Meyerson et al. | |
| D389,813 | S | 1/1998 | Itoh et al. | |
| 5,714,745 | A | 2/1998 | Ju et al. | |
| 5,717,195 | A | 2/1998 | Feng et al. | |
| 5,740,232 | A | 4/1998 | Pailles et al. | |
| 5,745,705 | A | 4/1998 | Iguchi | |
| 5,805,807 | A | 9/1998 | Hanson et al. | |
| D400,191 | S | 10/1998 | Butts et al. | |
| 5,818,023 | A | 10/1998 | Meyerson et al. | |
| 5,825,002 | A | 10/1998 | Roslak | |
| 5,845,256 | A | 12/1998 | Pescitelli et al. | |
| D404,376 | S | 1/1999 | Shane et al. | |
| D404,761 | S | 1/1999 | Tarpenning et al. | |
| 5,864,125 | A | 1/1999 | Szabo | |
| 5,878,124 | A | 3/1999 | Griesmer et al. | |
| 5,888,087 | A | 3/1999 | Hanson et al. | |

| | | | |
|---|---|---|---|
| 5,895,902 | A | 4/1999 | Ziarno |
| 5,923,735 | A | 7/1999 | Swartz et al. |
| 5,926,549 | A | 7/1999 | Pinkas |
| 5,933,812 | A | 8/1999 | Meyer et al. |
| 5,945,975 | A | 8/1999 | Lundrigan et al. |
| D413,582 | S | 9/1999 | Tompkins |
| 5,949,043 | A | 9/1999 | Hayashida |
| 5,949,378 | A | 9/1999 | Coveley |
| 5,959,281 | A | 9/1999 | Domiteaux |
| 5,969,324 | A | 10/1999 | Reber |
| 5,970,146 | A | 10/1999 | McCall et al. |
| 5,979,753 | A | 11/1999 | Roslak |
| 5,979,757 | A | 11/1999 | Tracy et al. |
| 5,979,764 | A | 11/1999 | Swyst et al. |
| 5,984,182 | A | 11/1999 | Murrah et al. |
| 6,003,008 | A | 12/1999 | Postrel et al. |
| 6,003,762 | A | 12/1999 | Hayashida |
| 6,004,003 | A | 12/1999 | Dalton et al. |
| 6,019,286 | A | 2/2000 | Li et al. |
| 6,024,288 | A | 2/2000 | Gottlich et al. |
| 6,049,813 | A | 4/2000 | Danielson et al. |
| D425,558 | S | 5/2000 | Tarpenning et al. |
| 6,062,477 | A | 5/2000 | Wike, Jr. et al. |
| 6,062,478 | A | 5/2000 | Izaguirre et al. |
| 6,064,751 | A | 5/2000 | Smithies et al. |
| 6,065,679 | A | 5/2000 | Levie et al. |
| D426,237 | S | 6/2000 | Wranne et al. |
| 6,073,034 | A | 6/2000 | Jacobsen et al. |
| 6,076,731 | A | 6/2000 | Terrell |
| 6,078,848 | A | 6/2000 | Bernstein et al. |
| 6,084,528 | A | 7/2000 | Beach et al. |
| 6,085,972 | A | 7/2000 | Wright |
| 6,097,606 | A | 8/2000 | Groves et al. |
| 6,101,483 | A | 8/2000 | Petrovich et al. |
| 6,102,290 | A | 8/2000 | Swartz et al. |
| 6,112,857 | A | 9/2000 | Morrison |
| 6,118,889 | A | 9/2000 | Izuno et al. |
| D431,590 | S | 10/2000 | Brown et al. |
| D434,399 | S | 11/2000 | Lanet et al. |
| 6,142,369 | A | 11/2000 | Jonstromer |
| 6,149,055 | A | 11/2000 | Gatto |
| 6,149,062 | A | 11/2000 | Danielson et al. |
| 6,155,489 | A | 12/2000 | Collins, Jr. et al. |
| 6,168,077 | B1 | 1/2001 | Gray et al. |
| 6,179,206 | B1 | 1/2001 | Matsumori |
| 6,193,152 | B1 | 2/2001 | Fernando et al. |
| 6,196,460 | B1 | 3/2001 | Shin |
| 6,199,753 | B1 | 3/2001 | Tracy et al. |
| 6,230,970 | B1 | 5/2001 | Walsh et al. |
| 6,234,389 | B1 | 5/2001 | Valliani et al. |
| 6,243,447 | B1 | 6/2001 | Swartz et al. |
| 6,246,577 | B1 | 6/2001 | Han et al. |
| 6,246,995 | B1 | 6/2001 | Walter et al. |
| 6,247,645 | B1 | 6/2001 | Harris et al. |
| D445,418 | S | 7/2001 | Chen et al. |
| 6,253,998 | B1 | 7/2001 | Ziarno |
| 6,257,487 | B1 | 7/2001 | Hayashida |
| 6,266,685 | B1 | 7/2001 | Danielson et al. |
| 6,268,788 | B1 | 7/2001 | Gray |
| D447,136 | S | 8/2001 | Groves et al. |
| 6,272,506 | B1 | 8/2001 | Bell |
| 6,275,644 | B1 | 8/2001 | Domas et al. |
| 6,279,825 | B1 | 8/2001 | Yokoyama et al. |
| 6,308,893 | B1 | 10/2001 | Waxelbaum et al. |
| 6,311,165 | B1 | 10/2001 | Coutts et al. |
| D451,097 | S | 11/2001 | Schmeisser et al. |
| 6,311,896 | B1 | 11/2001 | Mulla et al. |
| 6,313,917 | B1 | 11/2001 | Tang et al. |
| 6,321,981 | B1 | 11/2001 | Ray et al. |
| D451,507 | S | 12/2001 | Lin et al. |
| D451,535 | S | 12/2001 | Lee et al. |
| 6,330,973 | B1 | 12/2001 | Bridgelall et al. |
| 6,336,900 | B1 | 1/2002 | Alleckson et al. |
| 6,340,115 | B1 | 1/2002 | Swartz |
| 6,357,662 | B1 | 3/2002 | Helton et al. |
| 6,359,603 | B1 | 3/2002 | Zwern |
| D455,433 | S | 4/2002 | Alviar et al. |
| 6,373,511 | B1 | 4/2002 | Groves et al. |
| 6,394,355 | B1 | 5/2002 | Schlieffers et al. |
| 6,400,836 | B2 | 6/2002 | Senior |
| 6,415,982 | B2 | 7/2002 | Bridgelall et al. |
| 6,424,949 | B1 | 7/2002 | Deaton et al. |
| 6,431,444 | B1 | 8/2002 | Gatto |
| 6,435,412 | B2 | 8/2002 | Tsi et al. |
| 6,439,345 | B1 | 8/2002 | Recktenwald et al. |
| D462,679 | S | 9/2002 | Liu et al. |
| D464,345 | S | 10/2002 | Liu et al. |
| 6,460,069 | B1 | 10/2002 | Berline et al. |
| 6,466,657 | B1 | 10/2002 | Anvret et al. |
| 6,471,125 | B1 | 10/2002 | Addy |
| 6,474,550 | B1 | 11/2002 | Caridas |
| 6,486,862 | B1 | 11/2002 | Jacobsen et al. |
| 6,492,978 | B1 | 12/2002 | Selig et al. |
| 6,512,840 | B1 | 1/2003 | Tognazzini |
| 6,532,152 | B1 | 3/2003 | White et al. |
| 6,539,363 | B1 | 3/2003 | Allgeier et al. |
| 6,550,683 | B1 | 4/2003 | Augustine |
| 6,554,705 | B1 | 4/2003 | Cumbers |
| 6,557,754 | B2 | 5/2003 | Gray et al. |
| 6,572,012 | B1 | 6/2003 | Gannon et al. |
| 6,575,368 | B1 | 6/2003 | Tamburrini et al. |
| 6,595,422 | B1 | 7/2003 | Doljack |
| D479,716 | S | 9/2003 | Miller |
| 6,676,016 | B1 | 1/2004 | Coskrey, IV |
| 6,679,425 | B1 | 1/2004 | Sheppard et al. |
| D486,176 | S | 2/2004 | Flaherty et al. |
| D491,216 | S | 6/2004 | Ookushi et al. |
| D492,303 | S | 6/2004 | Schlieffers et al. |
| 6,757,156 | B2 | 6/2004 | Adams et al. |
| D492,718 | S | 7/2004 | Ookushi et al. |
| 6,779,196 | B1 | 8/2004 | Igbinadolor |
| D496,682 | S | 9/2004 | Ookushi et al. |
| D498,754 | S | 9/2004 | Blyth et al. |
| D542,791 | S | 9/2004 | Fitch et al. |
| D502,945 | S | 3/2005 | Huang et al. |
| D503,709 | S | 4/2005 | Lodato et al. |
| D504,890 | S | 5/2005 | Sung et al. |
| 7,106,309 | B2 | 9/2006 | Wood et al. |
| 2001/0013549 | A1 | 8/2001 | Harris et al. |
| 2001/0020640 | A1 | 9/2001 | Yokochi |
| 2002/0140714 | A1 | 10/2002 | Hoffman |
| 2003/0132292 | A1 | 7/2003 | Gomez et al. |
| 2003/0132293 | A1 | 7/2003 | Fitch et al. |
| 2003/0132294 | A1 | 7/2003 | Gomez et al. |
| 2003/0132297 | A1 | 7/2003 | McCall et al. |
| 2003/0132918 | A1 | 7/2003 | Fitch et al. |
| 2003/0135751 | A1 | 7/2003 | O'Donnell et al. |
| 2003/0178492 | A1 | 9/2003 | Tamburrini et al. |
| 2003/0210223 | A1 | 11/2003 | Park |
| 2003/0229793 | A1 | 12/2003 | McCall et al. |
| 2004/0210759 | A1 | 10/2004 | Fitch et al. |

FOREIGN PATENT DOCUMENTS

| | | | |
|---|---|---|---|
| CA | 2086670 | A1 | 11/1992 |
| CA | 2290732 | A1 | 5/2001 |
| DE | 31 00 662 | | 11/1981 |
| DE | 69223581 | | 7/1998 |
| DE | 69318883 | T2 | 3/1999 |
| DE | 69228742 | T2 | 10/1999 |
| EP | 0 185 782 | | 2/1988 |
| EP | 0535905 | | 4/1993 |
| EP | 0 565 253 | A2 | 10/1993 |
| EP | 0 565 253 | A3 | 10/1993 |
| EP | 0953949 | | 11/1999 |
| EP | 1065481 | | 1/2001 |

| | | | |
|---|---|---|---|
| EP | 0809836 | | 8/2002 |
| EP | 03715923.3 | | 1/2003 |
| GB | 2324634 | A | 10/1998 |
| JP | 05205095 | | 8/1993 |
| JP | 6501331 | T | 2/1994 |
| JP | 6223269 | A | 8/1994 |
| JP | 2000207638 | | 7/2000 |
| JP | 2000515655 | A | 11/2000 |
| JP | 2001076013 | | 3/2001 |
| SE | 470149 | B | 11/1993 |
| WO | WO 92/21110 | | 11/1992 |
| WO | WO 96/26505 | | 8/1996 |
| WO | WO-9728512 | | 8/1997 |
| WO | WO-9810368 | A1 | 3/1998 |
| WO | WO 98/19435 | | 7/1998 |
| WO | WO 98/14917 | | 9/1998 |
| WO | WO 98/10368 | | 12/1998 |
| WO | WO 98/50876 | | 12/1998 |
| WO | WO 99/49347 | | 9/1999 |
| WO | WO-9949432 | A1 | 9/1999 |
| WO | WO 99/60533 | | 11/1999 |
| WO | WO 00/04487 | | 1/2000 |
| WO | WO-0007585 | A1 | 2/2000 |
| WO | WO-0016073 | A1 | 3/2000 |
| WO | WO-0023936 | A1 | 4/2000 |
| WO | WO 00/36545 | | 6/2000 |
| WO | WO 00/70585 | | 11/2000 |
| WO | WO 01/37229 | | 5/2001 |
| WO | WO 01/38098 | A2 | 5/2001 |
| WO | WO 01/38098 | A3 | 5/2001 |
| WO | WO 01/61657 | | 8/2001 |
| WO | WO 01/84771 | | 11/2001 |
| WO | WO-03060832 | A2 | 7/2003 |

OTHER PUBLICATIONS

U.S. Appl. No. 10/044,137, filed Jan. 11, 2002, James F. O'Donnell, Office Action Dated Jan. 12, 2004 (copy attached).

U.S. Appl. No. 10/044,137, filed Jan. 11, 2002, James F. O'Donnell, Office Action Dated Jul. 16, 2003 (copy attached).

U.S. Appl. No. 10/044,119, filed Jan. 11, 2002, Timothy R. Fitch, Office Action Dated Mar. 30, 3004 (copy attached).

U.S. Appl. No. 10/252,651, filed Sep. 23, 2002, Timothy R. Fitch, Office Action Dated Jan. 13, 2004 (copy attached).

U.S. Appl. No. 10/252,651, filed Sep. 23, 2002, Timothy R. Fitch, Office Action Dated Jul. 17, 2003 (copy attached).

U.S. Appl. No. 10/252,652, filed Sep. 23, 2002, Garrison Gomez, Office Action Dated Sep. 25, 2003 (copy attached).

U.S. Appl. No. 10/252,259, filed Sep. 23, 2002, Melvin D. McCall, Office Action Dated Jun. 2, 2004 (copy attached).

Gosnell, David. Deadlines Loom for Debit Security Credit Card Management. Dec. 2002, vol. 15, Iss. 10, p. 46.

Britt, Phillip. Why Security Encryption Matters to Your Bank Community Banker, Aug. 2002; p. 18.

Copending U.S. Appl. No. 10/044,137, filed Jan. 11, 2002.

Copending U.S. Appl. No. 10/044,119, filed Jan. 11, 2002.

Copending U.S. Appl. No. 10/252,651, filed Sep. 23, 2002.

Copending U.S. Appl. No. 10/252,652, filed Sep. 23, 2002.

Copending U.S. Appl. No. 10/252,259, filed Sep. 23, 2002.

Copending U.S. Appl. No. 10/252,227, filed Sep. 23, 2002.

Copending U.S. Appl. No. 10/339,444, filed Jan. 9, 2003.

Copending U.S. Appl. No. 10/414,385, filed Apr. 15, 2003.

U.S. Appl. No. 10/414,385, filed Apr. 15, 2003, Fitch et al., File History Including Claims.

U.S. Appl. No. 10/841,957, filed May 7, 2004, O'Donnell et al., File History Including Claims.

European Patent Office, Supplementary European Search Report EP 03 71 5923, Jun. 10, 2005, 5 pages.

Hand Held Products, "Transaction Team 3100 Interactive Signature Capture Terminal Startup Guide," 3100/SG Rev. A (Jul. 2001).

Hand Held Products "Transaction Team 3100/3101 Interactive Signature Capture Terminal Startup Guide", 3100/01/SG Rev. A (Aug. 2002).

Hand Held Products Drawing No. PC000434—Rev B, entitled "Label_Waterproofing_3100" dated Dec. 12, 2001.

Hand Held Products Drawing No. PC000435—Rev E, entitled "Label, TT3100, Overlay, Protector" dated Feb. 1, 2002.

Delphion Family Report of U.S. Patent No. 7,121,470, dated Oct. 30, 2007, 12 pages.

Patent Cooperation Treaty International Search Report for PCT/US03/00756 dated Apr. 5, 2004 (5 pgs.).

Communication from European Patent Office including Extended International Search Report and Annex to the European Search Report regarding European Patent Application No. EP 07 01 8907.1, dated Apr. 28, 2008, 12 pages.

* cited by examiner

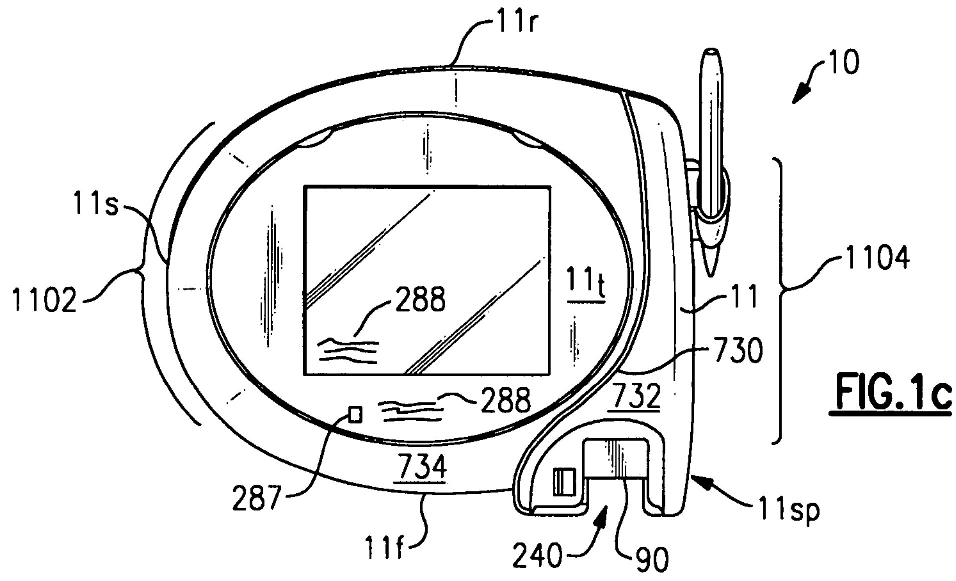
FIG.1c
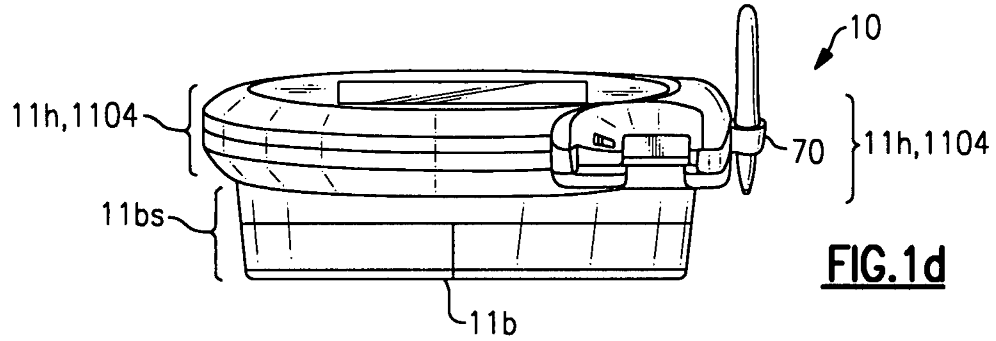
FIG.1d
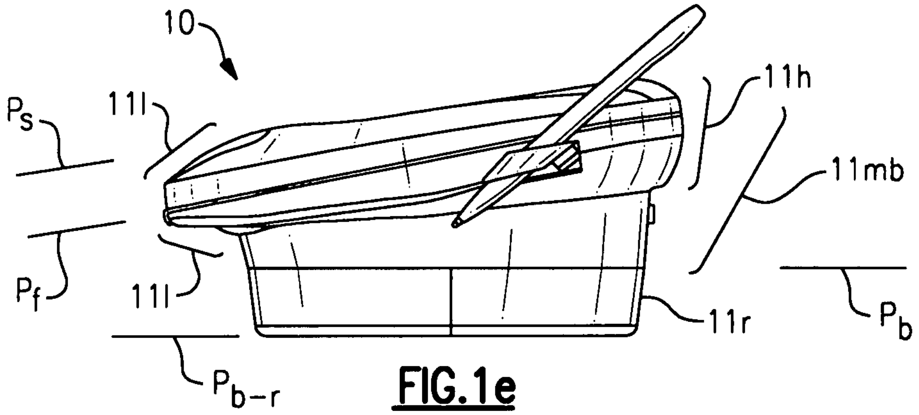
FIG.1e
FIG.1f
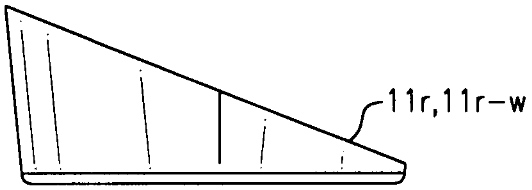

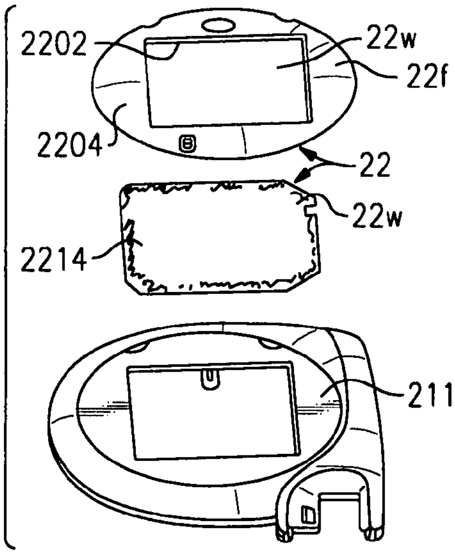
FIG.4e
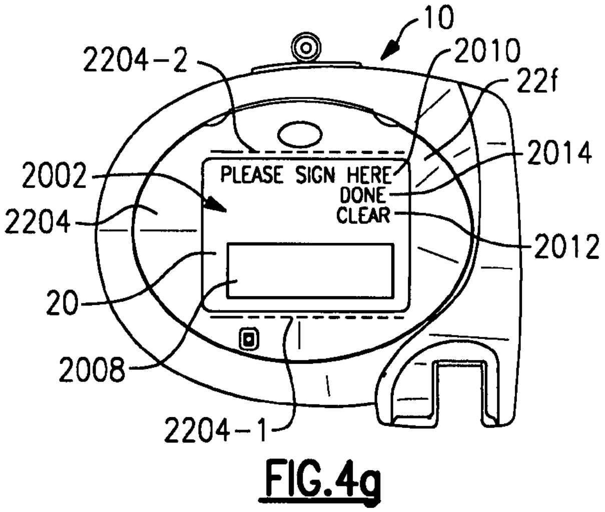
FIG.4g
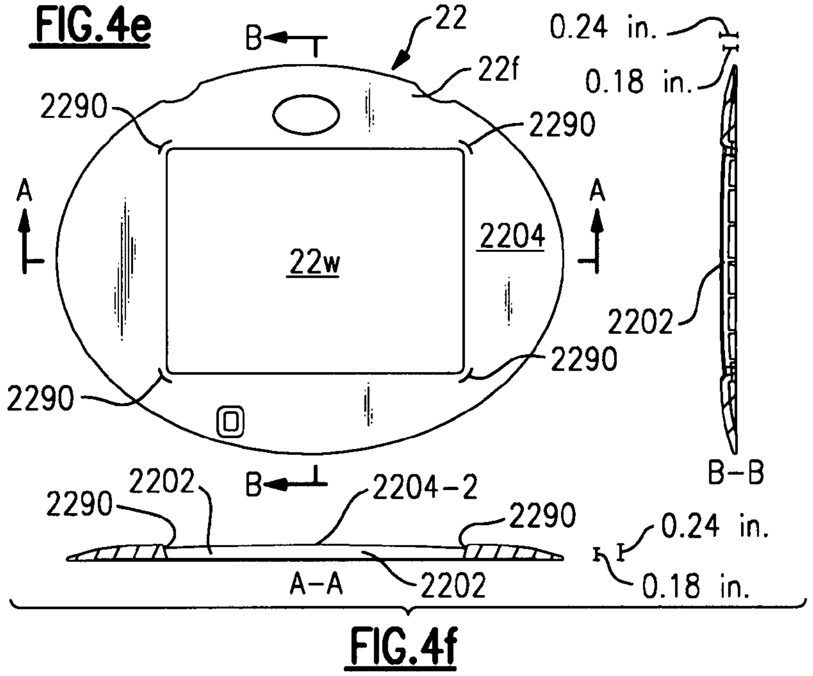
FIG.4f
FIG.4l
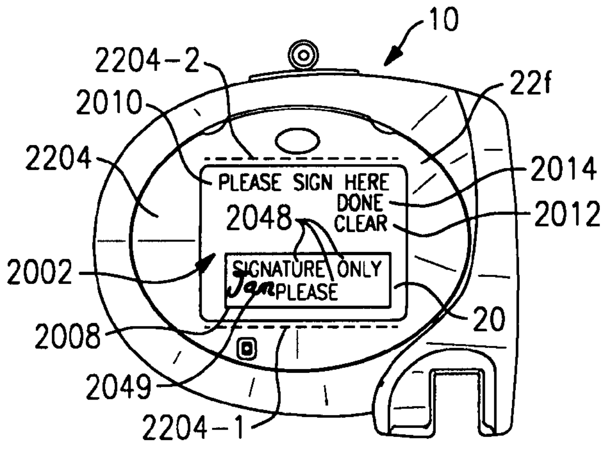

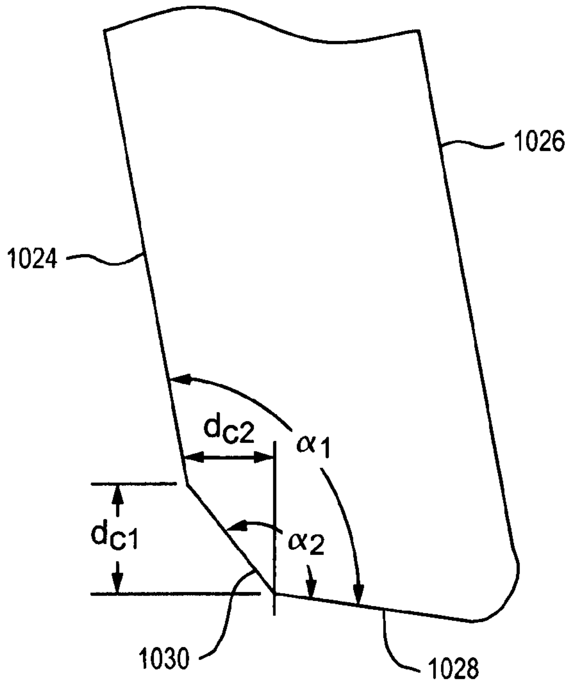
FIG. 16
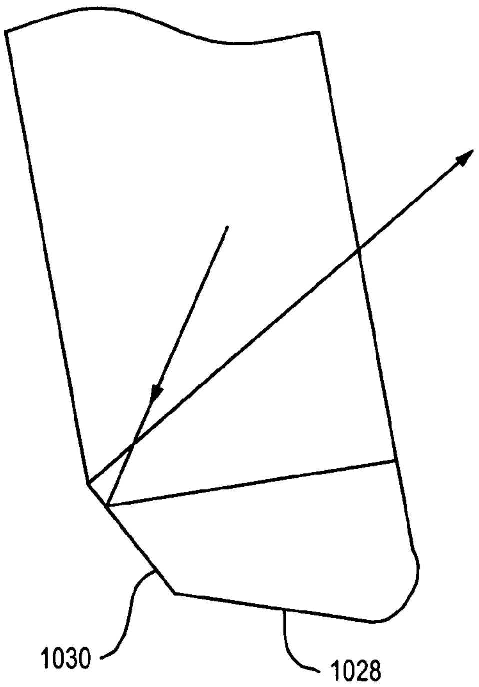
FIG. 17
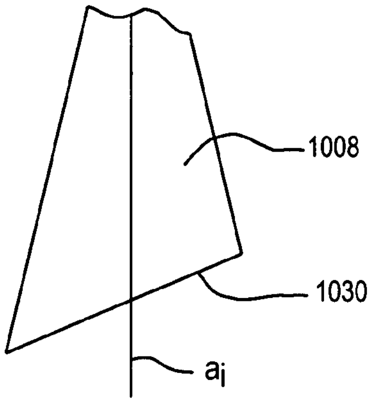
FIG. 18
FIG. 19
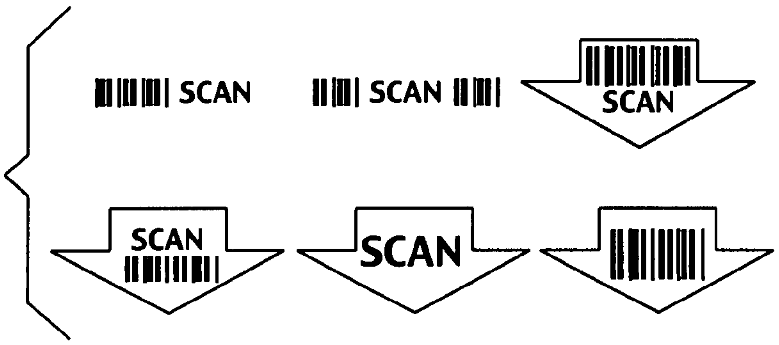

TRANSACTION TERMINAL

CROSS REFERENCE TO RELATED APPLICATIONS

This application is a continuation-in-part of U.S. patent application Ser. No. 10/339,444 entitled "Transaction Terminal Comprising Imaging Module", filed Jan. 9, 2003 which is in turn a continuation-in-part of U.S. patent application Ser. No. 10/252,227, entitled "Transaction Terminal Including Imaging Module" ), filed Sep. 23, 2002, which in turn is a continuation-in-part of U.S. patent application Ser. No. 10/044,137, entitled "Transaction Terminal Encryption Apparatus Comprising Encryption Mode Indicator", filed Jan. 11, 2002 now abandoned which claims the priorities, under 35 U.S.C. § 119, of U.S. Provisionl Patent Application No. 60/348,738, entitled "Secure Information Input Apparatus Having Associated Secure Mode Indicator", filed Jan. 14, 2002 and U.S. Provisional Patent Application No. 60/347,708, entitled "Transaction Terminal Adapted for Ease of Use and Having Improved Security Features", filed Jan. 11, 2002. All of the above provisional and non-provisional applications are expressly incorporated herein by reference.

BACKGROUND OF THE INVENTION

1. Field of the Invention

The present invention relates generally to a data collection device, and more particularly to an optical imaging data collection device.

2. Technical Background

"Transaction terminals" of the type having a data collection input and display capabilities for attachment to a point-of-sale (POS) network are growing in popularity. Unfortunately, currently available transaction terminals have been observed to exhibit numerous limitations.

Transaction terminals may also serve as "price verifier." Price checkers are typically unattended terminals dispersed throughout a store that allow customers to scan a barcode attached to an item. The price checker then displays the cost of the item. Price checkers improve the efficiency of retail operations by reducing the need for employees to answer pricing questions. Current price checking terminals do not provide an easy means of identification as to their location and function without additional signage. Thus, there is a need to increase the awareness on the part of customers to the presence of price checkers.

Additionally, transaction terminals that employ an optical reader using imaging technology to decode an optical image have the inherent limitation that there is a "dead zone" region immediately in front of the optical reader in which the optical reader cannot capture an image for decoding. Similarly, some optical reader employing a scanning laser engine also have a dead zone in which the optical reader cannot extract information from a coded image. Placing a coded image, such as, for example a barcode, in the dead zone results in an unsuccessful attempt to decode the image. If the user is unaware of the existence of the dead zone, they may repeatedly attempt unsuccessfully scan the coded image. When the user is a customer this may lead to frustration and lost sales. If the user is a sales clerk these repeated scanning attempts result in reduced efficiency. Even training a user about the operation limitations of the dead zone may be inefficient as the dead zone will vary with from optical reader to optical reader.

Thus, there is a need to provide a transaction terminal that is easy to operate and prevents a user from attempting to scan coded images in the dead zone of the optical reader.

SUMMARY OF THE INVENTION

One embodiment of the present invention includes a transaction terminal. The transaction terminal includes a housing and a display. The transaction terminal further includes a reader. The reader is configured to read data from a removable data carrier. The transaction terminal further includes an optical reader unit. The optical reader unit having an imaging axis and a field of view. The filed of view of the optical reader unit varies with distance along the imaging axis. The transaction terminal further includes an illumination unit disposed to illuminate at least a portion of the field of view of the optical reader unit. The transaction terminal further includes a luminiferous shroud extending outwardly from said optical reader unit. The lumifierous shroud is disposed perimeterly around the field of view of the optical reader unit. The luminiferous shroud allowing a portion of the incident light emitted from the illumination unit to be transmitted through the luminiferous shroud and dispersed in peripheral directions. The luminiferous shroud has a first end and a second end.

In another embodiment, the present invention includes an optical reader. The optical reader includes a luminiferous shroud having a first end and a second end. The optical reader further includes a photoelectric conversion unit adapted to read an image disposed proximate to the first end of said luminiferous shroud. The photoelectric conversion unit has a field of view. The optical reader further includes a light source disposed proximate to the first end of the luminiferous shroud. The light source provides light of a predetermined intensity and energy density. The lumifierous shroud is disposed perimeterly around the field of view of the photoelectric conversion unit and includes a partially reflective inner surface. The partially reflective inner surface reflects a portion of the light incident thereon and allows a portion of the light incident thereto to be transmitted through said luminiferous shroud and dispersed in peripheral directions.

In another embodiment, the present invention includes an optical reader. The optical reader includes a shroud. The shroud includes a partially reflective inner surface and an outer surface. The outer surface of the shroud includes opaque regions and light dispersing regions. The optical reader further includes a photoelectric conversion unit adapted to read an image disposed proximate to a first end of the shroud. The photoelectric conversion unit having a field of view. The optical reader further includes a light source disposed proximate to the first end of the shroud. The light source provides light of a predetermined intensity and energy density. Furthermore, the shroud is disposed perimeterly around the field of view of the photoelectric conversion unit. Furthermore, the partially reflective inner surface reflects a portion of the light incident thereon while allowing a portion of the light incident thereto to dispersed in peripheral directions through the light dispersing regions.

In another embodiment, the present invention includes a transaction terminal. The transaction terminal includes a motherboard and a display coupled to the motherboard. The transaction terminal further includes an optical reader coupled to the motherboard and a removable data carrier reader coupled to the motherboard. The transaction terminal further includes an optical reader coupled to the motherboard, the optical reader having a field of view, a user interface coupled to the motherboard and a shroud disposed proximate to the optical reader, the shroud emitting light.

BRIEF DESCRIPTION OF THE DRAWINGS

FIG. 1*c* is a top view of a transaction terminal according to the invention whereas FIG. 1*d* is a front view of a transaction terminal according to the invention;

FIG. 1*e* is a side view of a transaction terminal according to the invention;

FIG. 1*f* is a side view of a wedge style user according to the invention;

FIG. 1*q* is a front view of a terminal according to the invention including an optical reader, a retinal scanner and a fingerprint scanner;

FIGS. 3*f*-3*g* illustrate alternative cash registers which may be disposed in communication with a transaction terminal of the invention, while

FIG. 4*e* is an assembly view of a transaction terminal having a replaceable window;

FIG. 4*f* is a top view of a transaction terminal frame including cutaway views illustrating raised surfaces of the frame;

FIG. 4*g* is a top view of a transaction terminal in a mode wherein a signature capture screen is displayed on the terminal;

FIG. 4*l* is a top view of a transaction terminal in a mode where the transaction terminal displays a signature entry screen;

FIG. 10*i* is an assembly view of an imaging module, whereas

FIG. 16 is a fragmentary cross-section view of the end of the luminiferous shroud of Fig.;

FIG. 17 is a light ray diagram illustrating the operation of the end of the luminiferous shroud of FIG. 16;

FIG. 18 is a fragmentary side elevation view of the transaction terminal of FIG. 13;

FIG. 19 is a fragmentary side elevation view of the transaction terminal of FIG. 13.

DETAILED DESCRIPTION OF THE PREFERRED EMBODIMENTS

Reference will now be made in detail to the present preferred embodiments of the invention, examples of which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts.

Figure 1A:
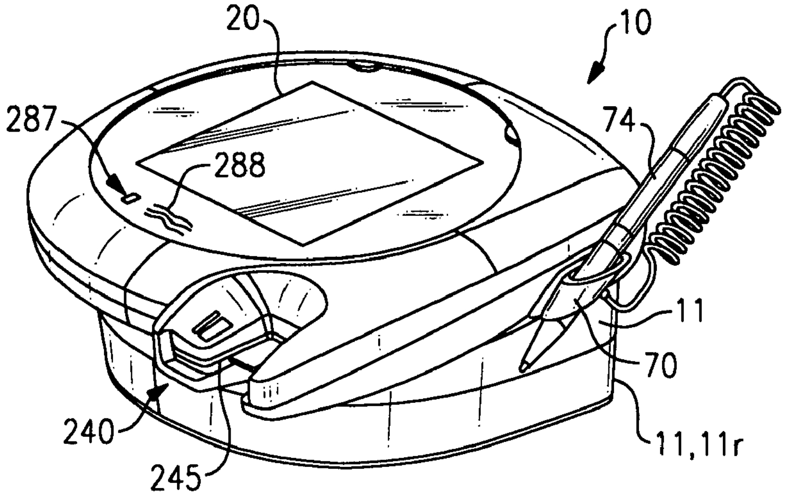
FIGS. 1*a* and 1*b* are perspective views of a transaction terminal according to the invention.
Figure 1B:
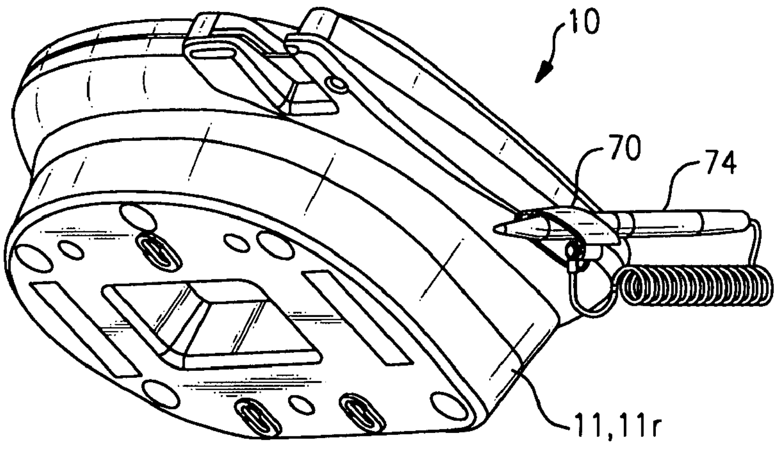
Figure 1G:
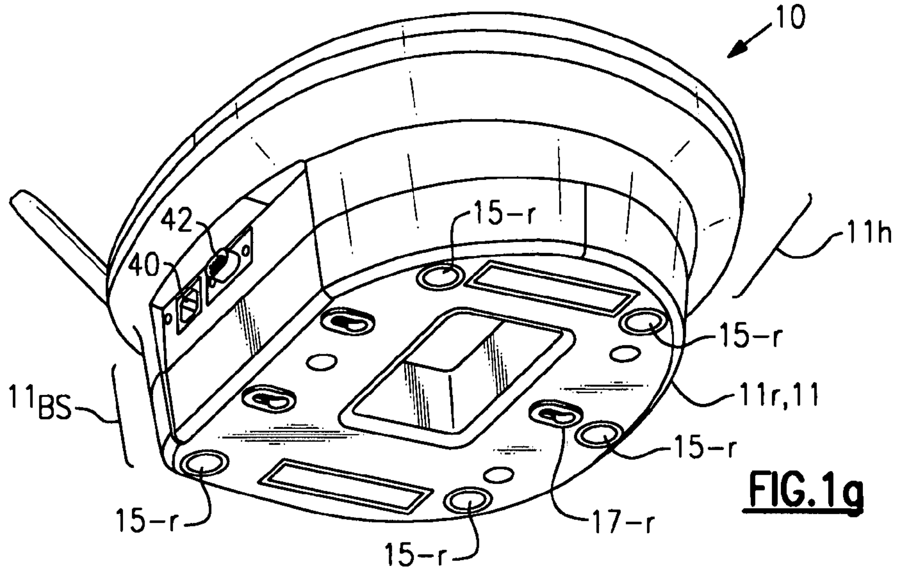
FIG. 1*g* is a bottom perspective view of a transaction terminal according to the invention.
Figure 1H:
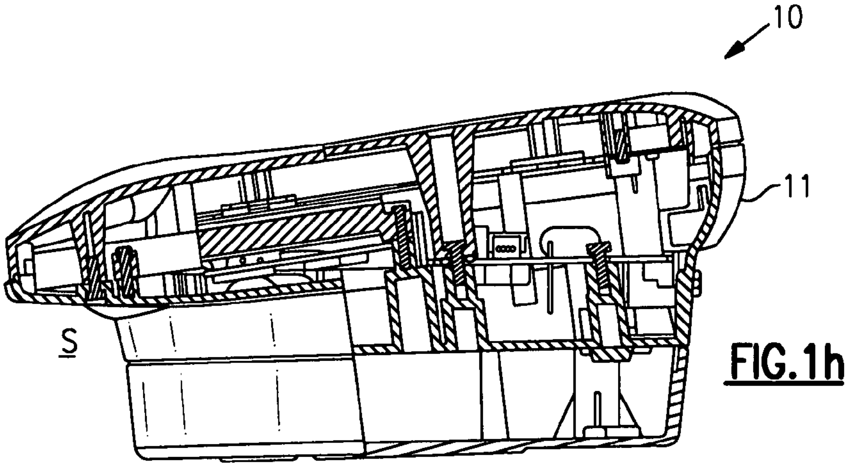
FIGS. 1*h* and 1*i* are cutaway side views of a transaction terminal according to the invention.
Figure 1I:
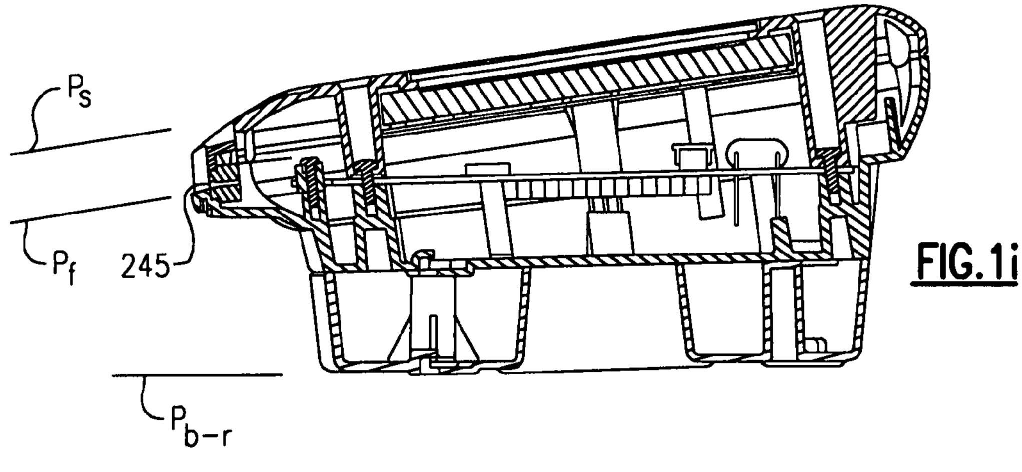
Figure 1G:
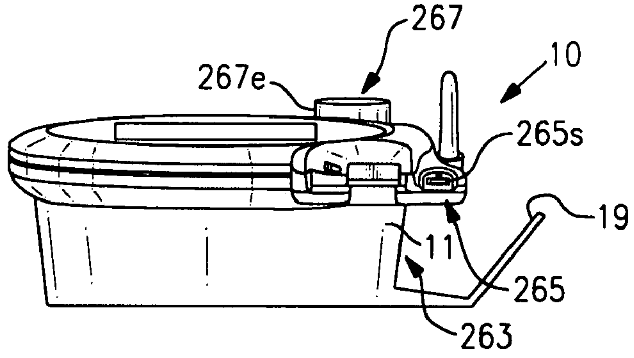
Figure 1J:
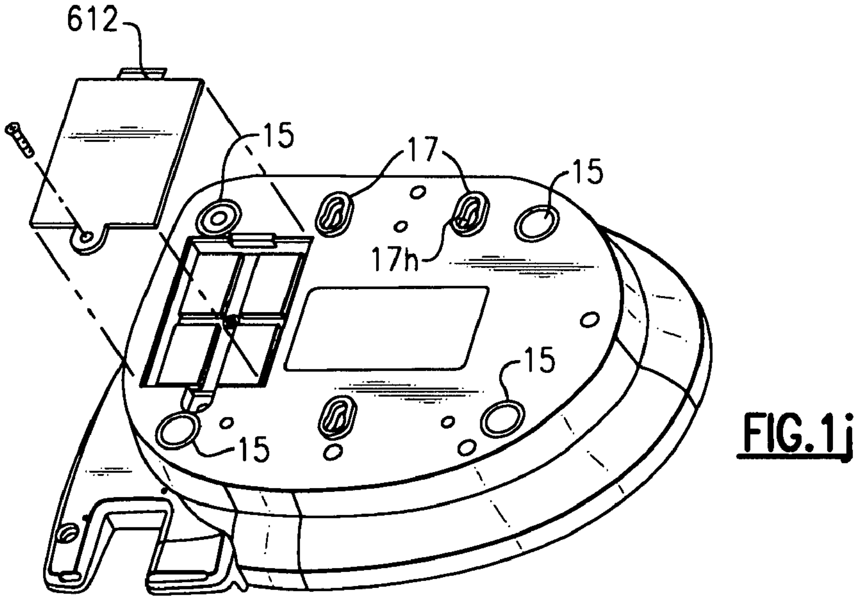
FIGS. 1*j* and 1*k* are bottom perspective views of a transaction terminal according to the invention having SAMS access doors.
Figure 1K:
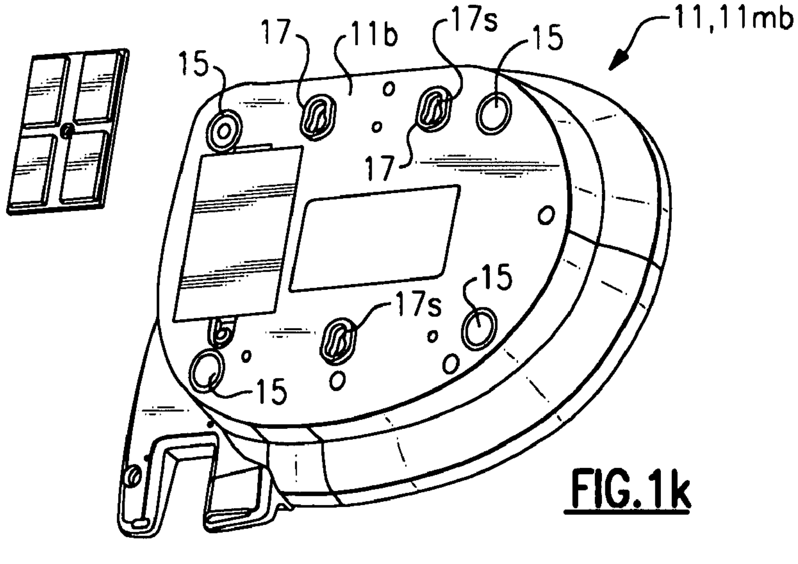

Perspective views of a transaction terminal according to the invention, which may be adapted for reading card information, for secure receipt of personal identification (PIN) information, for signature capture, and numerous other functions are shown in FIGS. 1*a,* 1*b,* and 1*g*. Card 90 which is processed by transaction terminal 10 may be, for example, a credit card, a debit card, customer loyalty card, an electronic benefits card, a company-sponsored benefits card, an identification card, etc.

Transaction terminal 10 includes a rugged housing 11 having a top 11*a,* a bottom 11*b,* a front 11*f,* and sides 11*s.* Housing 11 further includes a base portion 11*bs* and an enlarged head portion 11*h* extending forwardly from base 11*b* to define a lip 11L. Integrated in the top 11T of terminal 10 is a touch screen 20, which will be described herein, comprises a display 234 and a touch sensitive overlay 23 disposed over display 234. Disposed in housing lip 11L and opening toward front 11F of housing 11 is an insert-style card reader 240. Housing 11 further includes a detachable riser 11R and a tangle-resistant stylus 30 disposed in a specially configured holder apparatus 40 adapted for attachment either on housing 11 or on another member separate from housing 10. Terminal 10 further includes I/O connection ports 40 and 42 for allowing communication with other computer systems such as cash registers, or other host computer systems, e.g., server system, or hub computer systems as will be described later herein.

Figure 2A:
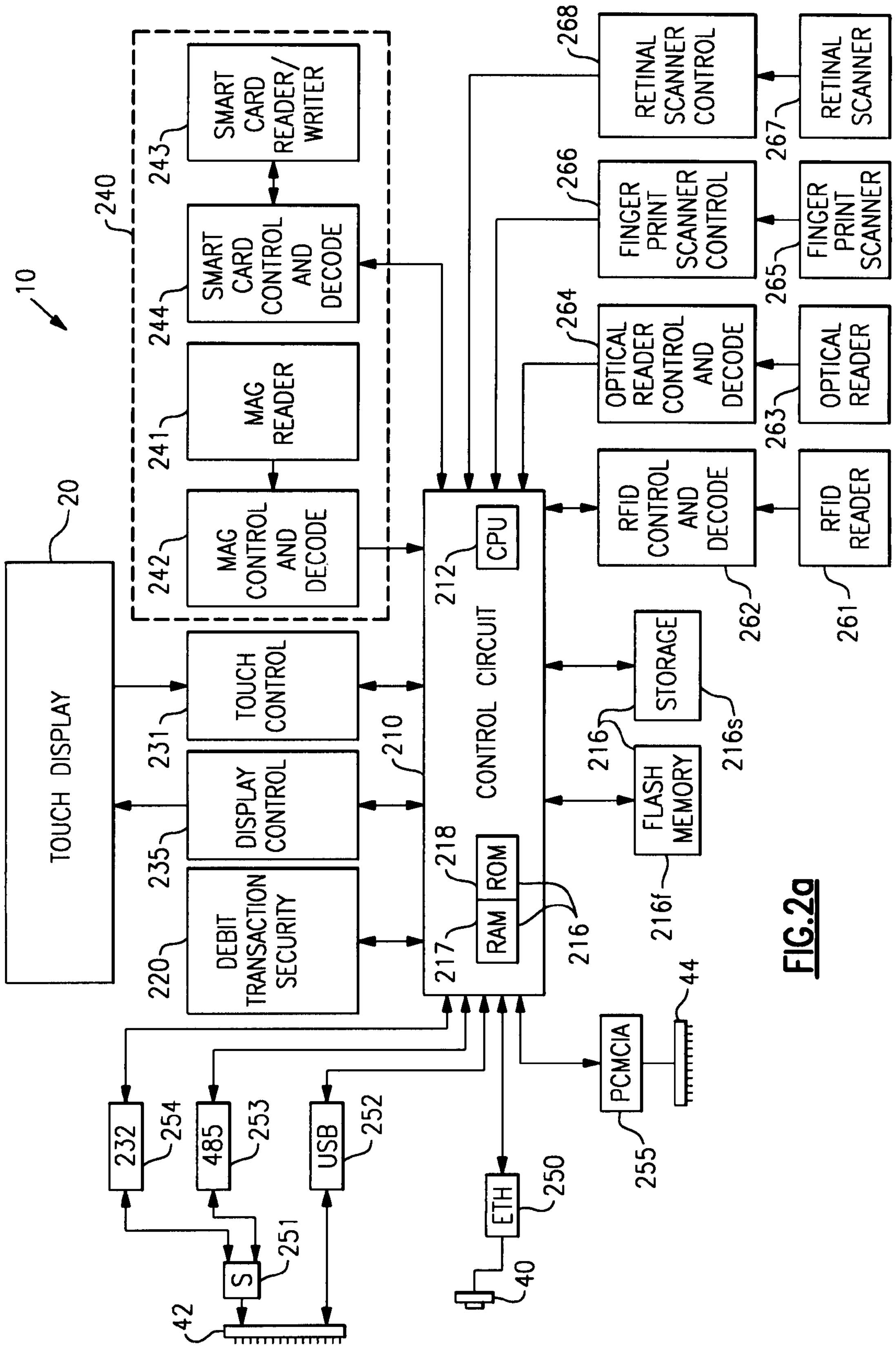
FIG. 2*a* is a functional electrical block diagram of a transaction terminal according to the invention.

A high level electrical block diagram of terminal 10 is shown in FIG. 2*a*. Terminal 10 includes a control circuit 210 which typically comprises at least one IC microchip. For example, an Intel 133 MHz or 206 Mhz SA-1110 Strong-arm CPU is suitable for use in circuit 210, although faster and less expensive CPU IC's will be preferred when they become available. In addition to having a central processing unit, CPU 212, control circuit 210 further includes a memory 216 typically having at least RAM 217 and ROM 218 memory devices. ROM 218 may be a reprogrammable ROM, otherwise known as a "flash" ROM.

Control circuit 210 may be in communication with other types of memory including "flash" type memory, e.g. a memory device 216F sold under the commercial names "Multimedia MMC," "Smart Media," "Compact Flash," and "Memory Stick." Flash type memory devices are especially useful for storing image data and signature data. Memory 216 which may be included in or in communication with control circuit 210 may also comprise a long term storage device 216*s* such as a hard drive, a floppy disk, or a compact disc. It has become increasingly common to package memory devices, particularly RAM and ROM devices within a single IC chip including control circuit CPU 212, RAM 216, and ROM 218.

Control circuit 210 is in communication with a number of components, including reader unit 240 which is a preferred embodiment in an insert style (also known as "dip" style) hybrid magnetic stripe and smart card reader/writer. Hybrid reader 240 may be an OEM integrated unit, e.g. a ZU series reader of the type available from Matsushita of Japan, an ST-40 series hybrid reader available from Secure-Tech, or a hybrid reader of the type available from IDTECH. Hybrid reader unit 240 includes a mag stripe reader 241 in communication with magnetic control and decode circuit 242, and smart card reader/writer 243 in communication with smart card control and decode circuit 244. Hybrid reader unit 240 may be disposed in pocket 13 defined in lower section 11LW of housing 11 as seen in assembly view FIG. 4*a*.

Control circuit 210 in the embodiment of FIG. 2*a* is also in communication with an RF ID reader unit having a reader 261, with associated control and decode circuit 262. RF ID reader 261 may be, for example a Kronegger miniaturized RF reader, readily connected to PCB 290, having a 25×35 mm footprint and power consumption below 100 ma. The reader 261 may be mounted just under housing upper portion 261*p* indicated in FIG. 4L.

Figure 1L:
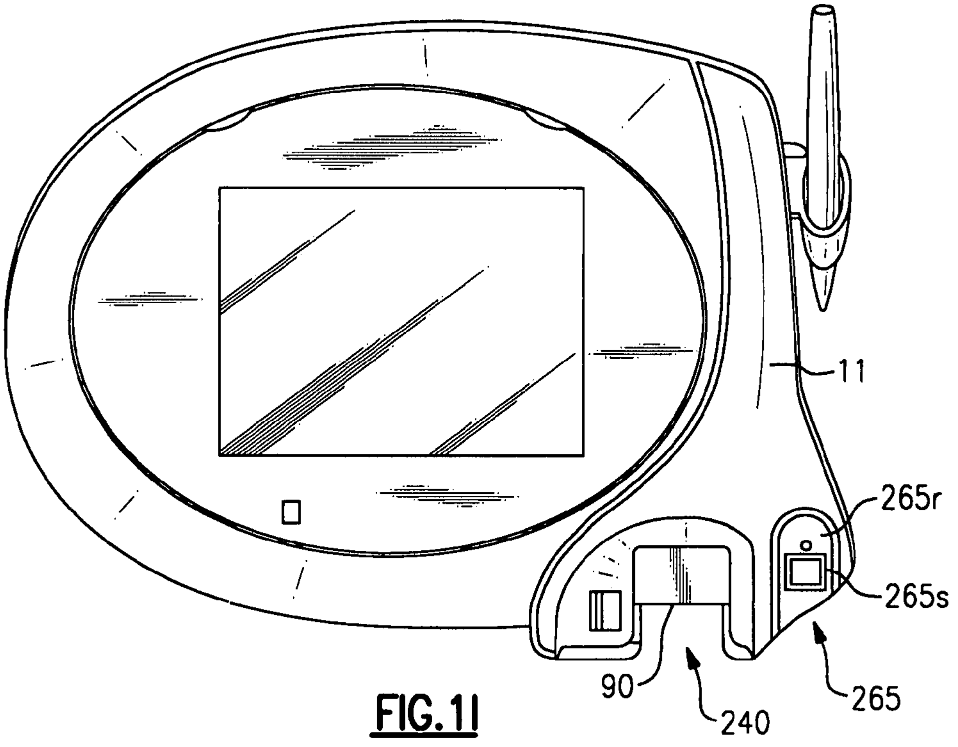
FIGS. 1*l* and 1*m* are top and front views respectively of a terminal according to the invention including an integrated fingerprint scanner.
Figure 1M:
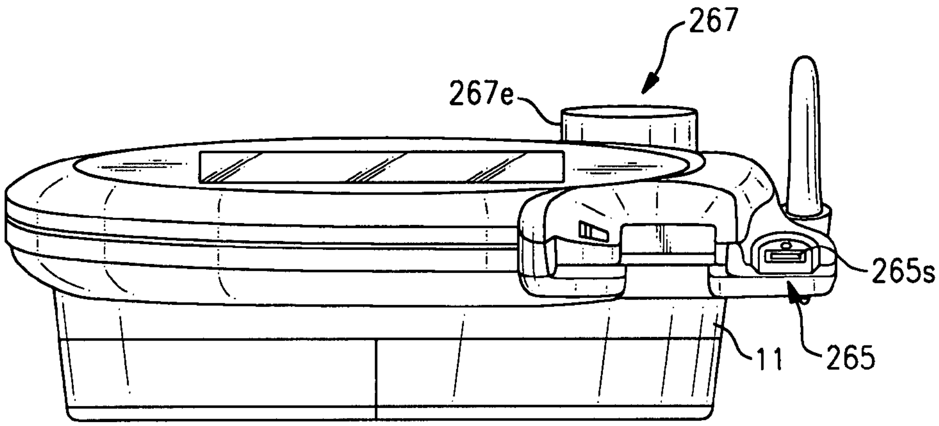
Figure 7A:
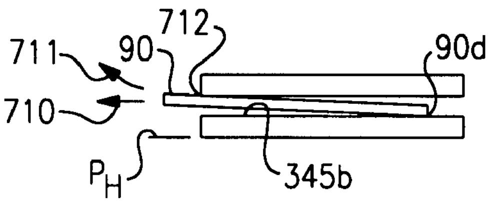
FIGS. 7*a*-7*b* are functional diagrams illustrating a brooming effect of the invention.
Figure 7B:
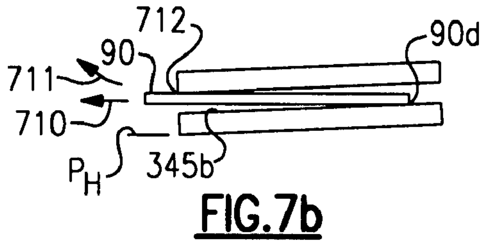
Figure 1N:
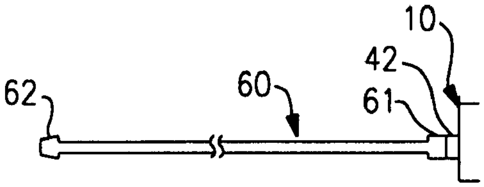
FIG. 1*n* shows a universal cable of the invention.
Figure 1O:
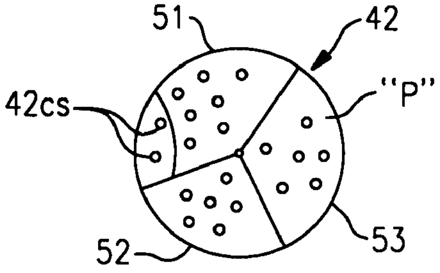
FIG. 1*o* is a top view of a universal connection of the invention.
Figure 1R:
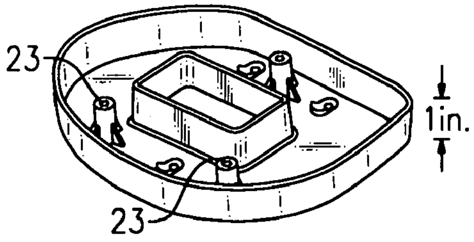
FIG. 1*r* is a perspective view of a riser.
Figure 1P:
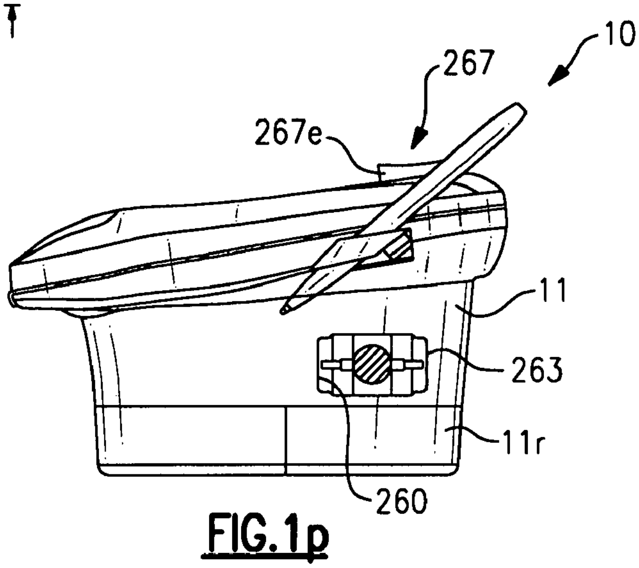
FIG. 1*p* is a side view of a terminal including an optical reader.
Figure 1S:
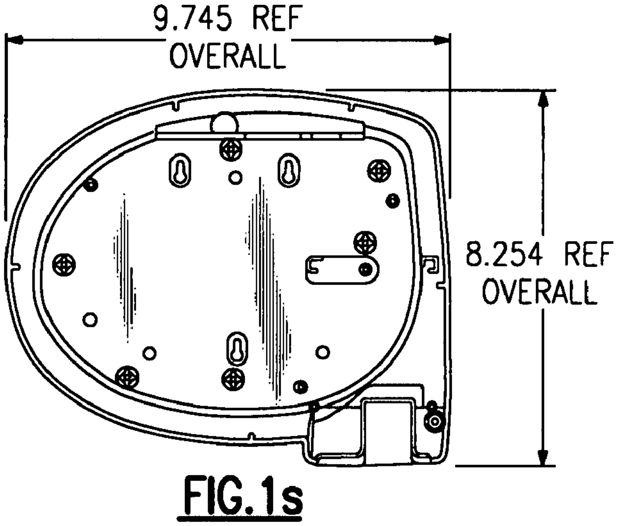
FIGS. 1*s*-1*u* are views of terminals in an embodiment for illustrating dimensional features.
Figure 7C:
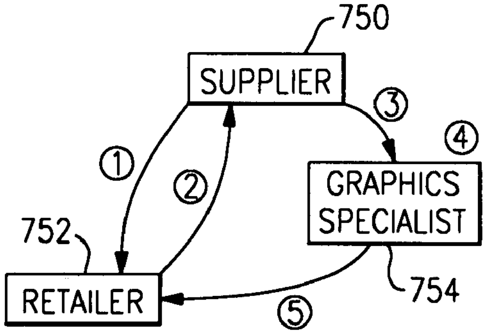
FIG. 7*c* is a business model diagram illustrating a method for marketing ad supplying a terminal according to the invention.
Figure 1T:
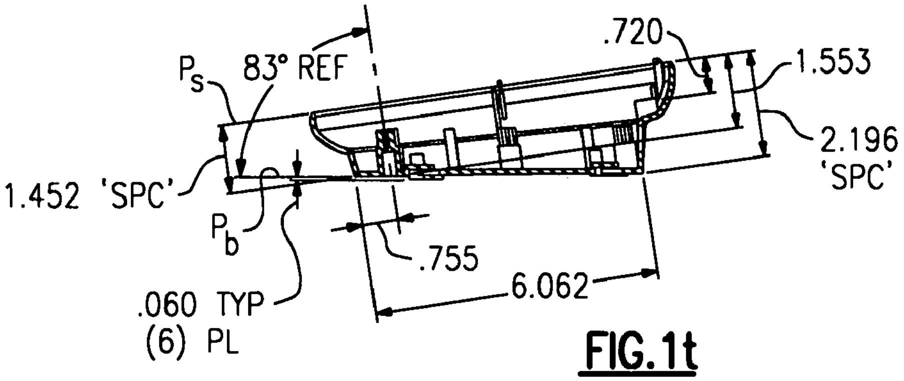
Figure 1U:
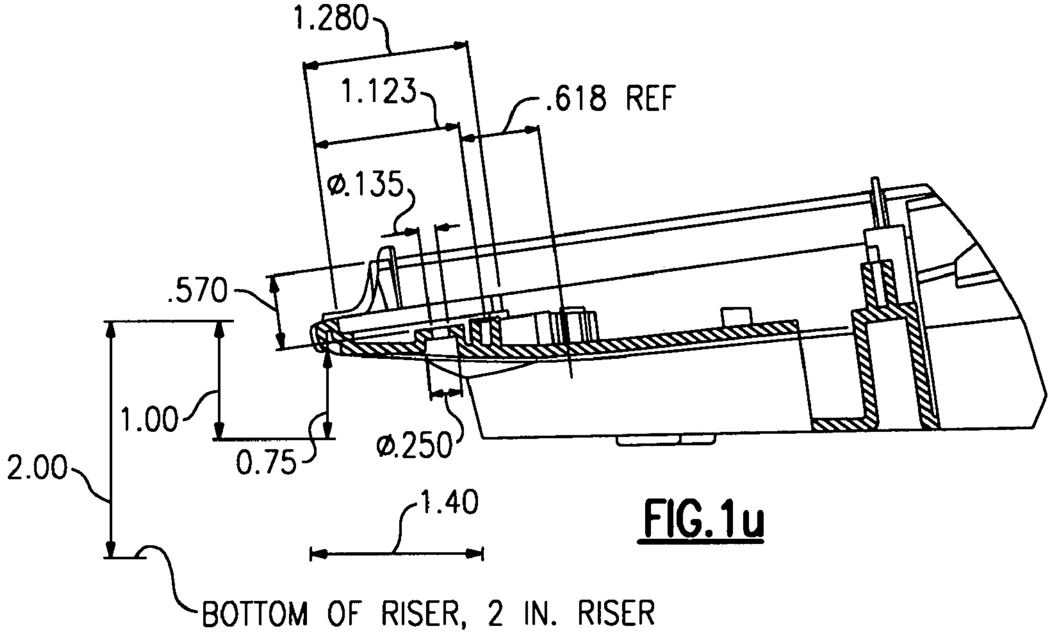

Another user interface data input device which may be disposed in communication with control circuit 210 is an optical reader unit or imaging assembly having module assembly 263 and associated control and decode out circuit 264. Control and decoding could also be carried out by control circuit 210. A model IT 4000 or IT 4200 optical reader module with decode out circuit of the type available from Hand Held Products, Inc. may be selected to provide the function indicated by blocks 263 and 264. Module 263 could also be a linear image sensor modules. Embodiments of transaction terminals according to the invention including an optical reader unit having 263 are shown in FIGS. 1*p* and 1*q*. Module 263 is readily installed in side 10*s* of base 10*bs*. More particularly housing 11 can include an imaging module aperture 260 for accommodation of imaging module 263. The aperture 260 may accommodate module 263 by allowing light to pass through aperture 260 to the imaging assembly aperture in the case assembly is mounted entirely inside housing 11 or may accommodate assembly 263 by allowing a part of assembly 263 to extend into the exterior of housing 11 in the case assembly 263 is mounted in such a manner that it is disposed partially inside and partially outside of housing 11. The height of the integrated portion of base 10*bs* or risen 11*n* may be increased as shown so that e.g. a credit or debit or identification card is readily placed in the field of view of reader 236.

Figure 10A:
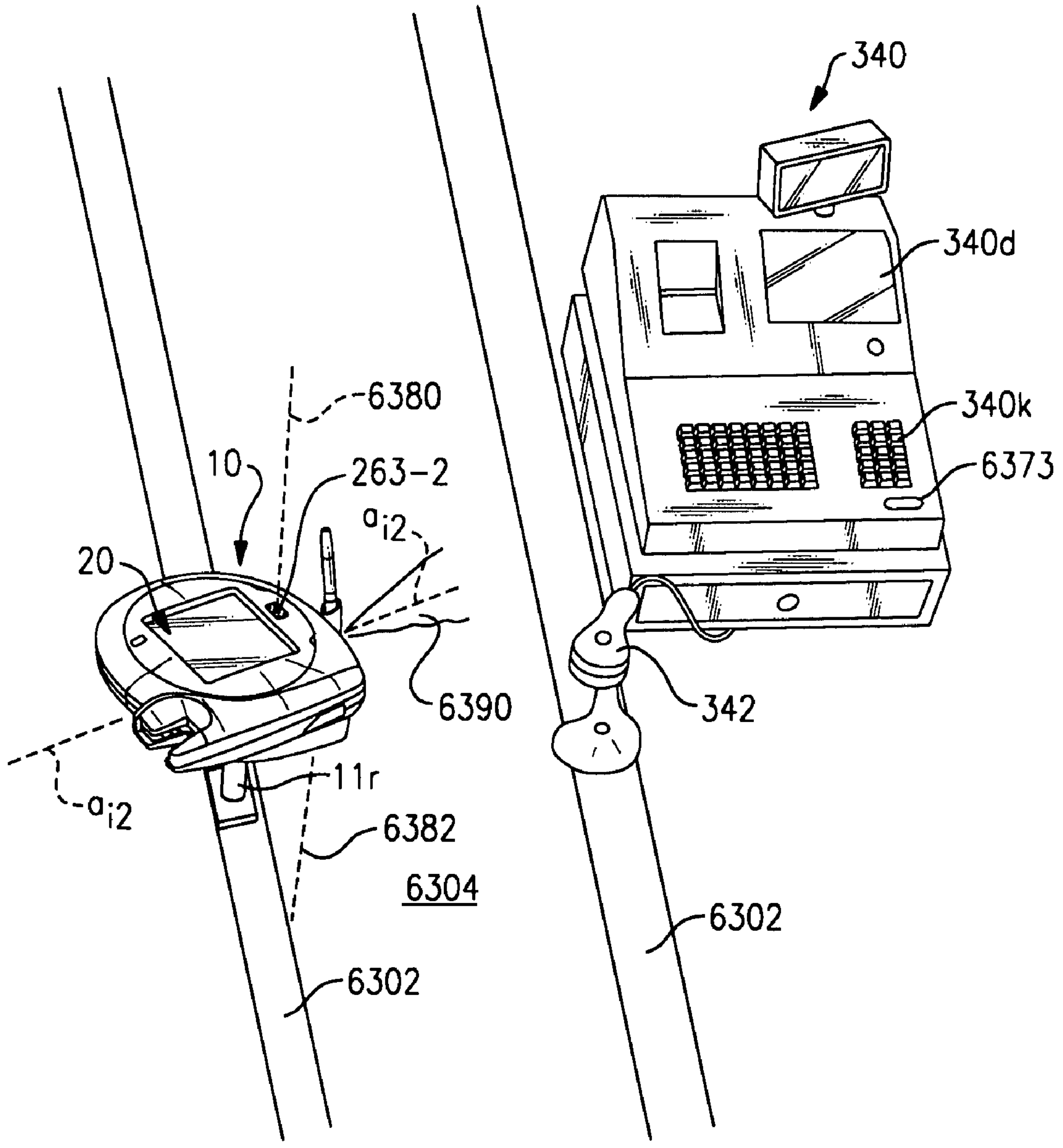
FIG. 10*a* is a perspective view of a transaction terminal in a retail store application.
Figure 10B:
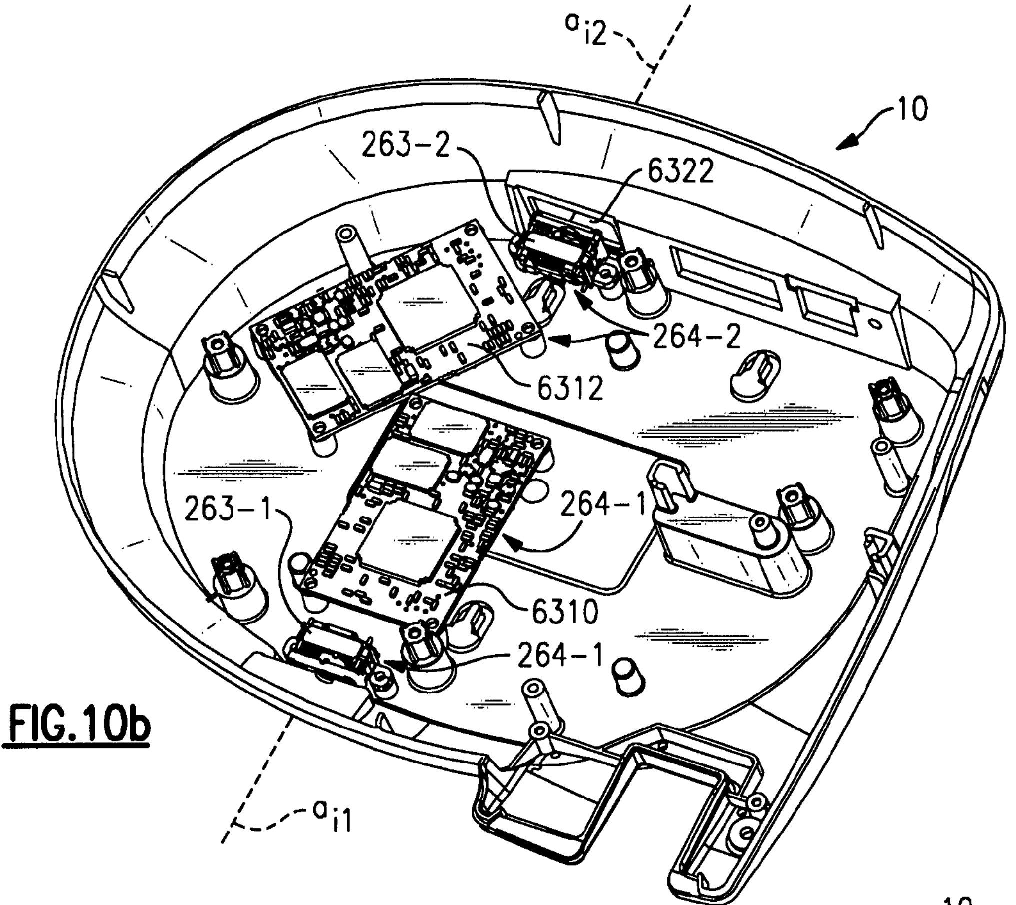
FIG. 10*b* is an internal perspective view of a transaction terminal including two imaging procedures.

Referring to the application depicted in FIG. 10*a*-10*d* it is advantageous to incorporate plural imaging modules 263 into transaction terminal 10. Transaction terminal 10 of FIGS. 10*a*-10*d* include front and rear imaging modules 263-1 and 263-2 as seen in FIG. 10*b*. Front imaging module 263-1 including imaging axis $a_{i1}$ is employed in the capture of images corresponding to objects (including objects bearing decodable indicia) disposed forward of transaction terminal 10, while rear imaging module 263-2 having imaging axis $a_{i2}$ is employed in the capture of images corresponding to objects (including indicia-bearing objects) disposed rearward of transaction terminal 10.

In a typical use of transaction terminal 10 as depicted in FIG. 10*a*, wherein transaction terminal 10 is installed on a counter top 6302 having a conveyor 6304, a front of transaction terminal 10 generally faces a customer while a rear of transaction terminal 10 generally faces a store clerk, who stands proximate cash register 340. Disposing first imaging module 263-1 to image objects disposed forward of transaction terminal 10 renders first imaging module 263-1 well-suited for use by a customer. Similarly, disposing second imaging module 263-2 to image objects disposed rearward of transaction terminal 10 renders second imaging module 263-2 well-suited for use by a store clerk.

During operating programs executed by control circuit 210, a customer may actuate first imaging module 263-1 to, e.g., read a bar code from a customer loyalty card to determine a customer number, to capture an image corresponding to a fingerprint or a face of a customer, etc. A store clerk may actuate second imaging module 263-2 e.g. to read a bar code from a driver's license or other identification card to determine a customer's age, to read a bar code from a product, or to capture an image for any reason. Further aspects of the invention relating to a store clerk's actuation of second imaging module 263-2 will be described in greater detail herein.

Figure 10C:
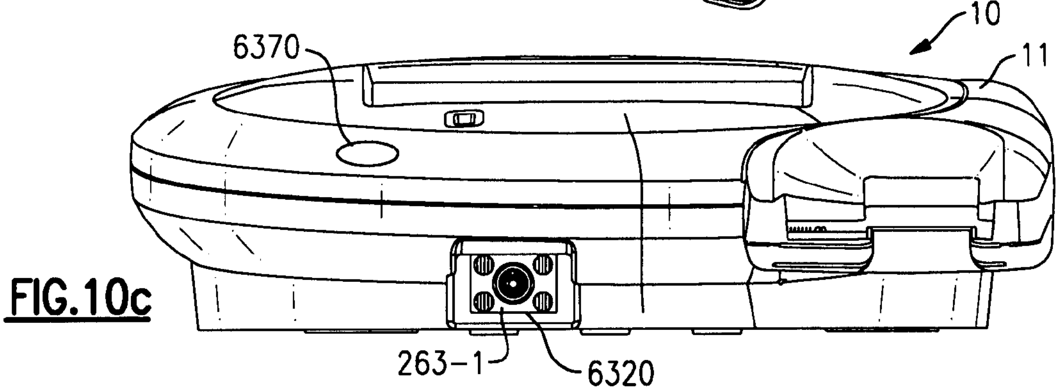
FIG. 10*c* is a front view of an imaging module having a front imaging module.
Figure 10D:
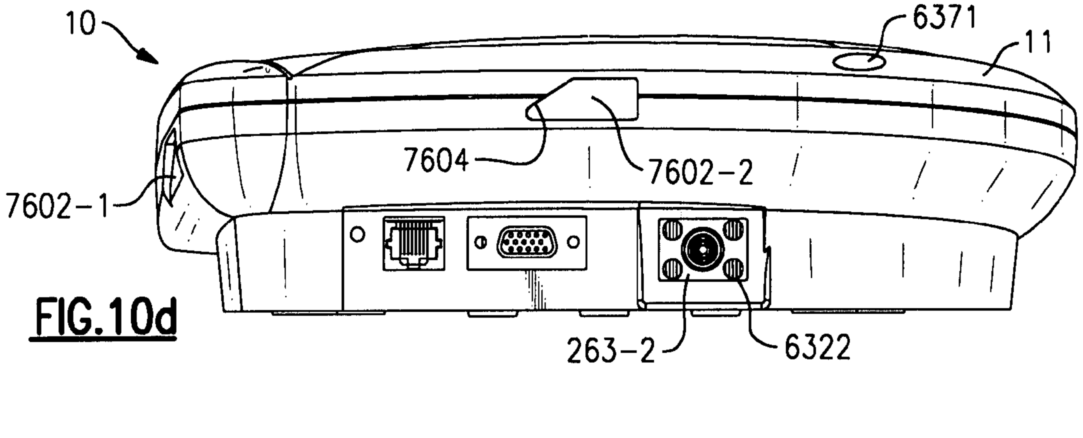
FIG. 10*d* is a rear view of an imaging module including a rear imaging module.
Figure 10F:
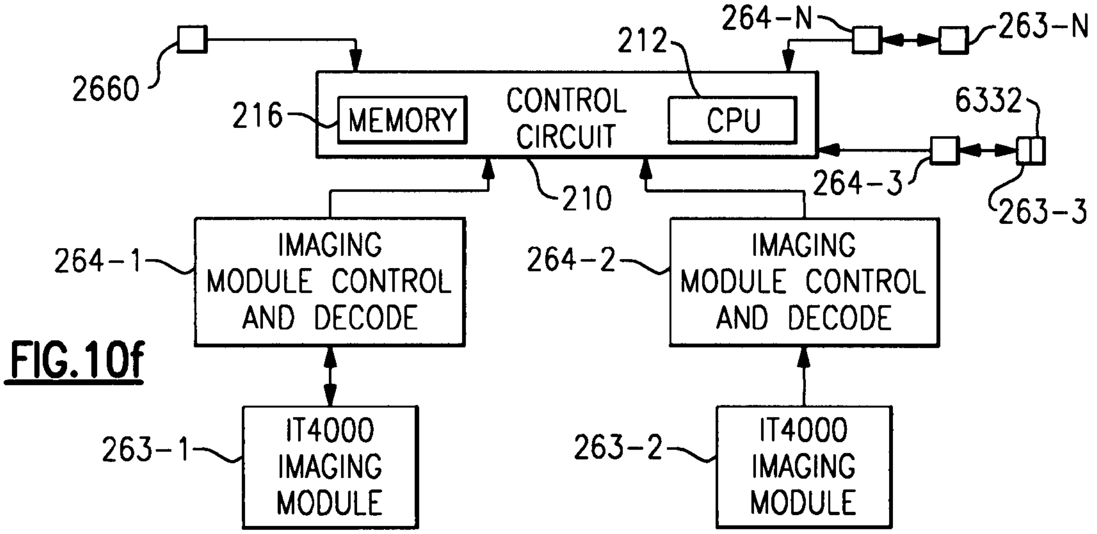
FIG. 10*f* is an block electrical diagram of a transaction terminal having two imaging modules.
Figure 10G:
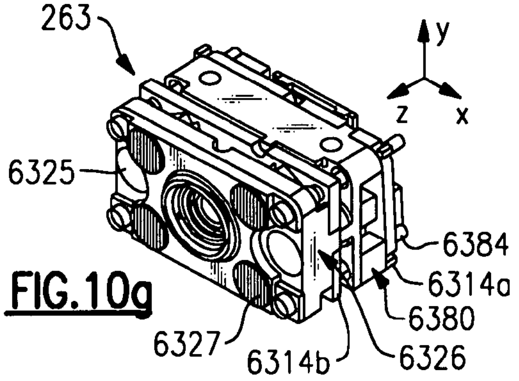
FIGS. 10*g*-10*h* are perspective views of an imaging module.

Referring to FIG. 10*b* an internal perspective view of a transaction terminal 10 having front and rear imaging modules is shown. Imaging modules 263-1 and 263-2 in the embodiments of FIGS. 10*b*, 10*c*, and 10*d* are provided by IT4000 imaging modules available from HHP, Inc. of Skaneateles Falls, N.Y., as are substantially described in application Ser. No. 10/092,789, filed Mar. 7, 2002, entitled "Optical Reader Imaging Module" incorporated herein by reference and application Ser. No. 10/093,136 filed Mar. 7, 2002, entitled "Optical Reader Comprising Multiple Color Illumination" also incorporated herein by reference. IT4000 imaging modules are shown in greater detail in the exploded views of FIGS. 10*g*-10*j*. Imaging module 263 includes a support 6380 having a containment 6381 containing image sensor chip 6332, and a retainer section 6382 retaining a lens assembly 6340 shown as being provided by a lens barrel. Image sensor chip 6332 can be a gray scale image sensor chip or a color image sensor chip of the type described in application Ser. No. 09/904,697 filed Jul. 13, 2001, entitled "An Optical Reader Having a Color Imager", incorporated herein by reference. Lens assembly 6340 may include fixed optics configured so that imaging module 263 has a best focus receive distance of less than two feet (e.g. 3 in., 7 in., 9 in). Lens assembly 6340 can also include adjustable optics varying the best focus distance of module 263, or fixed optics such that a best focus receive distance of module 263 is from about 15 inches to about 20 inches. A first circuit board 6314*a* carrying image sensor chip 6332 and aiming LEDs 6318 is mounted to a back end of support 6380 while a front circuit board 6314*b* carrying illumination LEDs 6316 is mounted to a front end of support 6380. An optical plate 6326 carrying aiming and illumination optics is disposed forward of second circuit board 6314*b*. Supporting the various components of imaging module 263 are a plurality of conductive support posts 6384. Imaging module 263 can include mounting wings 6380*w* for aiding in the installation of imaging module 263 in a device housing. Imaging module 263 has a form factor of about 2.0 cm by 1.2 cm by 1.2 cm. Imaging module 263 can also be of a type comprising a ID image sensor or a laser sweeping scan engine.

Physical form views of circuit 264-1 and circuit 264-2 are shown in FIG. 10*b*. Circuit 264-1 is incorporated in printed circuit board 6310 while circuit 264-2 is incorporated in printed circuit board 6312. Control circuits 264-1 and 264-2 could also be incorporated in a circuit board of the respective imaging modules 263-1 and 263-2, as is generally described in application Ser. No. 09/411,936 filed Oct. 4, 1999, entitled "Imaging Module for Optical Reader" incorporated herein by reference.

Referring to FIG. 10*c* a front view of a transaction terminal 10 including a front imaging module 263-1 is shown. A front view of front imaging module 263-1 is visible through a front aperture 6320 of housing 11. A rear view of transaction terminal 10 is shown in FIG. 10*d*. A front view of rear module 263-2 is visible through rear aperture 6322. Light transmissive windows (not shown) protecting and containing imaging modules 263-1 and 263-2 can be disposed to cover apertures 6320 and 6322. Installing transaction terminal 10 on riser 11*r* provides sufficient clearance between transaction terminal 10 and the counter top 6302 so that objects including decodable indicia-bearing objects can readily be placed in a field of view of both first imaging module 263-1 and second imaging module 263-2.

Referring to further aspects of terminal 10 shown in FIG. 10*d*, terminal 10 includes first and second broad surfaces 7602-1 and 7602-2 for receiving holder apparatus 70 as described previously in connection with FIG. 3*e*. Preferably both of surfaces 76-1 and 7602-7 can be flat and can be specifically dimensioned to correspond to a rear surface 76 of holder 70 (FIG. 3*e*). As indicated by profile edge 7604, surfaces 7602-1, 7602-2, and 76 can be keyed to assure prompt and proper orientation of surface 76 onto surface 7602-1 or 7602-2. Surface 7602-1 is formed on a right side of housing 11 (from a front end view) so that terminal 10 can be adapted for easy access of stylus 74 by right handers (the majority of users). Surface 7602-2 is formed on a rear of housing 11 so that terminal 10 can be adapted for easy access of styles by both right and left handers. Holder 70 can be detachably attached to surface 7602-1 or 7602-2 with use, e.g. of adhesive or double stick tape.

It has been mentioned that during the course of operation of terminal 10 it may be advantageous for a user to actuate module 263-1 or module 263-2. In general, a module 263-1, 263-2 can be actuated to capture an image (which is then archived and/or subjected to decoding) by changing a state of a "trigger signal" from an OFF state to an ON state. A state of a trigger signal can be changed by any one of at least three methods: (1) Manually, by manual actuation of a trigger or trigger button; (2) Automatically, by moving a detectable decodable image or object into the field of view of module 263-1, 263-2, or (3) Automatically, by realization of a predetermined event or condition.

Referring to the first method for changing a state of a trigger signal (manual actuation of a trigger button), transaction terminal 10 can be equipped with at least one manual trigger or trigger buttons. Trigger button 6370 (FIG. 10*c*) can be disposed on housing 11 toward a front of housing 11 for actuation of first imaging module 263-1, while trigger button 6371 (FIG. 10*d*) can be disposed toward a rear of housing 11 for generation of a trigger signal for actuating a second imager module 263-1. A manual trigger button or buttons can also be displayed on touch screen 20. Further, a manual trigger button for changing a state of a trigger signal for actuating either of module 263-1 or 263-2 need not be located on transaction terminal 10. A manual trigger button can be located remote from transaction terminal. For example, cash register 340 (which is in communication with terminal 10 as described with reference to FIGS. 3*f* and 3*g*) can be configured so that cash register 340 changes a state of a trigger signal for actuation of imaging module 263-1, 263-2 when a manual trigger button of cash register is actuated. Cash register 340 can be configured so that when a certain button of keyboard 346 or a dedicated trigger button 6373 is actuated, cash register 340 changes a state of a trigger signal at transaction terminal 10 (possibly by sending, e.g. of a one bit signal, or one or more program instructions such a script program instructions) to the end that an imaging module e.g. 263-2 is actuated and that circuit 264-2 captures an image and subjects the image to a decode attempt.

Referring to a second method for changing a state of a trigger signal (automatic, in response to a decodable indicia or object being presented to module 263-1, 263-2), control circuits 264-1, 264-2 can be configured so that a trigger signal for actuating imaging module 263-1 and 263-2 is caused to change state in the manner described in application Ser. No. 09/432,282, filed Nov. 2, 1999, entitled "Indicia Sensor System for Optical Reader" incorporated herein by reference. In the incorporated application Ser. No. 09/432,282, a control circuit for an optical reader is described which, without actuating illumination sources such as LEDs 6316, captures image data and monitors for indicia including light-to-dark transitions being moved into a field of view of an image sensor. When a criteria indicating that a decodable indicia has been presented, the control circuit generates what can be considered herein a trigger signal to commence a full decode operating mode characterized by actuation of at least illumination LEDs such as LEDs 6316, full frame image capturing, and launching of at least one decode algorithm. When LEDs 6316 and/or LEDs 6318 are actuated, both a customer and a store clerk will likely observe the illumination being emitted, whether by module 263-1 or module 263-2. While the incorporated application Ser. No. 09/432,282 describe a method whereby a trigger signal is switched to an ON state when a decodable indicia is presented to an imaging module, it is understood that a control circuit 210, 264 can be made to switch a trigger signal to an ON state in response to any object being placed in a field of view of an imaging module 263. That is, a motion detector signal generated by a control circuit coupled with an image sensor, e.g., 6332, can serve as a trigger signal which when in an ON state commences image capturing and decoding operations. Methods for programming a control circuit 210, 264 to change a state of a motion detection/trigger signal are described in greater detail herein below.

Accordingly, it would be advantageous to configure transaction terminal 10 so that erroneous actuations (which may result from unintentionally moving an object into a field of view) of LEDs 6316, 6318 are minimized. Erroneous actuations LEDs and/or LEDs 6318 can be distracting. To minimize erroneous actuation of LEDS 16, 18 transaction terminal 10 can be mounted vertically\ so that imaging axes $a_{i1}$, $a_{i2}$ are directed vertically. Alternatively imaging modules 263-1 and 263-2 can be disposed in transaction terminal 10 so that imaging axes $a_{i1}$, $a_{i2}$ are directed substantially vertically. For example, rear imaging module 263-2 can be disposed in housing 11 so that imaging axis $a_{i2}$ extends upwardly from terminal 10 along axis 6380, or downwardly along axis 6382. Disposing an imaging module 263-2 rearward of touch screen 20 as shown in FIG. 10*a* renders a field of view of module 263-2 easily accessible by a store clerk. In a further aspect of the invention, imaging modules 263 can be disposed in association with a luminescent light pipe 2608 (FIG. 10*j*). As will be described, light pipe 2608 reduces or eliminates the unsettling affect sometimes associated with an emission of LED light Referring to a third method of changing a state of a trigger signal (automatically, on the realization of predetermined event or condition), a system including transaction terminal 10 can be configured in one specific embodiment so that a trigger signal is caused to change state when a certain type of product is purchased pursuant to a POS transaction. The purchase of certain "age proof required" products (e.g. alcohol, tobacco, R rated videos) require that customer prove his/her age prior to purchase. In accordance with the invention, a lookup table (LUT) can be incorporated in cash register 340 (or elsewhere in POS network 300 including in terminal 10) correlating product codes with flags indicating whether the product is an age proof required product. An updated version of the proof-of-age LUT may periodically downloaded to cash register 340 or terminal 10. A product code can be determined by reading a bar code symbol such as the UPC code of a product, typically using a "store clerk" bar code reader 342 in communication with cash register 340. It will be understood that a "store clerk" bar code reader 342 in communication cash register 340 can be a bar code reader incorporated in transaction terminal 10 as has been described herein. In accordance with the invention, cash register 340 can be configured to change a state of a trigger signal when cash register 340 receives from a bar code reader 340 a decoded out message comprising a product code corresponding to a "proof-of-age" product as determined with reference to the lookup table (LUT). Cash register 340 when receiving a decoded out message having a product code corresponding to a "proof-of-age" product, may change a state of a trigger signal (possibly by sending one or more program instructions or a one bit signal) at control circuit 210 of transaction terminal 10 to cause control circuit 210 to actuate imaging module 265-2 so that a control circuit (e.g. 210 or 262-2) associated with imaging module 263-2 repeatedly captures images and subjects the captured images to decoding without further manual actuation of any actuation device. When imaging module 263-2 is actuated to repeatedly capture images and subject captured images to decoding, LEDs 6316 and/or 6318 of imaging module 263-2 are actuated as part of the image capture process. LEDs 6316 may be red LEDs which project light that is highly visible to a customer and a store clerk. Thus, in accordance with one embodiment of the invention, LEDs 6316 are automatically actuated to emit red light in area 6390 (or about one of axes 6380, 6382) when cash register 340 receives a decoded out message corresponding to a "proof-of-age" product. The red light or another visible light emitted by LEDs 6316 provides a visual feed back indicating to a customer and a store clerk that proof-of-age is required for purchase of the product just subjected to bar code decoding by reader 340. The store clerk may then place customer driver license or other customer identification card in a field of view of module 263-2 to decode a bar code on the identification card indicating the customer's date of birth. After a customer identification card bar code is read, transaction terminal 10 may communicate with cash register 340 so that cash register 340 displays on cash register display 340*d* the customer's date of birth or an appropriate text message indicating that the customer is or is not of sufficient age to purchase the product. Further, in accordance with the invention, control circuit 210 when receiving a trigger signal may display a prompt message on touch screen 20, such as "PLEASE HAND IDENTIFICATION CARD TO STORE CLERK" in order to prompt a customer to giver his/her identification card to the store clerk for birth date verification using imaging module 263-2 which, by the time the prompt message is observed, has already been actuated by cash register 340 to illuminate area 6390, to repeatedly capture image data, and to repeatedly subject captured images to decode attempts. It will be understood that "changing a signal" state from an OFF state to an ON state, as described herein can be considered "the generation" of a signal.

It has been described herein that it is sometimes useful to attract the attention of a user of terminal 10 by the actuation of LEDs 6316, 6318 of an imaging module, e.g., module 263-1 or module 263-2. Referring now to FIG. 10*j* an imaging module assembly is described which is highly useful in attracting attention of a user by actuation of imaging module LEDs.

Imaging module assembly 2602 includes a base 2604 including a platform section 2606 and a tubular light pipe section 2608. Tubular light pipe section 2608 guides light from light entry interior surface 2610 of light pipe section 2608 to light exit exterior surface 2616 of light pipe section. Base 2604 may be a one piece unit and may be injection molded using a translucent polycarbonate material. Imaging module assembly 2602 further includes imaging module 263 and a printed circuit board 2620 carrying components (which may be components of control and decode circuit 264, FIG. 2*a*). Imaging module 263 of FIG. 10*j* may represent e.g. front imaging module 263-1, rear imaging module 263-2, modular pocket imaging module 263-3, described in greater detail with reference to FIG. 10*k*. Imaging module 263 is screwed into mounting posts 2624 of base 2604. Imaging module 263 may be electrically connected to a printed circuit board 2620 via a flex strip (not shown). Printed circuit board 2620 which carries component of generic control and decode circuit 264 is also screwed into base 2604 as is suggested by screw holes 2628. Base 2604 includes a clearance 2630 to provide air cooling of main microprocessor IC chip 2632 of control and decode circuit 264. When imaging module 263 is installed on base 2604, imaging module 263 is proximate aperture 2634, which may be shaped to complement a shape of imaging module 263. A protective light-transmissive window (not shown) may be disposed at aperture 2634. Tubular light pipe 2608 is dimensioned to a diameter such that imaging light rays can pass though an interior of light pipe 2608 and then be received on an active surface of image sensor 6332.

Figure 10I:
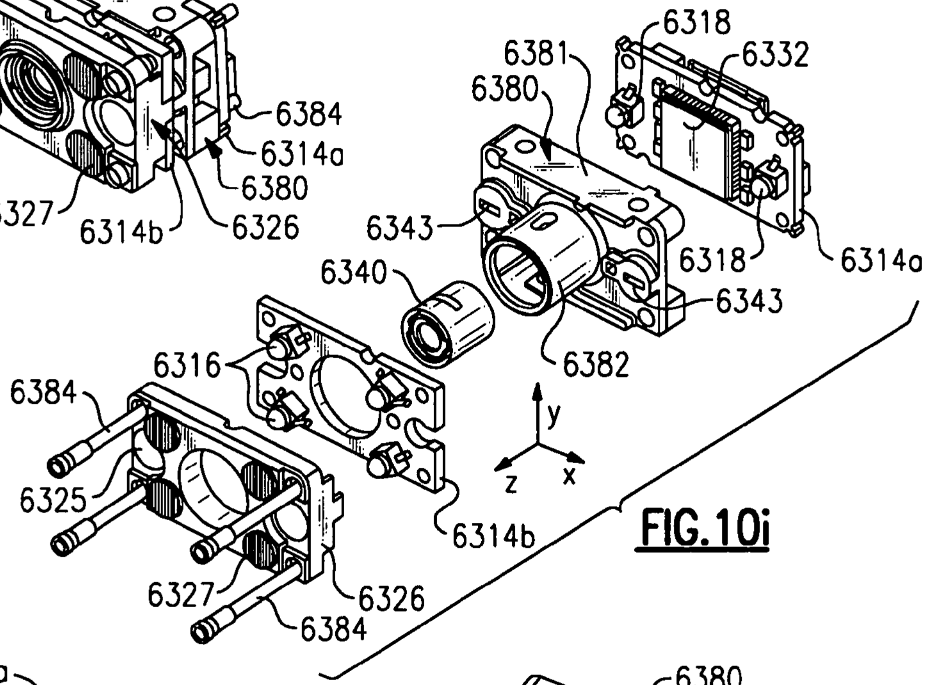
Figure 10H:
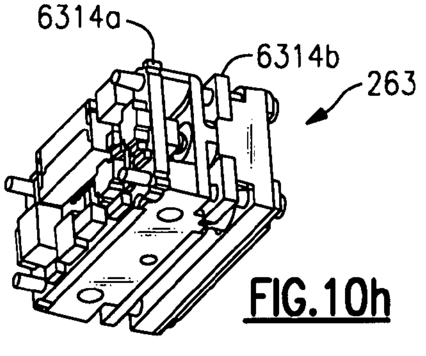
Figure 10E:
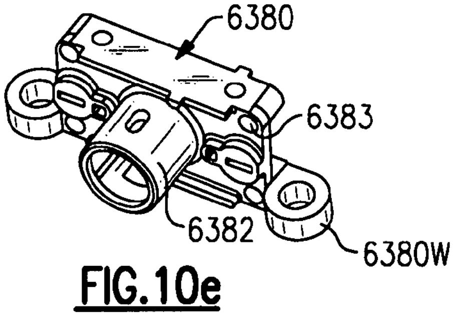
FIG. 10*e* is a perspective view of an imaging module support having mounting wings.
Figure 10J:
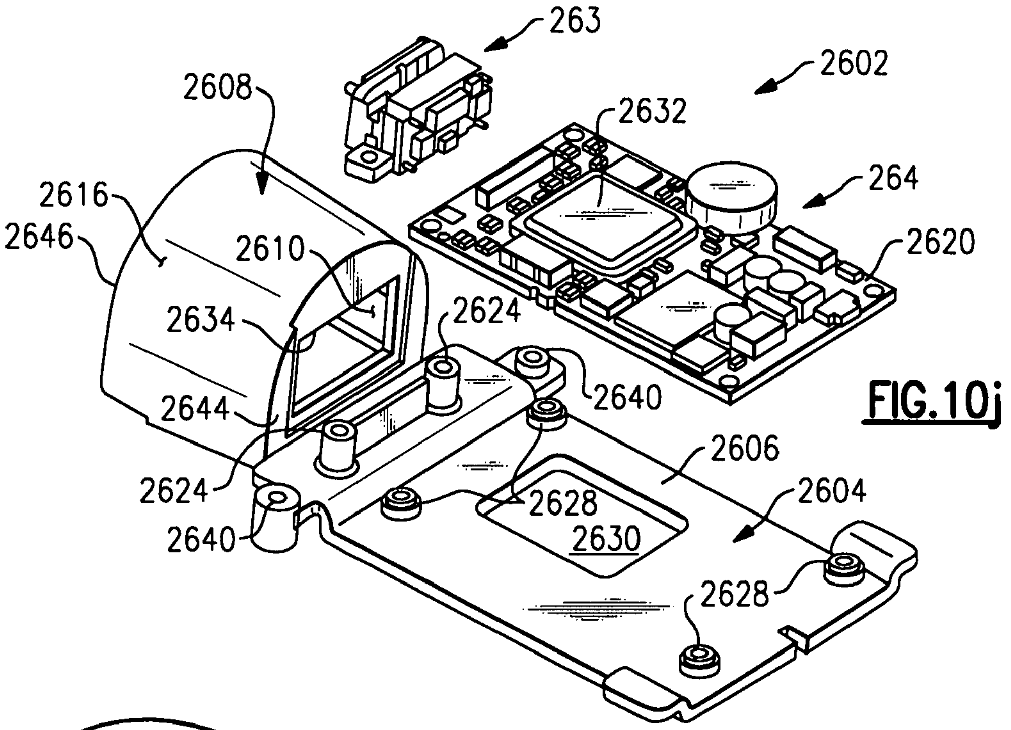
FIGS. 10*j* through 10*o* are various views illustrating a transaction terminal having a light pipe according to one embodiment.

Light pipe section 2608 operates to conduct light from a light entry surface 2610 of light pipe 2608 to a light exit surface 2616 of light pipe 2608. It is seen that imaging module 263 is disposed in relation to light pipe 2608 so that light from imaging module LEDs 6316, 6318 is directed to an interior of tubular light pipe 2608. Accordingly, when LEDs 6316, 6318 of module 2632 (which may be red LEDS) are actuated, an entire or substantially an outer surface of light pipe 2608 becomes luminescent and is visible from a long distance (e.g., 10 feet). Because light rays are distributed over the large surface of light pipe 2608, the emission of light is not as unsettling as in the case of a direct LED light emission. Various views of a fully assembles imaging module assembly 2602 are shown in FIGS. 10M, 10N, 10O.

Figure 4A:
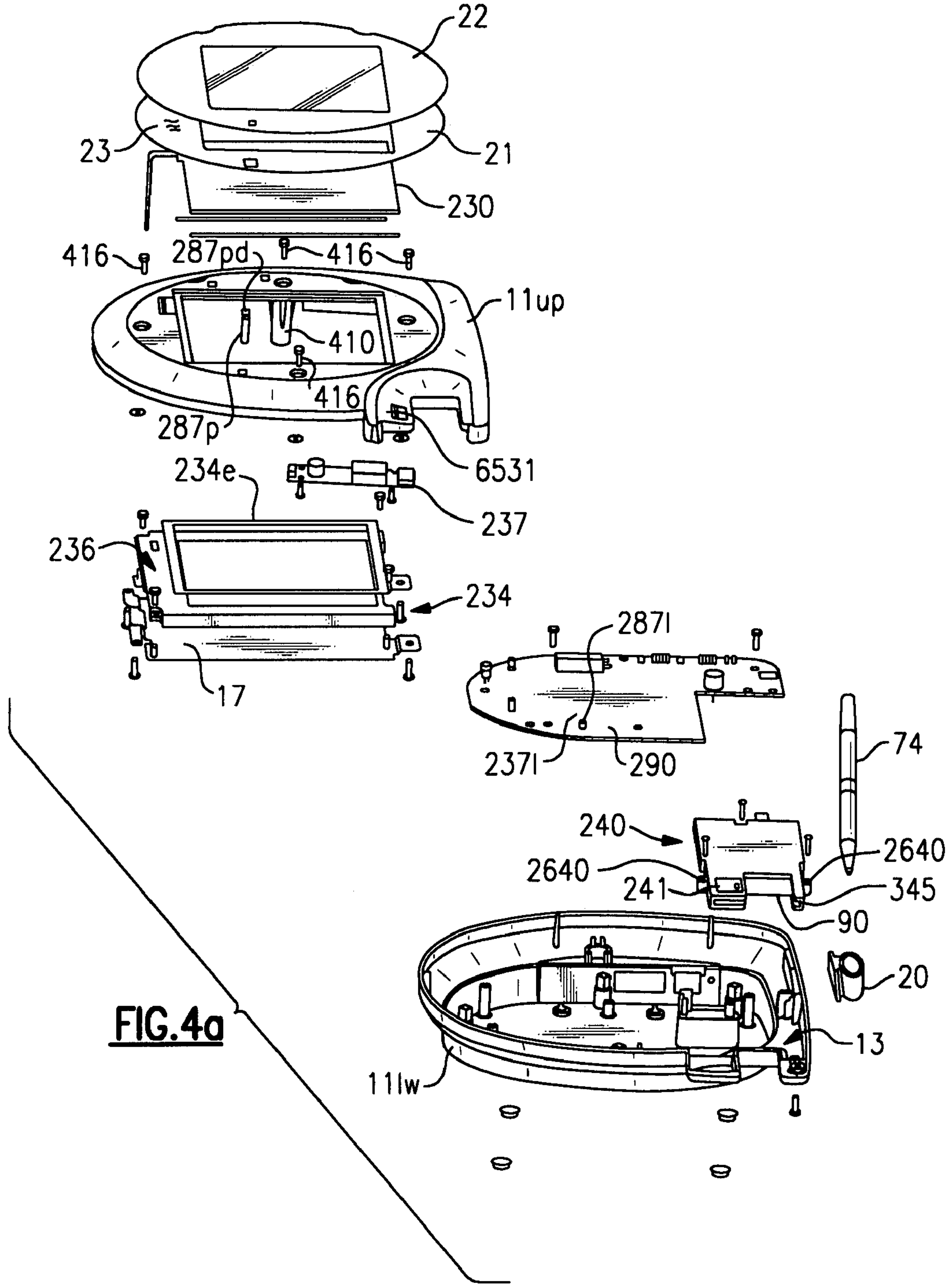
FIG. 4*a* is an assembly diagram for a transaction terminal according to the invention.
Figure 4B:
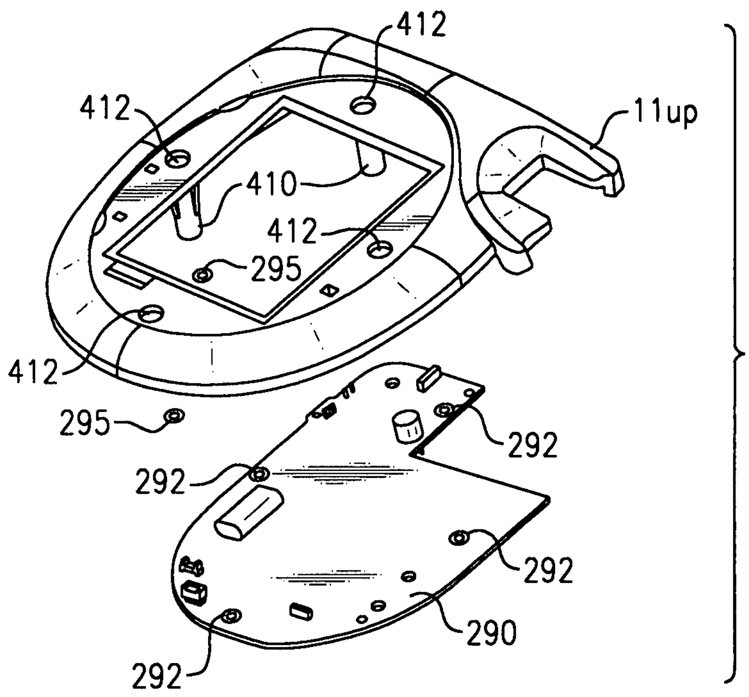
FIGS. 4*b* and 4*c* are detailed assembly diagrams illustrating a break-in detection feature according to the invention.
Figure 4C:
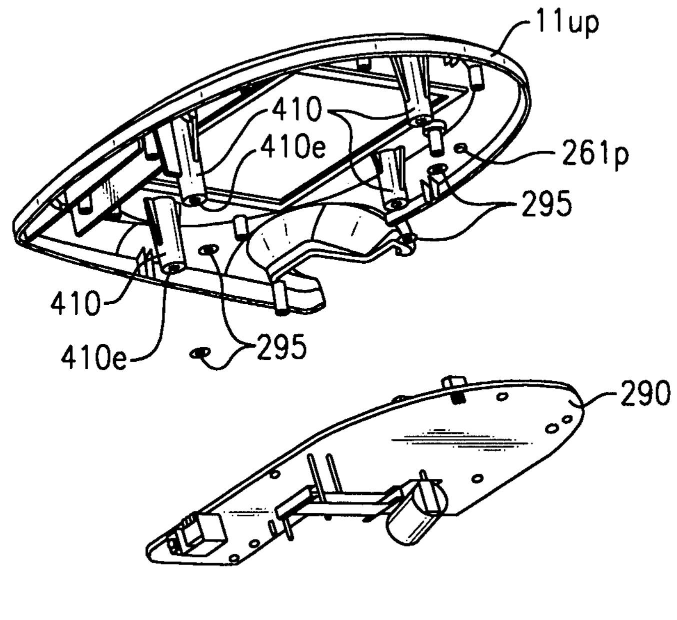
Figure 6A:
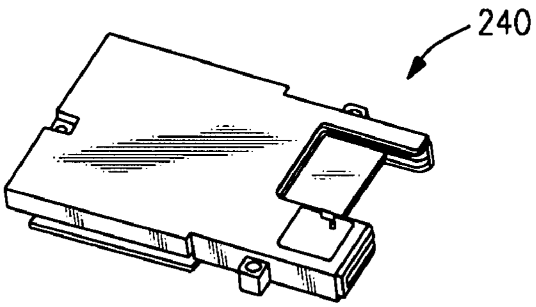
FIGS. 6*a*-6*d* are various perspective views of a hybrid reader unit which may be incorporated in a transaction terminal according to the invention.
Figure 6C:
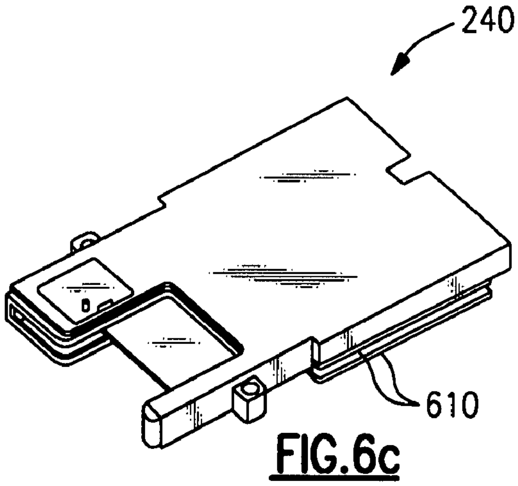
Figure 6D:
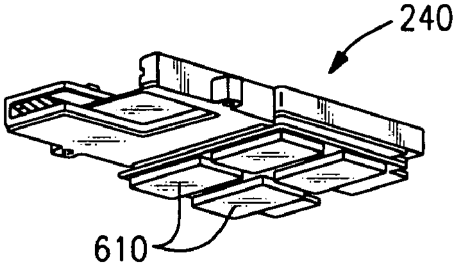
Figure 6B:
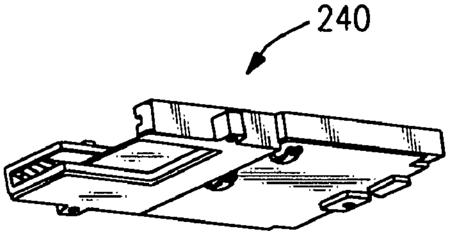
Figure 4D:
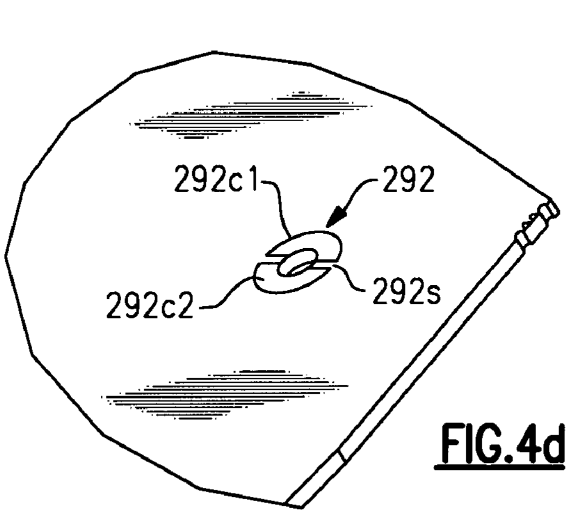
FIG. 4*d* is a partial exploded perspective view of a main PCB of a transaction terminal according to the invention.
Figure 12A:
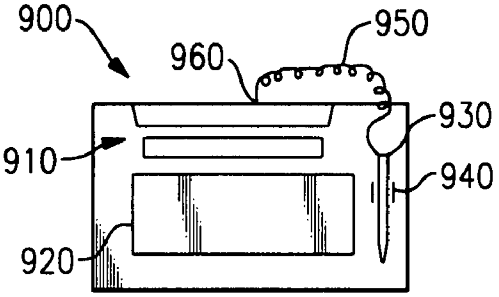
FIG. 12*a* illustrates a prior art transaction terminal.
Figure 4H:
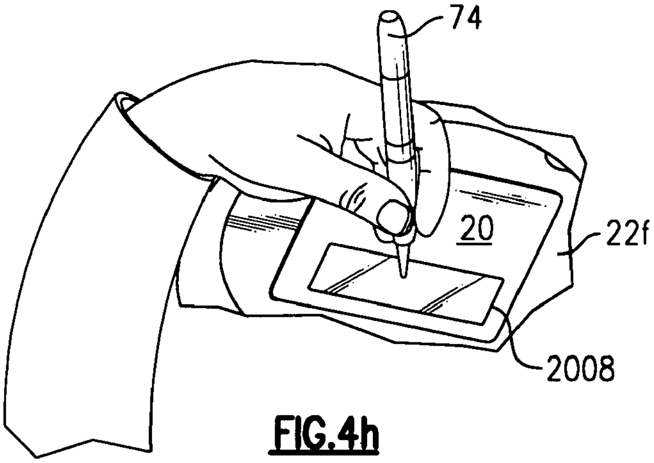
FIG. 4*h* is a perspective view of a left-handed overwriter entering signature data.
Figure 10K:
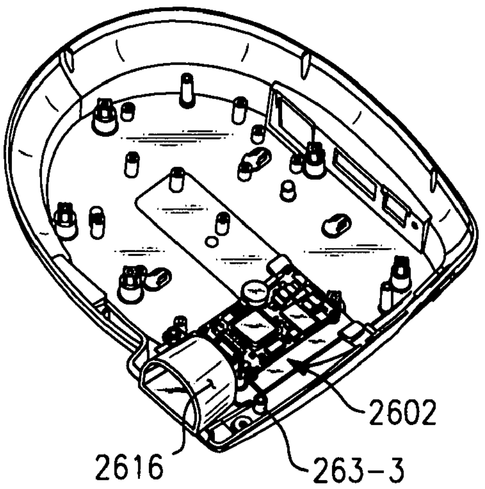

Referring now to FIG. 10*k*, FIG. 10*k* shows an example of imaging module 263, as installed in transaction terminal. In the embodiment of FIG. 10K, imaging module assembly 263 is incorporated in transaction terminal at a location which in the exploded view embodiment of FIG. 4*a* is shown as being occupied by card reader unit 240. In a highly useful embodiment of the invention, transaction terminal housing 11, card reader 240, and imaging module assembly 2602 are configured in complementary fashion so that reader 240 can be removed and replaced with imaging module assembly 2602. Both of reader unit 240 and imaging module assembly 2602 include substantially identically dimensioned mounting wings 2640 and other alignment features. The identically dimensioned mounting wings of reader unit 240 and imaging module assembly 2602 renders the two units 240, 2602 modularly replaceable. Either one of the reader unit 240 or imaging module assembly 2602 can be electrically connected to main circuit board 290, such as, for example via a flex strip. The respective housing of the transaction terminal 10 as shown in FIG. 4*a* and the transaction terminal as shown in FIG. 10L are substantially identical except that the housing 11 of the transaction terminal of FIG. 10L includes a slightly modifies upper member section 11*up*.

In another aspect of imaging module assembly, tubular light pipe section 2608 is preferably sized so that, when imaging module assembly 2602 is installed in a device housing, a first end 2644 of light pipe 2608 is inside of the device housing 11, and a second end 2646 is outside of a device housing 11. In this way, an imaging module 263, which is disposed rearward of light pipe 2608, is assured of having the benefit of the protection provided by the device housing 11, and, at the same time, a part of light pipe outer surface 2616 is assured of being readily visible to a user. The positioning of imaging module 263 within terminal importantly shields optical member 6326 from the direct view of a user. Direct viewing of optical member 6326 may be distracting when LEDS 6316, 6318 are actuated. Preferably, light pipe 2608 should have a length 2650 of at least about 0.25 in. so that imaging module assembly 2602 can easily be installed in such a location that light pipe extends from a position from within a device housing to a position outside of device housing. The tubular shape of light pipe operates to direct light in all directions from LEDs 6316, 6318. The directing of light downward from light pipe can be highly useful in the case, for example, terminal is positioned on a counter top having a shiny metallic surface.

Figure 10L:
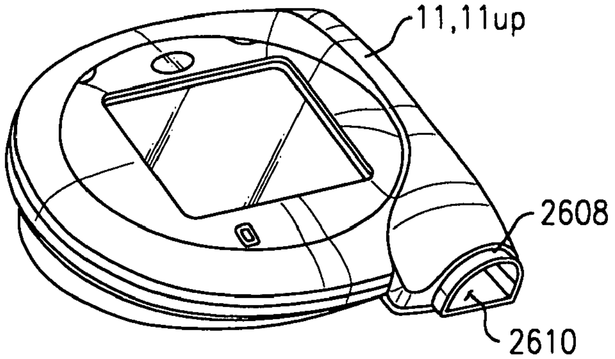
Figure 10M:
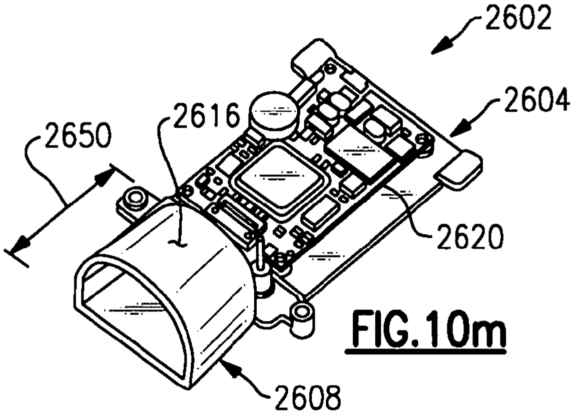
Figure 10N:
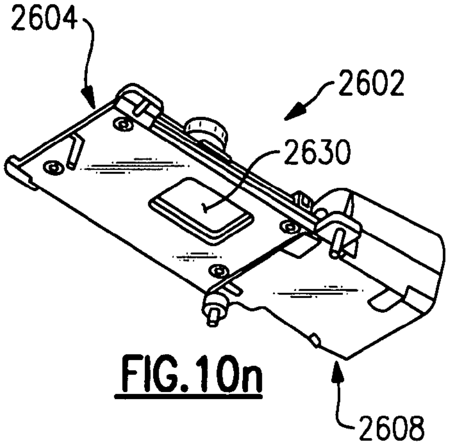
Figure 10O:
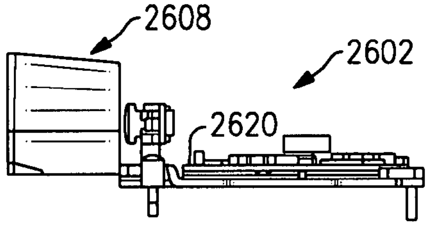
Figure 10Q:
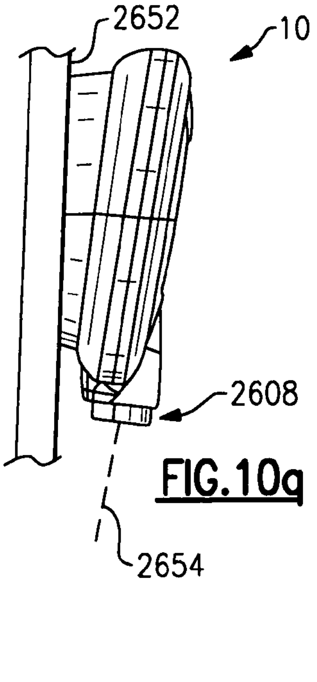
FIG. 10*q* is a side view of the transaction terminal fo FIG. 101 mounted in a vertical operating position.

Further, terminal 10 in the particular embodiment of FIG. 10L is highly useful as a "price verifier." Terminal 10 might be placed on a sales floor of a retail store and may be used by customers to obtain purchase-point information regarding products. Because counter tops are uncommon on sales floors, terminal 10 of FIG. 10L will commonly be mounted vertically on a support beam 2652 or wall, as is indicated in FIG. 10Q when terminal 10 is used as a price verifier. The advantages of protruding light pipe 2608 are readily appreciated in the case terminal 10 is mounted vertically. If terminal 10 is mounted vertically, an imaging axis 2654 of imaging module will directed generally vertically downward. Nevertheless, because of protruding light pipe 2608, light from LEDs 6316, 6318 will cause surface 2616 of light pipe 2608 to luminesce, making the light from LEDs 6316, 6318 visible from virtually any angle. Vertical mounting of the transaction terminal 10 of FIG. 10K as shown in FIG. 10Q including protruding light pipe 2608 allows the location of imaging module 263 on terminal 10 to be readily ascertained from virtually any viewing angle without directing LED light directly toward a user. Transaction terminal 10 may be used in a first horizontal operating position as shown in FIG. 10L or a second vertical operating position as shown in FIG. 10*q*. Imaging module assembly 2602 in the embodiment of FIGS. 10L and 10*q* is positioned so that light emitted by LEDs 6316, 6318 is highly visible yet not distracting in either of the major operating positions. In the vertical operating position, FIG. 10*q*. optical member 6326 is not directly viewed by a user. In the horizontal operating position, FIG. 10L, optical member 6326 is also not directly viewed by a user. It is seen that when in a horizontal operating position, terminal 10 will typically be positioned substantially lower than a user's eye level. Accordingly, a user's view of optical member 6326 is shielded by the recessing of imaging module 263 within terminal housing 11 and the extending of light pipe 2608 from the terminal housing 11.

Figure 10P:
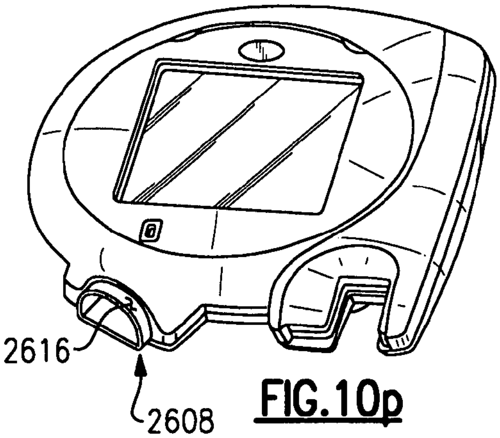
FIG. 10*p* is a perspective view of a transaction terminal including a card reader and a light pipe imaging module assembly.
Figure 11A:
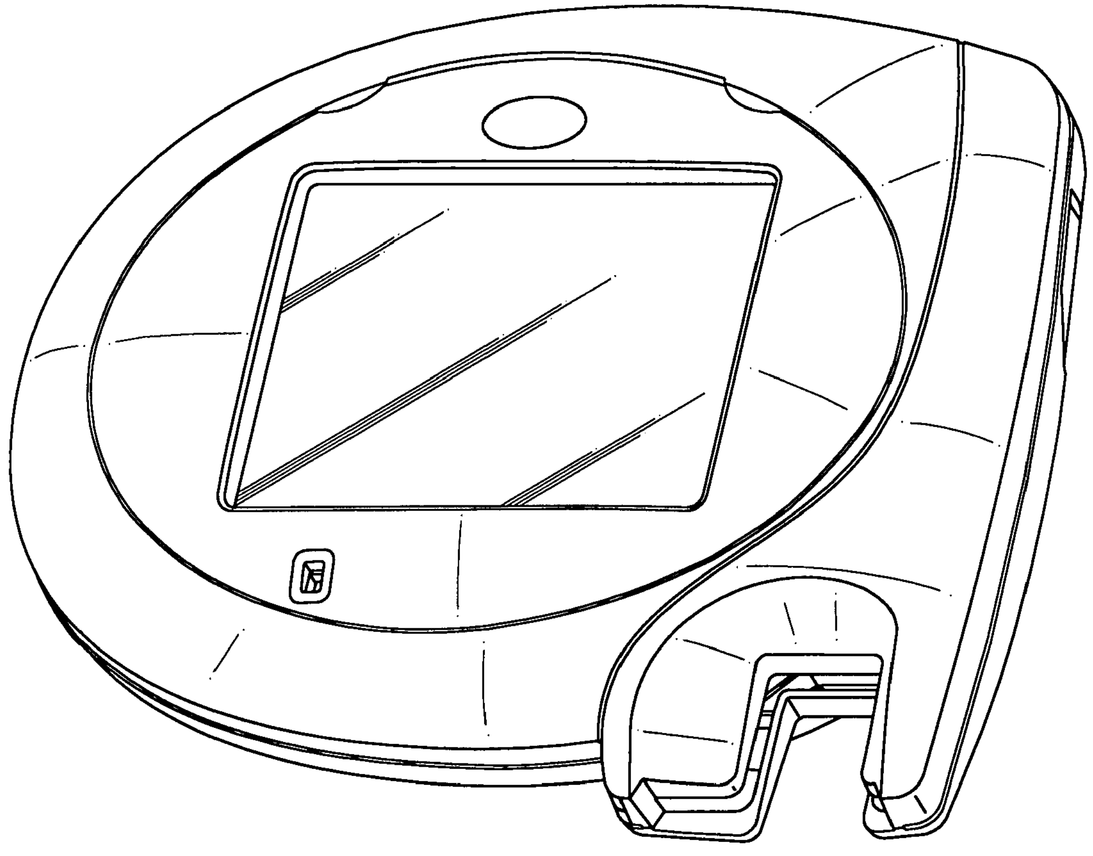
FIGS. 11*a*-11*g* are various additional views of a transaction terminal.
Figure 11B:
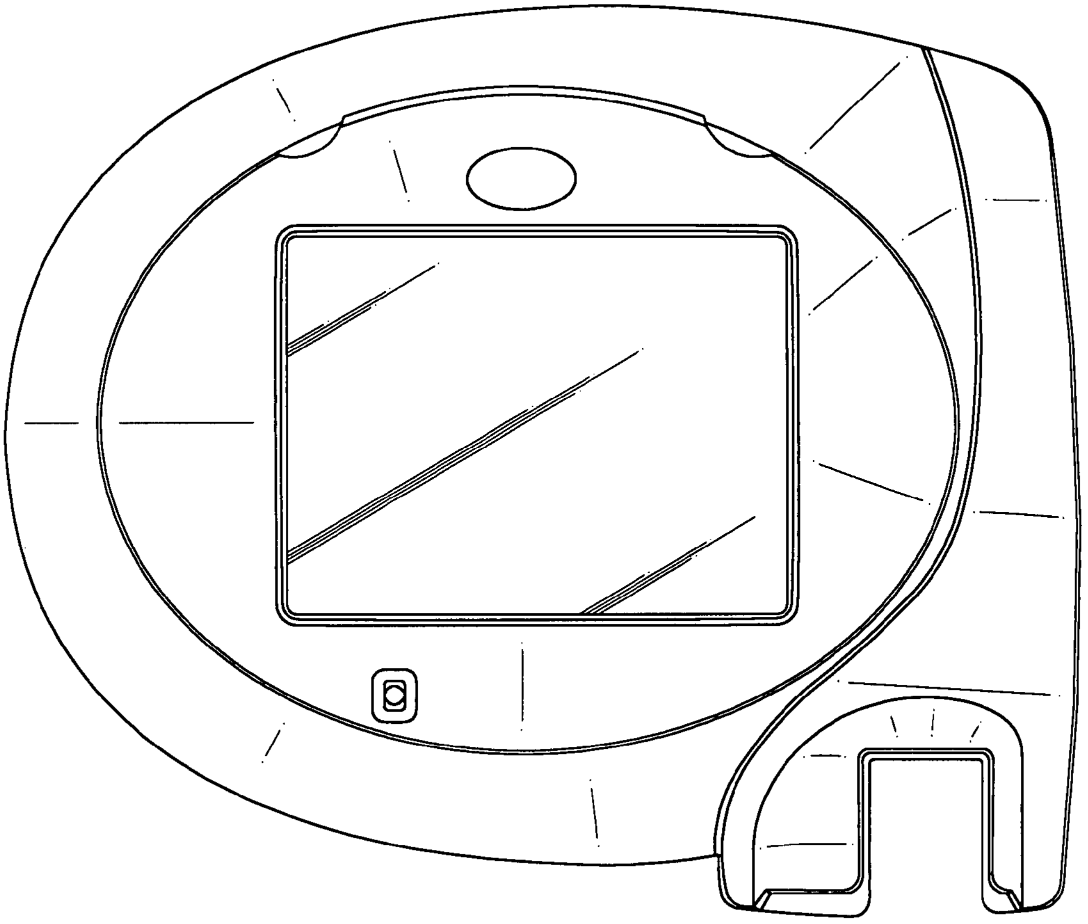
Figure 11C:
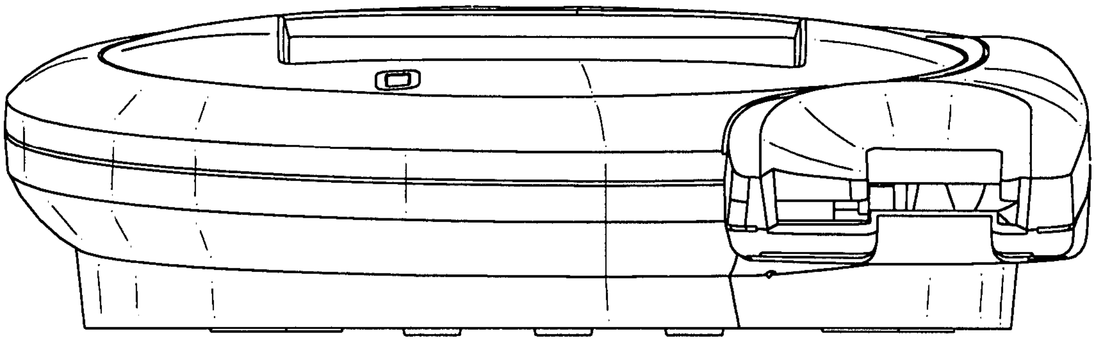
Figure 11D:
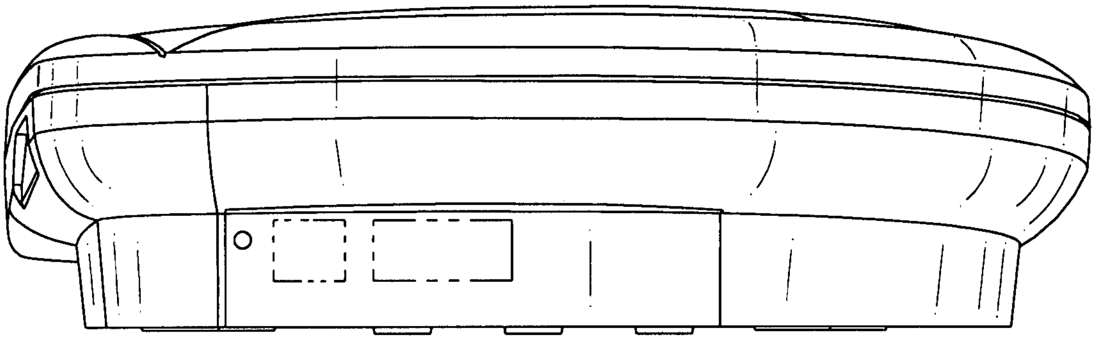
Figure 11E:
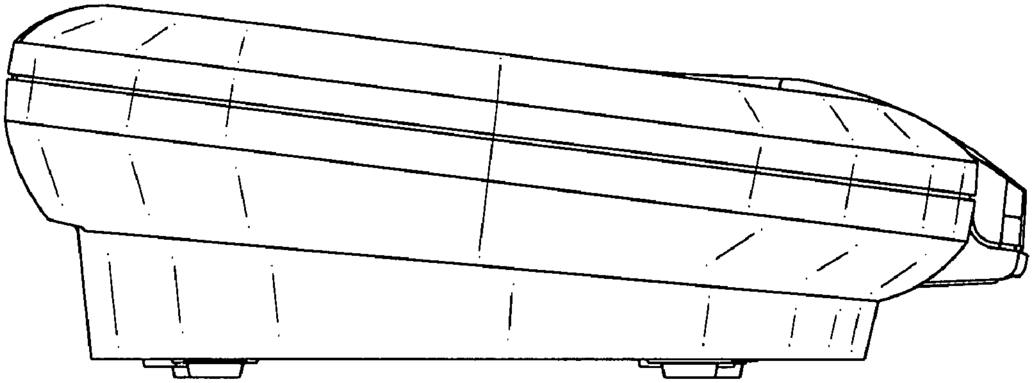
Figure 11F:
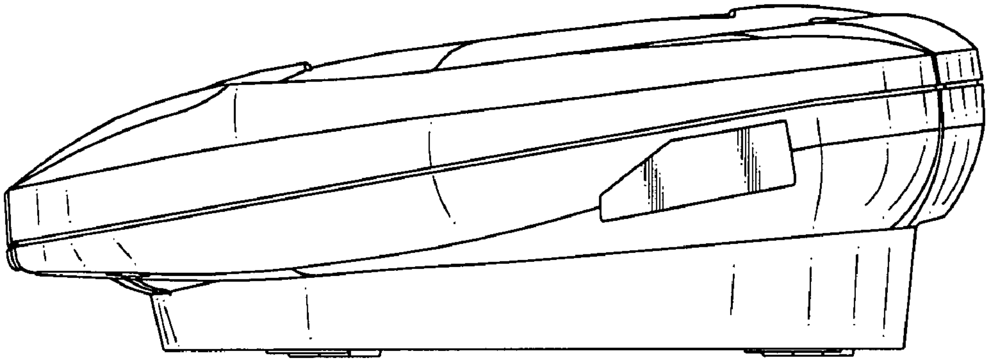
Figure 11G:
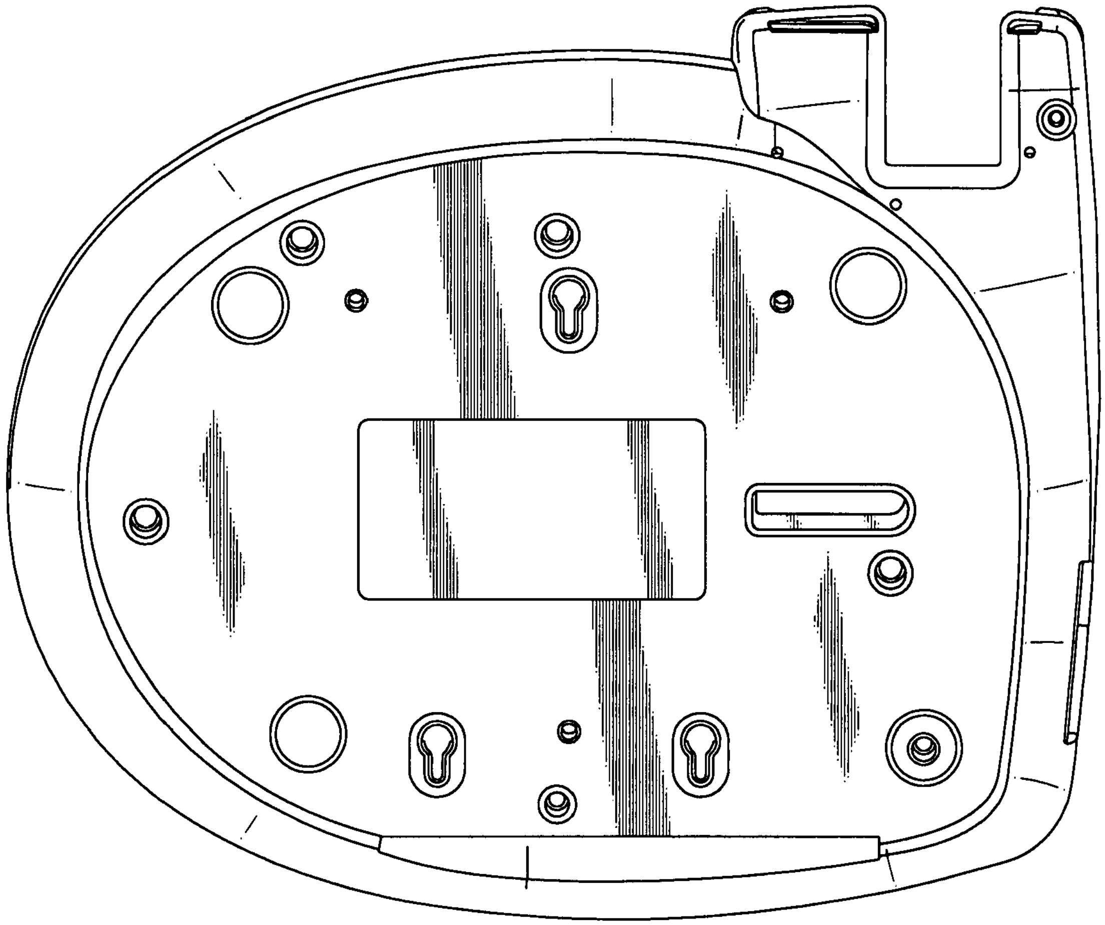

Of course, imaging module assembly 2602 can be installed in positions within transaction terminal 10 other than the position depicted in FIGS. 10K and 10L. In the embodiment of FIG. 10P front imaging module 263-1 in installed in imaging module assembly 2602 and the reader housing 11 is modified to accommodate the installation of imaging module assembly 2602 in the general position of control and decode circuit 264-1 as best seen in FIG. 10B.

It has been mentioned that trigger signal state changes (causing actuation of image capture and decoding operations) can be driven by the sensing of a predetermined condition. In some instances it is preferable that the condition driving a trigger signal state change occur only when a decodable symbol is likely in the field of view of an imaging module 263. For example, in the previously incorporated application Ser. No. 09/432,282, a method is described which changes the state of a trigger signal on the condition that a decodable symbol is likely in a field of view of an imaging module 263, but not on the condition that an object devoid of a decodable symbol is introduced into the field of view of imaging module 263. In some applications, spurious, unnecessary image capturing and decode attempts accompanied by actuation of LEDs (sometimes refereed to as "flickering" or "strobing" of LEDs) are considered potentially distracting.

In the embodiment of FIG. 10L, however, in which light pipe 2608 extends forwardly from transaction terminal 10, transaction terminal 10 is preferably configured so that moving of substantially any object (e.g a human body, a hand, a product) including or not including a decodable symbol drives a state change of trigger signal. As discussed previously, a state change of a trigger signal causes actuation of imaging module LEDs 6316, 6318 and commencement of image capturing and decoding operations. Particularly in the embodiment of FIG. 10L, wherein imaging module 263 is disposed in association with luminescent light pipe 2608 protruding from device housing 11, the actuation of LEDs 6316, 6318 draws attention to the transaction terminal as a whole and particularly the area of transaction terminal 10 proximate imaging module 263. A user is thereby given a positive indication not only that transaction terminal can read decodable symbols, but also an indication as to where a symbol may be placed for reading. Control Circuit 210 can be confirmed so that the actuation of LEDs 6316, 6318 is accompanied by a prompt message being displayed on display 20. For example at the time a trigger signal state change actuates LEDs 6316, 6318 to call attention to transaction terminal 10, control circuit 210 may display 20 on display an appropriate prompt message, e.g. "TERMINAL READY FOR PRICE VERIFICATION" or a similar prompt message, e.g. "PLACE PRODUCT UPC SYMBOL UNDER LIGHT TO LEARN MORE ABOUT PRODUCT", whereupon information respecting the product may be displayed.

In one embodiment, a motion detector device can be disposed in communication with control circuit 210 for changing the state of a trigger signal on the condition an object is moved through a certain position proximate terminal 10. The motion detector's image sensing unit 2660 can be incorporated in terminal 10 or at a location proximate terminal 10 not integral with terminal 10.

In one embodiment, however, terminal 10 is configured so that image sensor 6332 of imaging module 263 serves as the image sensing unit of a motion detector that changes the state of a trigger signal. Imaging module 263 can be controlled by control and decode circuit 264-3 (the function of which may be entirely incorporated in control circuit 210) to operate in a low power mode in which control and decode circuit 264-3, without LEDs 6316, 6318 being actuated, captures successive frames of image data and evaluates the frames for change over time, to determine if an object has moved into a field of view of module 263. If control circuit 264-3, 210 determines that an object has been moved into a field off view of module 263, control circuit 264-3, 210 changes a state of a trigger signal to actuate imaging module LEDs 6316, 6318 and to commence image capturing and decode operations. As indication, the attention of a user to terminal 10 will be attracted when LEDs 6316, 6318 are actuated.

Numerous types of motion detector software programs are commercially available which may be loaded into an associated memory of control circuit 264-3, 210 so that control circuit 264 in combination with imaging module 263 operates as a motion detector. Examples of commercially available motion detector software packages include GOTCHA! available from the website gotchanow.com, software packages available from TELCON, inc., software packages available from BITCRAFT, DIGIWATCHER available at digiwatcher-.com, DIGITALRADAR available from Connectix, Inc. DELTAVIDEO available from Channel D, and VIDEOTIZER LT http://www.gotchanow.com It will be appreciated that significant functionality is added to terminal 10 when terminal is equipped with an optical reader such as modules 263-1 and 263-2. When terminal 10 includes a 2D reader control circuit 210 can store frames of image data into memory e.g. memory 216*f*. Optical reader module 263 can be controlled for use in capturing frames of image data comprising handwritten signatures. If control circuit 210 determines that a signature capture mode using touch screen 20 fails, control circuit 210 may display a prompt prompting a user to dispose a signature bearing substrate in the field of view of imaging assembly 263. Circuit 210 may further display on screen 20 a button for actuating image capture, then capture a signature when a user actuates a control button. By storing the image representation including a signature representation into memory 216. The symbol decoding functionality of reader unit including module 263 coupled with the image capture functionality of module 263 renders terminal 10 operable to execute numerous types of user-interactive methods which are useful for fraud prevention and other purposes. U.S. Ser. No. 09/788,179, entitled "Identification Card Reader" filed Feb. 16, 2001, and assigned to the assignee of the present invention describes numerous methods for determining whether a card holder is the person he purports to be utilizing an optical reader having image capture and decode capability and numerous other methods relating to identification and fraud prevention. Applicants hereby expressly incorporate herein U.S. Ser. No. 09/788,179 in its entirety by reference. It is seen from FIG. 1*q* that terminal 10 may include a card holding tray 19 for holding an identification card in the field of view of module 263 such as the identification card reader card holder described in detail in the above mentioned U.S. Ser. No. 09/788,179 application.

Still further, control circuit 210 may be in communication with a fingerprint scanner unit having a scanner 265 including an active surface referred to as a sensor 265*s* (FIGS. 1L and 1*m*) and associated control circuitry 266. A fingerprint scan unit may be provided by, for example, by a Bioscrypt, Inc. OEM module fingerprint scan unit, a BERGDATA OEM module fingerprint scan unit or an ULTRA SCAN Corp. Series 400 OEM Fingerprint Scan unit. Transaction terminal 10 may capture an electronic fingerprint representation and send the electronic fingerprint representation to a non-integral computer system such as a computer system of Network 380, and Network 380 may perform the identification. Also Network 380 may periodically download a database of relevant electronic fingerprint authorizations for use by control circuit 210 in performing fingerprint identification functions. Transaction terminals according to the invention comprising integrated fingerprint scanning units are shown in FIGS. 1L, 1*m*, and 1*q*. Scanner 265 may include finger receiving recess 265*r* integrally formed in housing 11. Scanner sensor 265*s* may be disposed under a window formed in bottom surface of recess 265*f*. The window can be considered part of the scanner sensor. A fingerprint scanning unit according to the invention can also comprise an insert-style finger scanning unit.

Transaction terminal 10 can also include a retinal scan unit including scanner 267 associated with control circuit 268. A scan unit including scanner 267 and control circuit 268 may be provided by components from an Icam 2001 retina scan unit available from Eye Dentify Corp. Control circuit 210 may perform identifications based on captured retinal scan signatures by transmitting captured electronic retinal signatures to a nonintegrated computer system for identification, e.g. to Network 380, or by downloading a database of signatures from e.g. Network 380 for identification by circuit 210. A retinal scanning transaction terminal 10 is shown in FIGS. 1*m*, 1*p*, and 1*q* showing a terminal having a retinal scanner 267 including a retinal scanner eyepiece 267*e* integrally formed in terminal housing 11.

Transaction terminal 10 further includes a touch pad screen 20 including a display 234 and a touch pad overlay 230. Touch pad screen or "touch screen" 20 displays information to a user such as prompt information, a virtual keypad, and advertising messages, etc. Touch screen 20 also serves as a means to input data. Touch screen 20 serves as both a virtual keypad and signature capture platform. Touch pad screen 20 may comprise an LCD display 234 in combination with a touch screen overlay 230. Display 234, e.g. may be a 5.7", ¼ VGA (320×240) resolution color or monochrome LCD screen of the type available from Nan Ya Corporation. Display 334 may be driven by an on-chip LCD controller available on a microchip including circuit CPU 212 if circuit is appropriately selected, or in association with dedicated control circuit 235 as shown in FIG. 2*a*. Referring to assembly view of FIG. 4*a* LCD display 234 may be mounted on LCD bracket 17 which is mounted to housing lower section 11LW.

Touch screen overlay 230 may be, for example, a Nissa NIS/RC-872 overlay with parallel interface. Touch screen overlay 230 typically operates in association with touch screen controller 231. Touch screen control circuit 231, like LCD circuit 235 can be integrated in an IC comprising elements of control circuit 210. In the embodiment shown in assembly view FIG. 4*a*, display 234 includes a side-mounted back light unit 236. For increasing the uniformity of illumination, display 234 could include a top-mounted backlight 236 which would occupy positions along top edge 234*e* of display 234. Display 234 is disposed in housing 11 so that the side mounted back light unit 236 is housed in terminal 10 on a side of terminal 10 opposite reader unit 240. Increasing the distance between backlight unit 236 and mag stripe reader 241 reduces the effect of electromagnetic interference from backlight unit 236. In the specific embodiment described, backlight unit 236 is powered by inverter 237 which converts DC power output by power system 238 into high voltage AC power for powering backlight 236.

Figure 8A:
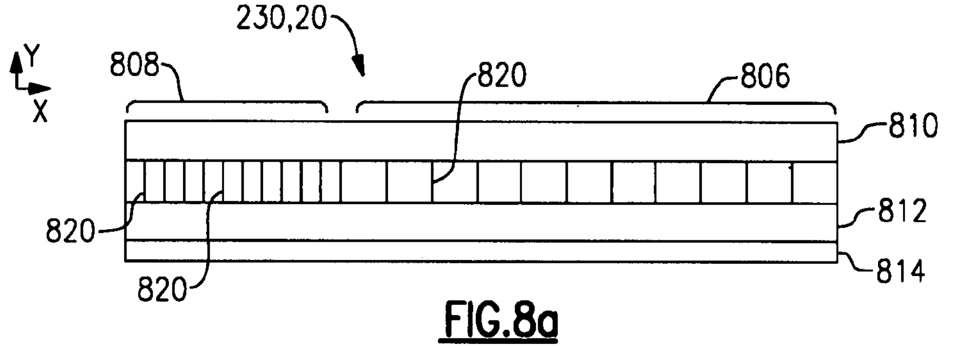
FIGS. 8*a*-8*b* are function lay-out diagrams of a touch screen overlay.
Figure 8B:
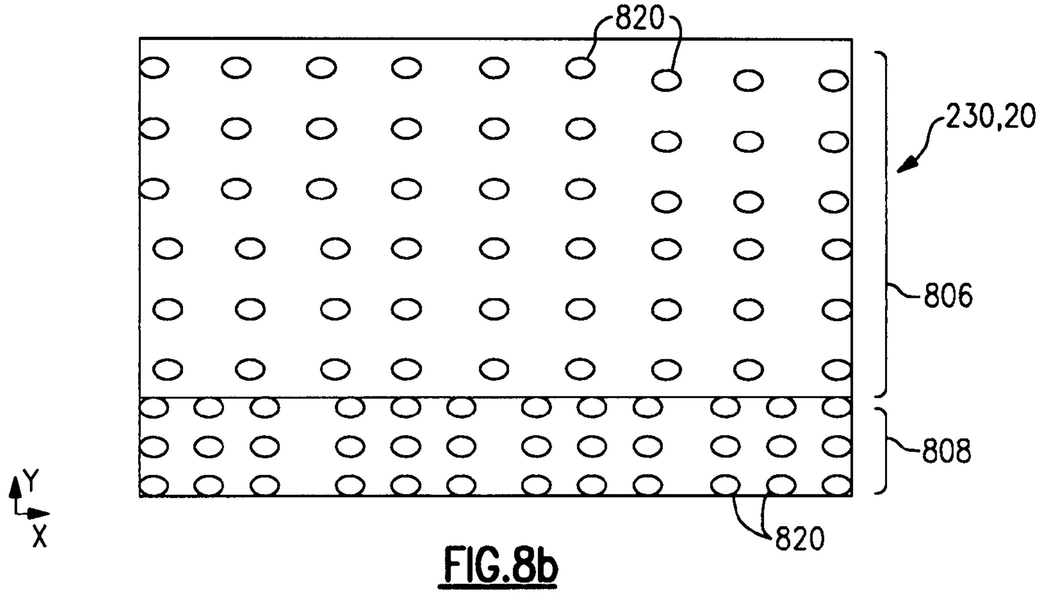
Figure 3H:
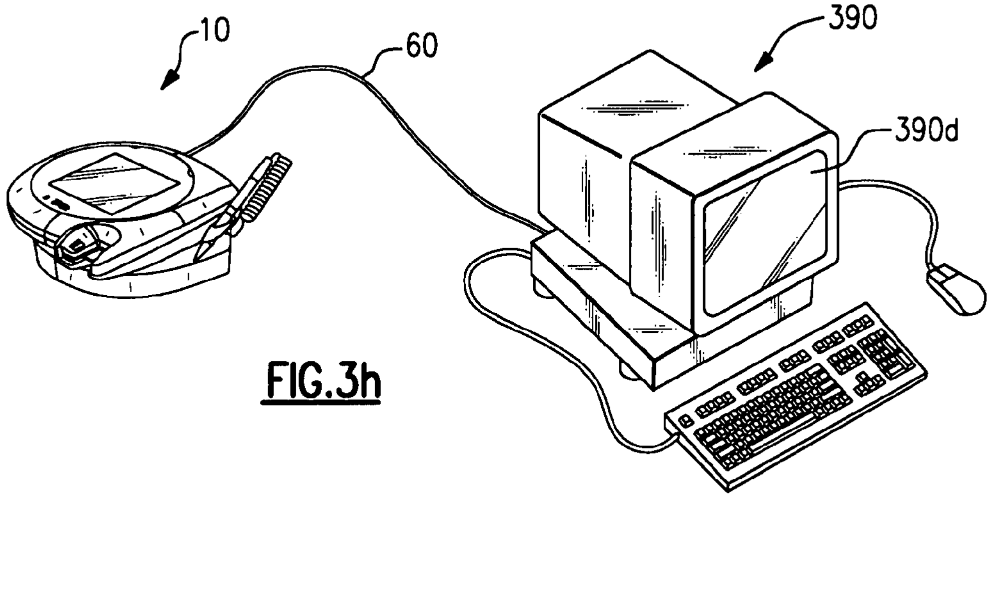
FIG. 3*h* shows another embodiment of a system having a transaction terminal.

As shown in FIGS. 8*a* and 8*b* and in accordance with a further aspect of the invention, touch screen 20 and more specifically overlay 230 of touch screen 20 may be configured to be divided into zones 806 and 808, wherein zone 808 is optimized for stylus data entry and zone 806 is optimized for entry of information by actuation by a user's finger. Overlay 230 as best seen in a conceptual schematic diagram of FIG. 8*a* comprises a series of layers 810, 812, and 814, which vary in number depending on the selection (make and model number) of touch screen overlay 230. Touch screen overlay 230 includes a top layer 810, which, as will be described, preferably comprises a single uniform sheet of light transmissive material.

The inventors found that the optimal configuration for touch screen overly 230 varies depending on the intended actuation mechanism for touch screen 20. In certain applications, touch screens are designated for actuation by a finger, in other application stylus 74 and in other applications, such as in terminal 10, both. Touch screen overlays comprise support mechanisms known as "microdots" 820 which are interposed between two layers of overlay 230 as best seen in FIG. 8*a*. The inventors found that the positioning of microdots 820 which optimizes overlay 230 for receipt of finger-entered data is not the same positioning which optimizes overlay 230 for stylus-entered data. Notably, the inventors found that in order to optimize touch screen 20 for finger-entered information, microdots 820 should be spaced to a larger average spacing distance than in a touch screen optimized for stylus-entered data.

In the invention described with reference to FIGS. 8*a* and 8*b* touch screen 20 is divided into two zones, a finger entry zone 806 and a stylus entry zone 808. Preferably stylus entry zone 808 is located forwardly of finger entry zone 806 in terminal 10 as seen in FIG. 8*b* so that a user can readily view a virtual keyboard displayed in finger actuated zone 806, or other display messages of touch screen 20 in zone 806 while entering signature information into stylus entry zone 808. In finger actuation entry zone 806, as shown by FIGS. 8*a* and 8*b*, microdots 820 are spaced to an average spacing distance that is larger than in stylus entry zone 808, wherein microdots 820 are spaced closer together than in zone 806.

Preferably, the remaining characteristics of overlay 230 remain as they would have been in the absence of the described microdot spacing variation. That is, layers 810, 812, and 814 of touch screen overlay 230 remain single unitary sheets of light transmissive material. Zones 806 and 808 could also comprise separate and x-y dimension spaced apart sections of layering material. However, such a configuration, among other disadvantages would not allow a person entering signature information to exceed the bounds of signature zone during the course of entering signature data and still have the signature data received.

Prior to the invention shown and described with reference to FIGS. 8*a* and 8*b*, touch screen overlays 230, sometimes referred to as "panels" were known to be available only in configurations having uniform "dot pitches", or "resolutions".

Commercially available "high resolution" or "fine pitch" touch screen overlays 230, such as are exemplified by a Nissha RTC-A1 touch screen overlay, are configured to receive inputted data substantially only via stylus 74. High resolution touch screens require a substantially concentrated point contact by an input source for registration of data entry. Accordingly, high resolution touch screens having high resolution touch screen overlays generally do not register data when a user attempts to enter data by finger contact.

"Low resolution" or "course pitch" touch screen overlays 230, such as are exemplified by a Fujitsu N010-0518-T401 register data entry either by a stylus 74 or by a finger. A problem with use of low resolution touch screens, however, is that such touch screen 20 sometimes erroneously registers unwanted data. For example, as described hereinabove, if a user unintentionally contacts low resolution touch screen 20 with a finger or another part of her hand during the signature entry process, a low resolution touch screen 20 may erroneously register a data entry. The problem of erroneous data entry with use of a low resolution touch screen can be substantially reduced by configuring terminal 10 to include a raised surface at least along one edge of terminal 10 bordering touch screen 20, as described herein relative to FIG. 4*e*-4*k*. Nevertheless, problems of erroneous data entry may persist. The combination of a high resolution touch screen overlay and a display is referred to herein as a "high resolution touch screen". The combination of a low resolution touch screen overlay and a display is referred to here as a "low resolution touch screen".

In accordance with another aspect of the invention, control circuit 210 may be configured to execute a signature data entry program which monitors data received from touch screen 20 to determine if data is entered outside of a signature entry are 2008 (see FIG. 4*g*) of touch screen 20 during the course or receiving signature data. If a control circuit 210 determines that data is received from outside a signature entry area 2008, control circuit 210 displays a prompt message which prompts a user to maintain her entry of data to a signature area 2008. The user then completes the signature entry process, and terminal 10 can capture a complete or substantially complete signature in spite of receiving some data outside of area 2008.

A flow diagram illustrating operation of a signature entry feature is described with reference to the flow diagram of FIG. 4*m*. At block 2030 control circuit 210 displays on touch screen 20 a signature capture screen 2002 as shown in FIG. 4*g*. Signature capture screen 2002 includes a signature entry area 2008 and text messages including "PLEASE SIGN HERE", "CLEAR" and "DONE", 2010, 2012, and 2014. The CLEAR and DONE text messages 2012 and 2014, respectively, are control buttons which are actuated by finger or stylus contacting of the displayed messages. If a user presses CLEAR button 2012 control circuit 210 stops display of the signature entry screen 2002 and reverts to a previous operating mode or erases from display 20 data corresponding to signature data entered prior to the time clear button 2012 is actuated. When a user has completed entry of a signature, a user presses DONE button 2014. Touch screen overlay 230 of touch screen 20 continuously reports to control circuit 210 the X,Y coordinates of data point entries made into touch screen 20.

Figure 4N:
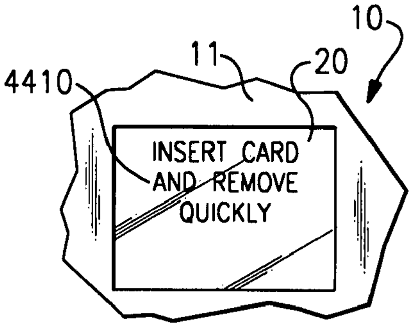
FIG. 4*n* is a top view of a transaction terminal in a card reading mode.
Figure 4I:
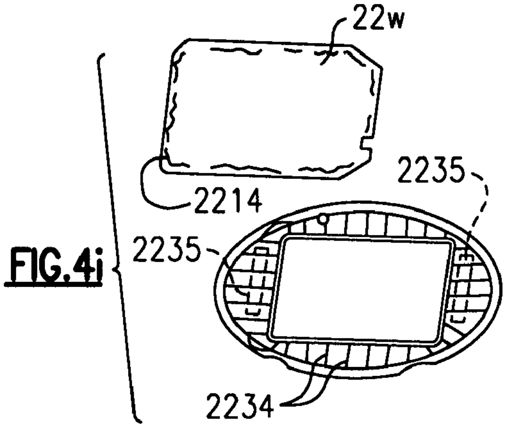
FIG. 4*i* is a bottom view of a transaction terminal including a replaceable window.
Figure 4J:
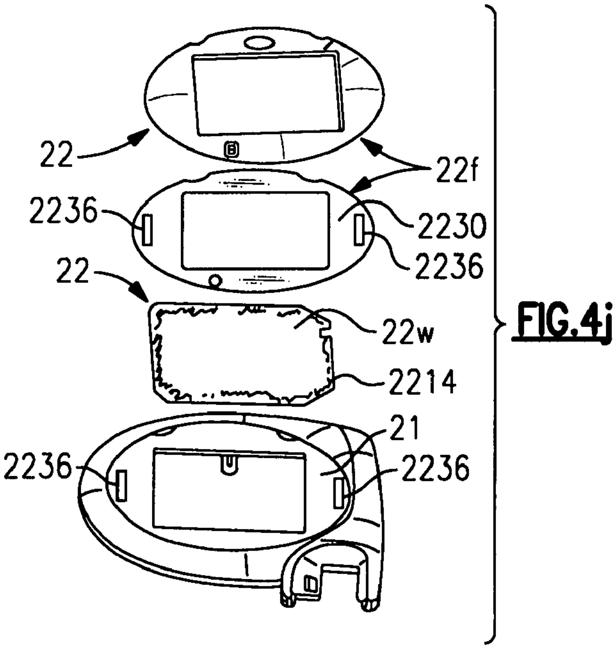
FIG. 4*j* is a top assembly view of a transaction terminal including a replaceable window.
Figure 4K:
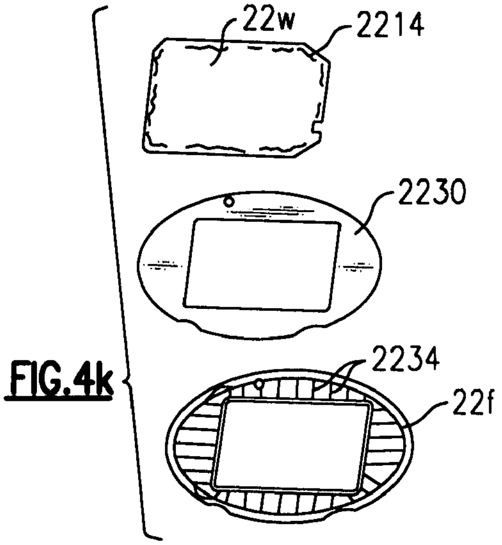
FIG. 4*k* is a bottom assembly view of a transaction terminal including a replaceable window.
Figure 4M:
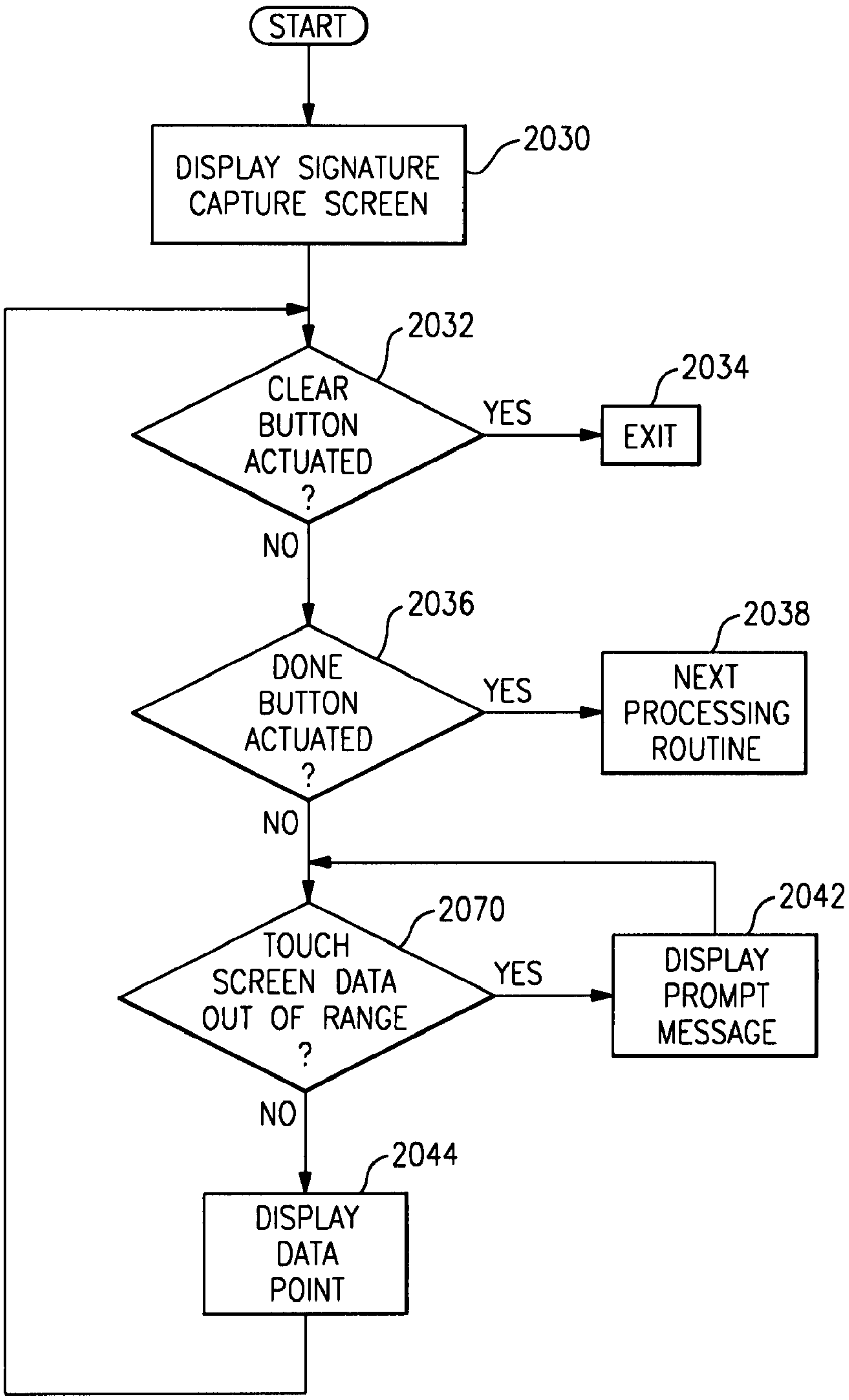
FIG. 4*m* is a flow diagram illustrating operation of transaction terminal during signature entry mode of operation.
Figure 5A:
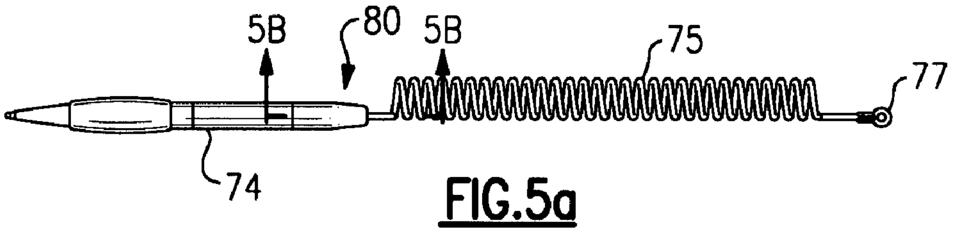
FIG. 5*a* is a side view of an stylus and cord according to the invention.
Figure 5B:
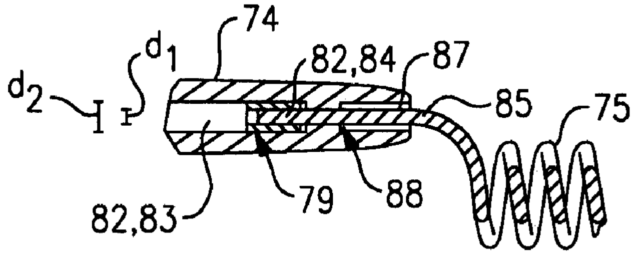
FIG. 5*b* is a cutaway partial side view of the stylus shown in FIG. 5*a;*
Figure 5C:
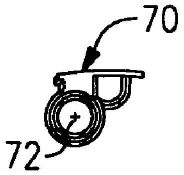
FIGS. 5*c,* 5*d,* and 5*f* are perspective views of a stylus holder assembly according to the invention.
Figure 5D:
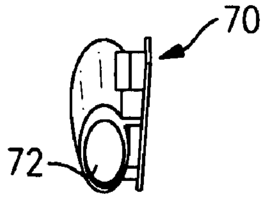
FIG. 5*e* is a side view of a holder assembly according to the invention.
Figure 5E:
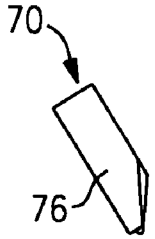
Figure 5F:
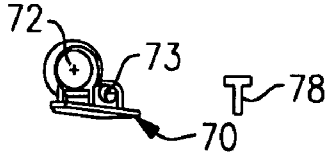
Figure 7D:
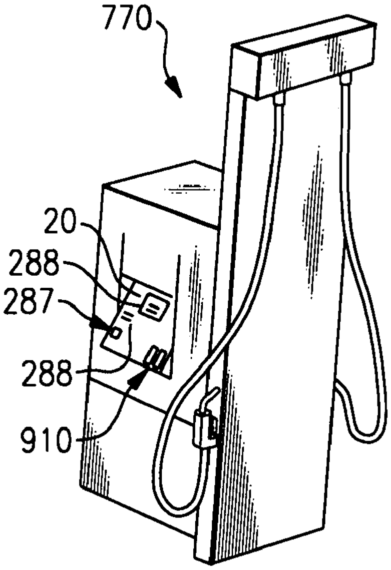
FIGS. 7*d*-7*g* are perspective views of alternative apparatuses in which a security feature can be incorporated.
Figure 7E:
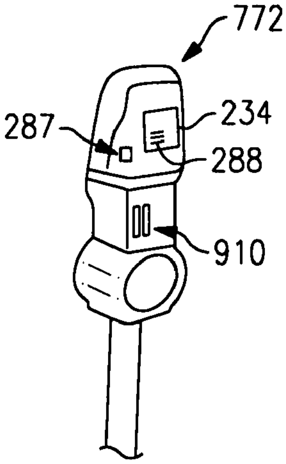
Figure 7F:
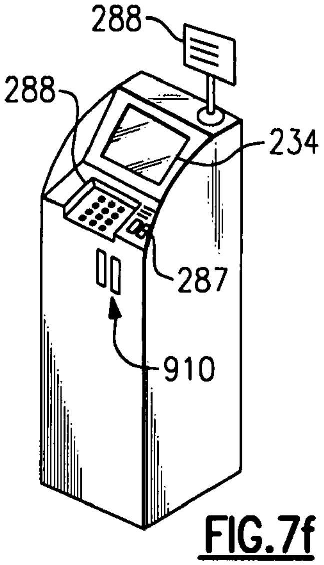
Figure 7G:
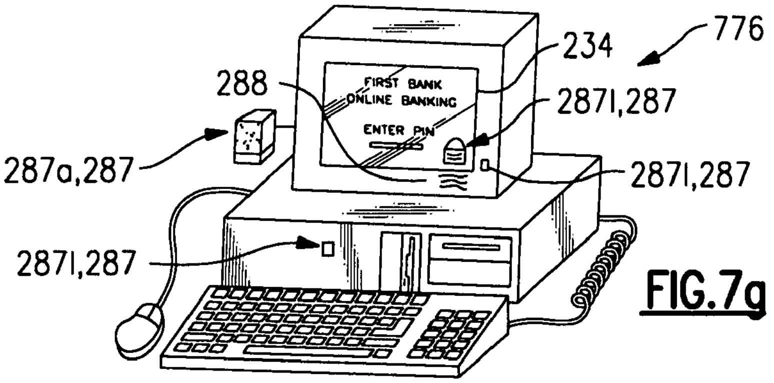
Figure 7H:
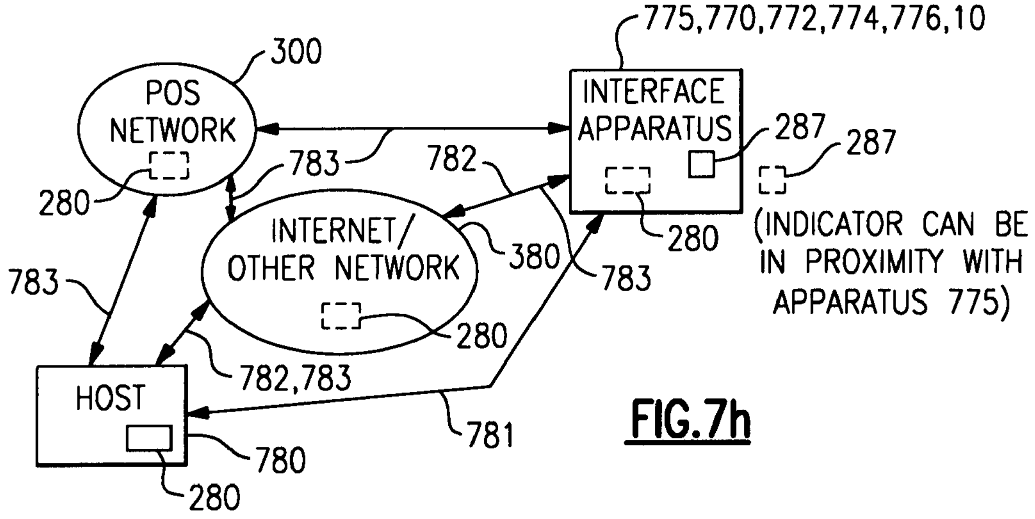
FIG. 7*h* is a network diagram illustrating incorporation of a security feature in one embodiment.
Figure 9A:
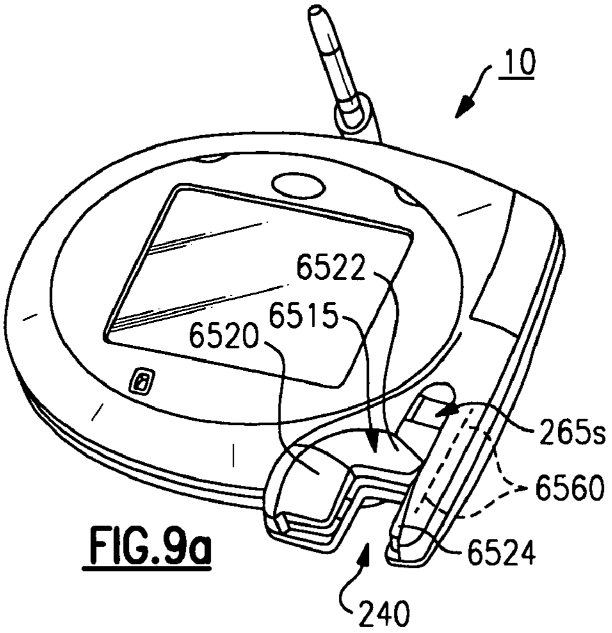
FIGS. 9*a*-9*b* are perspective views of a transaction terminal including an elongated finger recess.
Figure 9B:
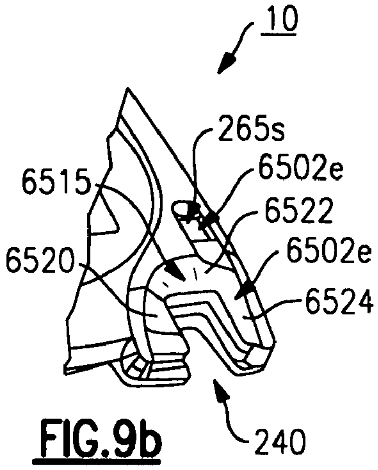
Figure 9C:
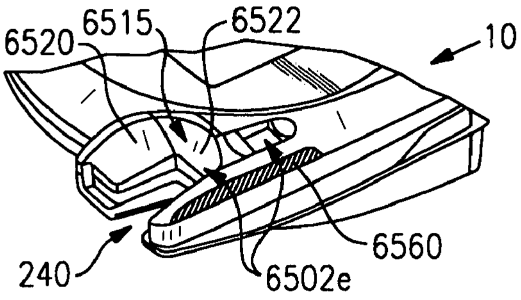
FIG. 9*c* is a perspective view of a transaction terminal including a finger recess and an outer surface region including printed matter.
Figure 9D:
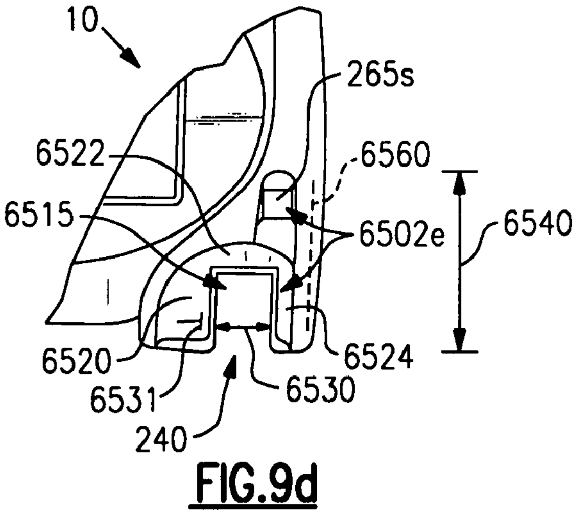
FIG. 9*d* is a top view of a transaction terminal including an elongated finger recess.
Figure 9E:
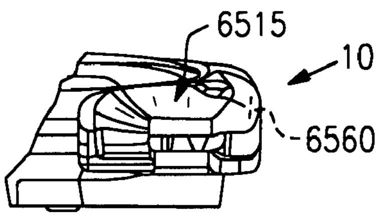
FIG. 9*e* is a front view of a transaction terminal including an elongated finger recess.
Figure 9F:
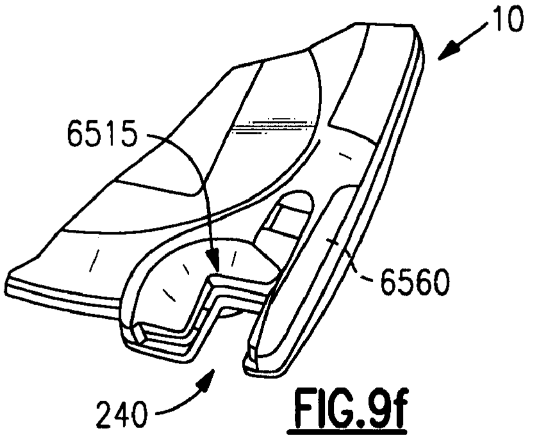
FIG. 9*f* is a perspective view of a transaction terminal including an elongated finger recess and a middle finger recess.
Figure 12B:
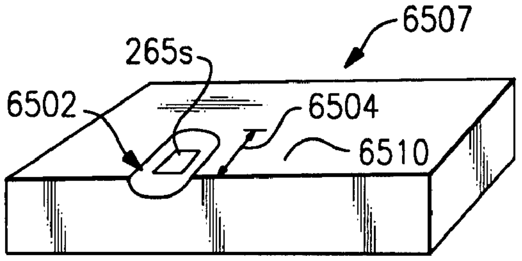
FIG.12b Prior Art
FIG. 12*b* is a perspective view of a prior art finger recess incorporated in a fingerprint scanning device of the prior art.
Figure 9H:
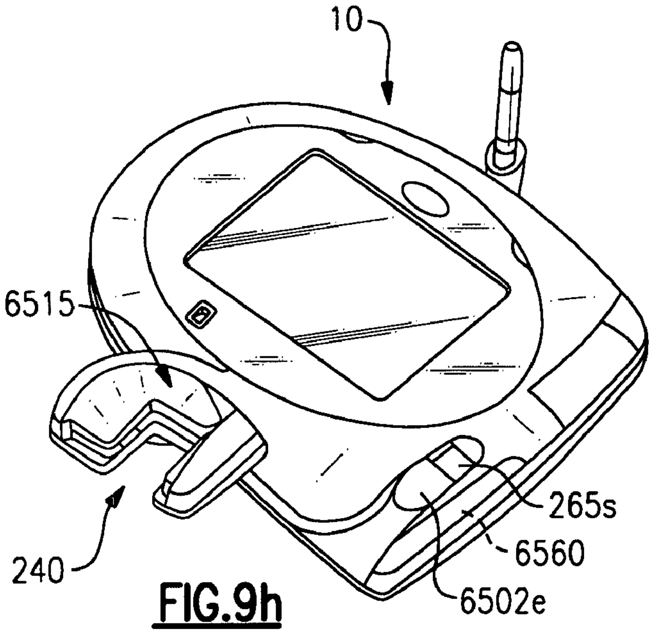
FIG. 9*h* is a perspective view of a transaction terminal having a spaced apart card cavity and elongated finger recess.
Figure 9G:
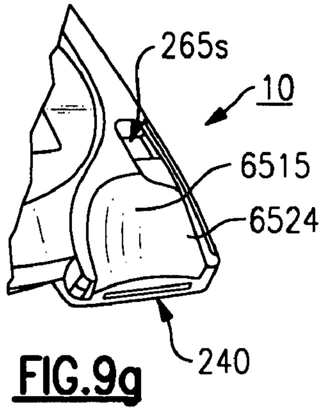
FIG. 9*g* is a perspective view of a transaction terminal and a finger recess formed integrally with a card cavity that is devoid of a card cutout section.
Figure 12C:
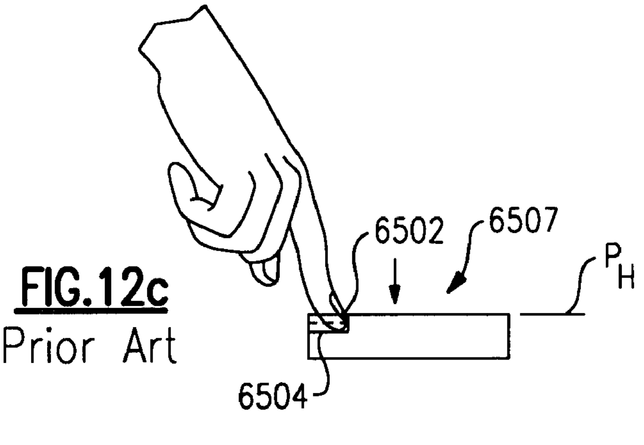
FIG.12c Prior Art
FIG. 12*c* is a side view of a prior art finger recess incorporated in a fingerprint scanning device of the prior art.
Figure 9M:
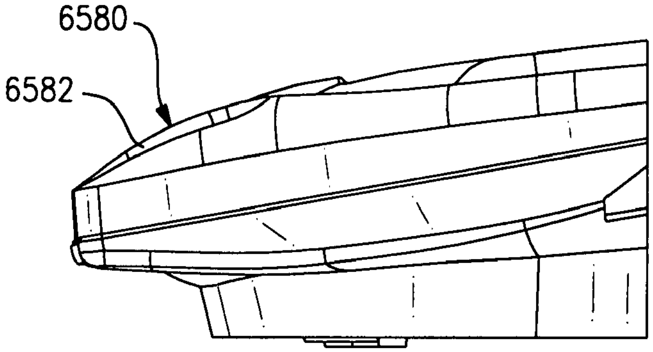
FIG. 9*m* is a side view of a transaction terminal having an apex ridge.
Figure 9L:
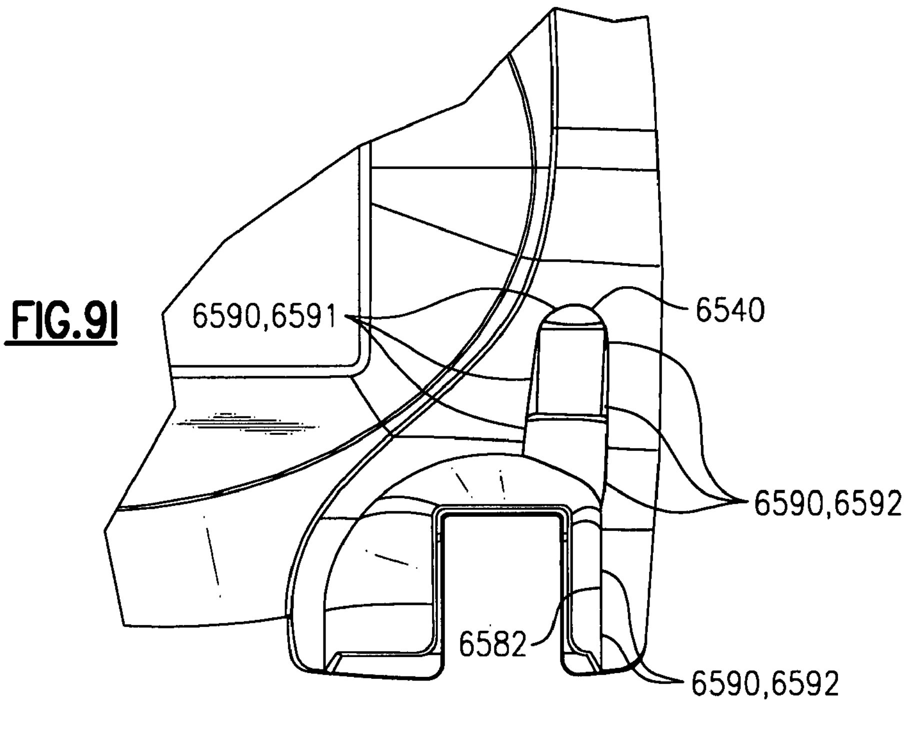
FIG. 9*l* is a top view of a transaction terminal having an elongated border outline thereof labeled.
Figure 9I:
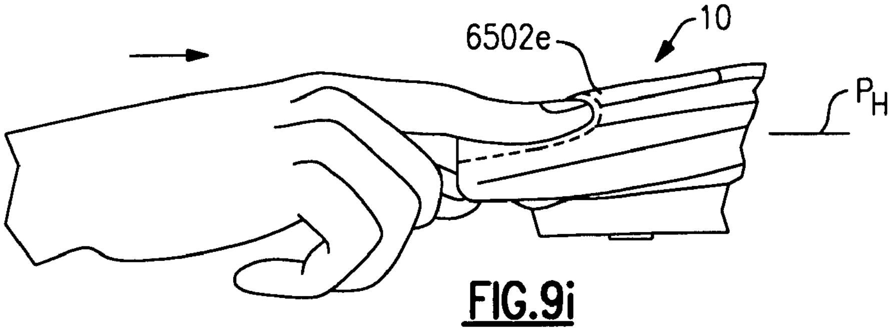
FIG. 9*i* is a side view of a transaction terminal having a "two knuckle" elongated finger recess.
Figure 9J:
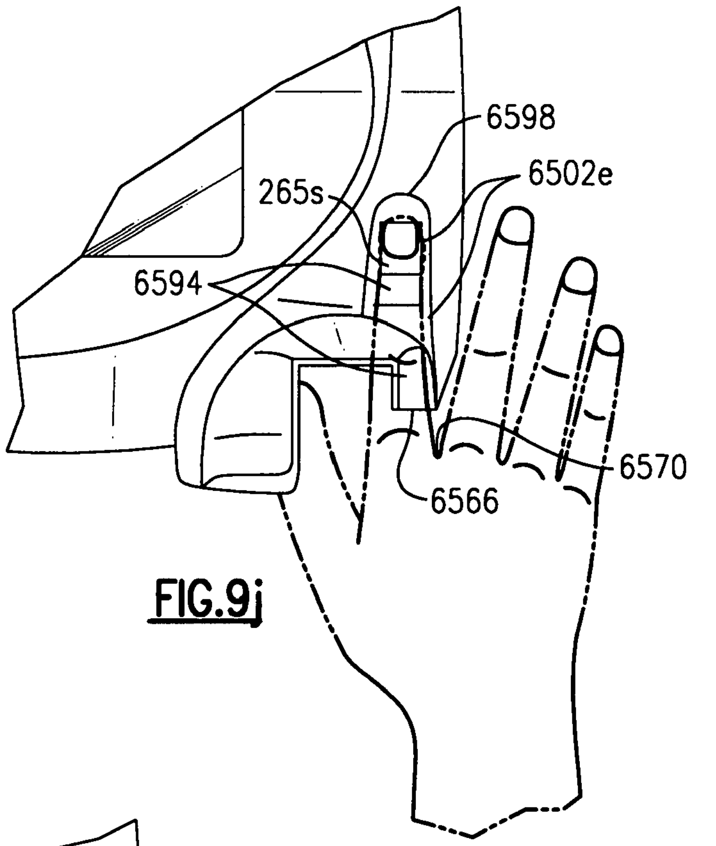
FIG. 9*j* is a top view of a transaction terminal having a two knuckled elongated finger recess.
Figure 9K:
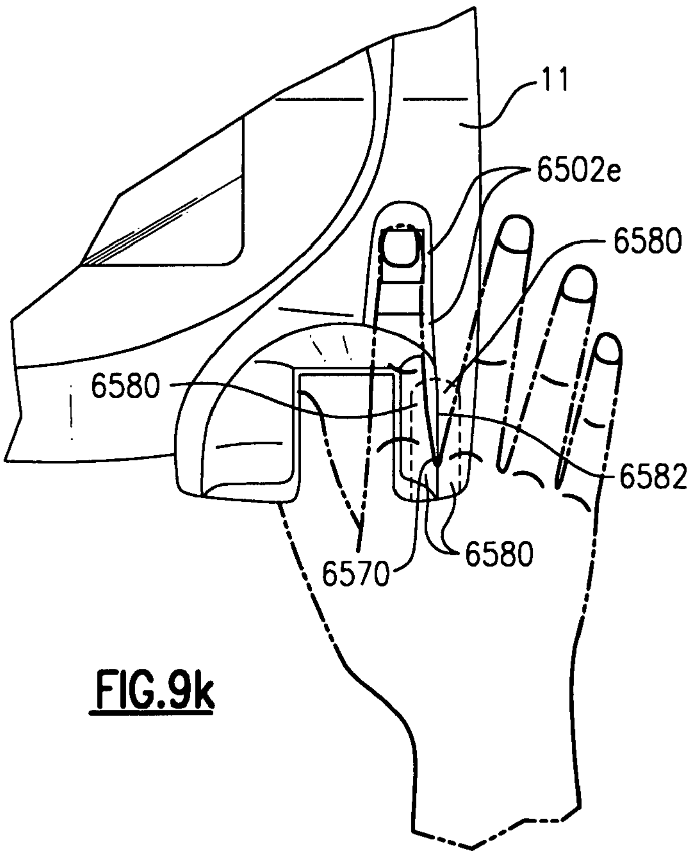
FIG. 9*k* is a top view of a transaction terminal having a web-receiving elongated finger recess.
Figure 9N:
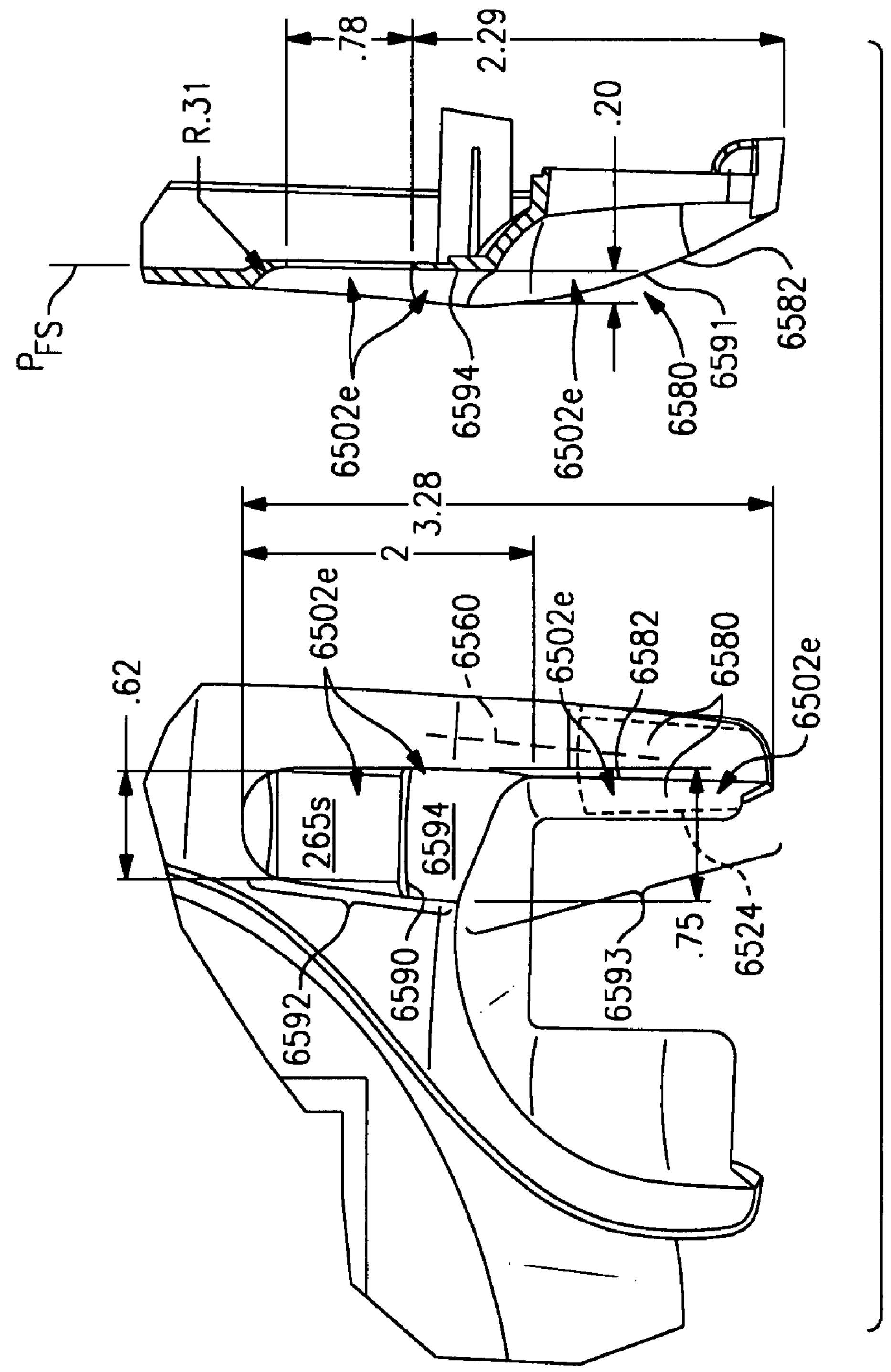
FIG. 9*n* are top and cross-sectional views including dimensional data, of a transaction terminal having an elongated recess.

Continuing with reference to the flow diagram of FIG. 4*m*, control circuit 210 at block 2032 monitors X,Y entry data from touch screen 20 to determine if CLEAR button 2012 has been actuated, and exits the signature capture mode (or erases signature data, block 2034) if CLEAR button 2012 has been actuated. At block 2036 control circuit 210 monitors touch screen coordinate data to determine whether DONE button 2014 has been actuated. If DONE button 2014 is actuated, control circuit 210 proceeds to block 2038 to execute a next processing routine for processing of the entered signature data. Such a next processing routine may include, e.g. compressing, transmitting, recognizing, authenticating and/or encrypting of the entered signature information.

At block 2040 control circuit 210 determines if the X,Y coordinate data received from touch screen 20 is out of range. More specifically, control circuit memory 216 has stored therein coordinate data representing signature capture area 2008. At block 2040 control circuit 210 determines if X,Y coordinate data received from touch screen 20 is included in X,Y coordinate data representing signature entry area 2008. If a user during signature entry, intentionally or unintentionally contacts with a finger or other hand part, a portion of touch screen 20 outside of area 2008 in a manner sufficient to register a data entry, touch screen 20 will likely report back to control circuit 210 a data entry coordinate point that is the average of the point of contact by the user's hand and the point of contact by stylus 74. Control circuit 210 will recognize such a coordinate value as being outside of signature capture area 2008 if the point of contact by the user's hand is sufficiently spaced apart from area 2008. If control circuit 210 at block 2040 determines that the coordinate data is in range control circuit 210 proceeds to block 2044 to display the data point. If control circuit 210 determines at block 2040 that the coordinate data is out of range control circuit 210 proceeds to block 2042.

At block 2042, control circuit 210 may display a text message on touch screen 20 advising a user to remove his/her hand from touch screen 20. An example of such a text message is shown in FIG. 4L. In the example of FIG. 4L, control circuit 210 displays the text message "SIGNATURE ONLY PLEASE", 2048 superimposing the message 2048 on recorded and displayed signature data 2049. Control circuit 210 could also display prompt message 2048 on another area of touch screen 20. By retaining display of the entered signature data up to the last valid data point during the output of the prompt message, the feedback system allows a user to discern precisely the extent to which presently entered signature data has adequately been registered, and allows a user to discern the point at which she should continue with stylus entry of signature data.

In the specific example of FIG. 4L, the prompt message displayed is "Signature Only, Please". Other messages are possible, e.g. "Please Do Not Contact Screen Outside of Signature Zone," etc. Further, the display on screen 2002 of a prompt message 2048 can be coupled with an actuation of a light source and/or an acoustic output. For example, control circuit 210 may cause one or more of (1) flashing or other control of display backlight 236 (FIG. 4*a*), (2) flashing or other control of LED 287L, (3) actuation of audio output 276 to emit a beep or voice message (e.g. a voice message advising a user to maintain data entry to within area 2008) when control circuit 210 determines at block 2040 that data received from touch screen 20 is out of range (is invalid).

With further reference to FIG. 4*m,* it is seen that control circuit 210 continuously executes a control loop to display prompt message 2048 (block 2042) until at block 2040 control circuit 210 determines that coordinate data received from touch screen 20 is in range (indicating that a hand part has been removed from a non-signature capture area of screen). When control circuit 210 determines that received coordinate data is in range, control circuit 210 proceeds to block 2044 to plot, or display a data point on screen 20, and additional data points if the received data remains in range. Accordingly, the feedback system described with reference to FIG. 4*m* warns a user as soon as there is an error in data entry, encourages a user to quickly rectify the problem, and allows terminal 10 to capture a complete or substantially complete signature in spite of there being a problem with data entry during a signature entry procedure.

Another user-prompt feature which can be incorporated in transaction terminal 10 is described with reference to FIG. 4*n*. Transaction terminal 10 can include a manual insert style mag stripe reader, or can be configured so that when operating in a-mag stripe card reading mode of operation control circuit 210 displays the prompt message 2410 as shown in FIG. 4*n*. Specifically, control circuit 210 can display the prompt message "INSERT CARD AND REMOVE QUICKLY" when operating in a mag stripe card reading mode. The inventors tested a version of transaction terminal 10 substantially as described, which in a card reading mode displayed the prompt message "INSERT CARD". In a sample of 53 persons, 42 (79%), left card 90 in reader 240. When the transaction terminal 10, was reconfigured to display message 2410 as shown in FIG. 4*n* during a card reading mode, the problem of persons leaving a card 90 in slot 345 during a card reading mode was substantially eliminated. Prompt message 2410 prompting a user to remove a card quickly substantially improves card reading.

Still further, transaction terminal 10 includes at least one and preferably more than one communication interface for providing communication with an external computer system such as a cash register 340 or a computer system 350 and 360 of a POS network to be described herein. In the specific embodiment shown in the block diagram of FIG. 2*a* terminal 10 includes an ethernet interface 250, a USB interface 252 an RS485 IBM Tailgate Interface 253, an RS 232 interface 254. Referring to FIGS. 3*f* and 3*g,* including multiple interfaces in terminal 10 yields important advantages. When transaction terminal 10 is in communication with cash register via cable 60, to be described herein it is common to concurrently connect terminal 10 via line 61 (typically an ethernet line) directly to retailer server 350. Accordingly, data and instructional communications which are beyond the capacity of cash register 340 (which is often a legacy system) to support can be carried out via direct link 61 between server 350 or (if terminal 10 is properly equipped) another computer system e.g. HUB 360, Network 322.

Terminal 10 can also include such interfaces as a PCMCIA interface 255 in communication with a PCMCIA slot connector 44. Slot connecter 44 may receive, for example, an RF communication card, a flash memory card, an optical reader PCMCIA card or other commonly available PCMCIA cards. PCMCIA slot connector 44 may be disposed to be accessible from the outside of housing 11 or else PCMCIA slot connector 44 may be accessible from the interior of housing 11 only. An RF or other wireless type of interface may also be provided in hard-wired communication with control circuit 210, e.g. an IR interface 277, shown in FIG. 2*b*. Electrical circuitry associated with the above types of components are more commonly being packaged in a packaged IC that comprises elements of control circuit 210.

In accordance with the invention, several interfaces can be physically packaged to terminate at housing 11 of terminal 10 in a single electrical connector port 42. As will be discussed in greater detail herein transaction terminal 10 is commonly connected in communication with a cash register 340 which is PC based or PC compatible. Cash registers commonly comprise at least one of four major types of communication connector ports: PC USB, IBM retail USB, RS232 or RS485 physical connector ports, each having a different PIN configuration. In accordance with the invention, terminal 10 includes a universal connector port 42 which includes a plurality of pins, wherein at least a first pin or group 51 of pins P are in communication with a first type of interface (e.g. USB), at least a second pin or group of pins 52 are in communication within a second type of interface (e.g. RS 232). Universal connector port 42 of terminal 10 may include additional groups of pins in communication with additional types of interface. For example, a third group of pins 53 may be in communication with a third type of interface (e.g. RS485) certain types of interfaces may be adapted so that pins "P" of universal port 42 are shared. For example, RS 232 and RS 485 interfaces can be adapted so that pins of the interfaces are shared with use of switching circuitry 272 as will be described herein.

When terminal 10 comprises universal connector port 42, a supplier of terminal 10 supplies along with terminal 10 a cable 60 for connection with universal connector 42 which is available in one of N varieties, where N is the number of interfaces that universal connector port 42 is in communication with within terminal 10. Thus, if universal connector port 42 is connected to four different interfaces (RS 232, RS485, IBM retail USB, PC USB), then a supplier 10 will make available cable 60 in one of four varieties. Each variety of cable 60 will have a proximal end connector 61 which interfaces with universal connector 42. Thus, if universal connector is a 15 socket connector, the proximal end of each variety of cable will include a proximal end connector 61 having 15 pins. The varieties of cables will differ in the connector of distal end 62. The first variety of cable will have distal end connector 62 in accordance with the standard connector form of the first type of interface, the second variety of cable 60 will have a distal end connector 62 in accordance with the standard connector format of the second type of interface and so on. A customer will order the appropriate variety of cable from a supplier depending on the type of interface terminal that will be interfaced within a cash register or other host computer system. In the alternative, a supplier may supply each of several cable varieties to a customer and the customer may chose the appropriate cable, and may switch cables if terminal 10 is required to communicate with a different interface. It can be seen that the product supply system including universal connector port 42 and associated customer selected cable 60 greatly reduces the size requirements of terminal back end 11*rr*. The universal connector and cable product supply system also significantly reduces the cost of terminal 10 without compromising functionality, since it reduces the number of physical connector ports that have to be integrated during assembly at terminal back end 11*rr*.

In a further aspect of the universal connector port feature of the invention, control circuit, 210 polls the contents of designated interface identifier, or "cable select pins" 42*cs* pins of connector 42. When the various cables 60 are made, conductors of cable 60 are wired so that the two conductors of cable 60 which supply the interface identifier pins of interface 42 supply the identifier pins with a unique signature indicative of the interface to which distal end 62 of cable 60 is interfaced with. For example, it will be seen that a set of cables 60 can be configured so that a first variety of cable supplies interface identifier pins of connector 42 with a signature of 00 indicative of an interface of a first type, a second variety supplies a signature of 01 indicative of an interface of a second type, a third variety of cable 60 supplies a signature 10 indicative of an interface of a third type, and a fourth variety of cable supplies a signature 11 of a fourth type when distal end connector 62 is connected to a device. More specifically, cable 60 can be made to provide a signature indicative of the cable type by manufacturing cable 60 of each variation in a complementary fashion with the voltage supply to connector 42 so that the lines of cable 60 interfacing with cable select pins 42*cs* of connector 42 return a high logic value to control circuit 210, unless the lines interfacing with cable select pins 42*cs* are connected within the length of cable or connector 61 to ground. Therefore, by grounding out one line that interfaces with a cable select pin 42*cs,* a logic 0 is returned to the cable select pin 42*cs*. By grounding out both lines of cable 60 interfacing with cable select pins 42*cs,* two low data points (i.e. a 00 signature) is returned to cable select pins 42*cs*. Accordingly, it can be seen that circuit 210 can be made to automatically identify the interface to which cable 60 is connected to, and can automatically adjust controls of I/O interface, of related circuit terminal 10 accordingly.

Figure 2B:
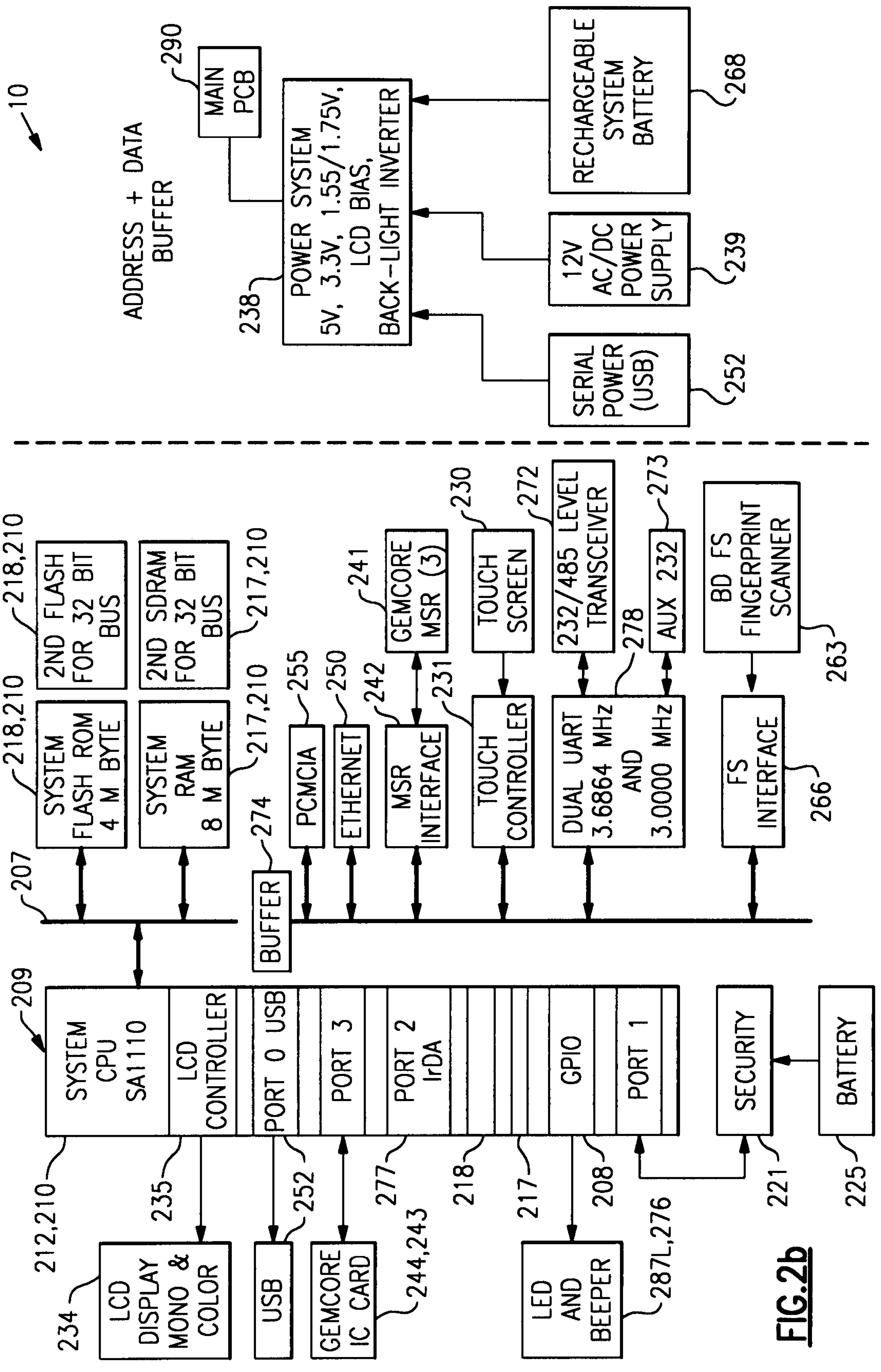
FIG. 2*b* is an chip system architecture diagram of a transaction terminal according to the invention.

Additional features of the invention in an exemplary embodiment are understood with reference to the system architecture of FIG. 2*b*. Referring to interface-related features, RS 232 and 485 interfaces 254, 252 can share a common asynchronous receiver-transceiver as seen by DUART 278. A switching function indicated in FIG. 2*a* by block 251 for switching the path between connector 42 and interfaces 254, and 253 can be provided by 232/485 level transceiver 272, which may be provided by a Linear Technology Model LTC 1387 Single 5U RS232/RS485 Multiprotocol Transceiver. Continuing with reference to FIG. 2*b,* IC chip 209 carrying CPU 212 can package certain interface circuitry such as USB interfacing circuits 252 and an IRDA interface 277. General I/O port 208 may provide output to indicator 287L and audio output 276 the latter, of which a programmer user may configure for operation with use of script programming or other programming, which will be described herein. In the exemplary embodiment, IC chip 209 is in communication with system BUS 207 which includes address and data buffer 274. In the exemplary embodiment system RAM 217 and system ROM 218 are provided. Additionally chip 209 including CPU 212 includes limited on-board RAM 217 and ROM 218. Terminal 10 in the embodiment of FIG. 2*b* is powered by a multiple voltage power system circuit 238 which distributes power to PCB 290. System 238 distributes power originating from, for example, a serially interfaced device, as indicated by USB box 252, an AC/DC power supply 239, e.g. a wall outlet plug-in power pack, and/or a rechargeable battery 268.

Figure 3A:
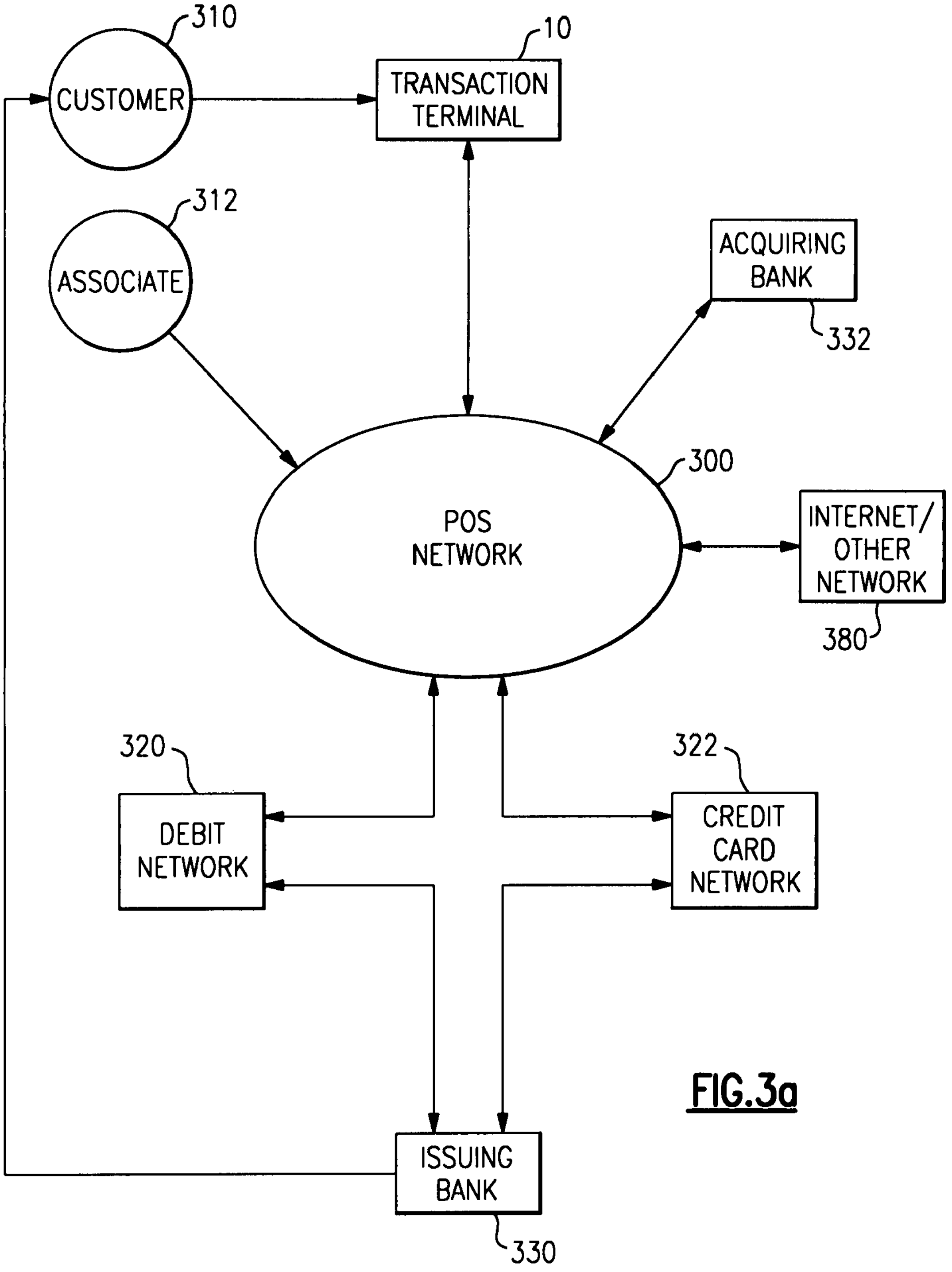
FIG. 3*a* is a flow diagram illustrating a flow of events in a typical POS transaction.

With reference to the transaction cycle flow diagram of FIG. 3*a,* an environment in which transaction terminal 10 may operate in accordance with the invention is described in greater detail.

Typically, transaction terminal 10 is disposed in a retail store Kiosk, or customer service desk. When a customer makes a transaction using a credit card or a debit card, an electronic benefits card (EBC) or customer loyalty card, a customer, at STEP 1, inserts a card into insert reader to read the card. A customer may, in addition, be prompted by terminal 10 to enter PIN information into terminal 10, and may be prompted to write a signature on the terminal 10 so that terminal 10 can capture a signature.

About the time that a customer inserts a card into terminal 10, a sales associate, at STEP 2, enters the sales amount into POS network 300, to be described in more detail wherein, using e.g. a keypad 340K of cash register 340, or a bar code reader 342 or 263. In the alternative, the dollar amount can be entered into transaction terminal 10 at STEP 2. At STEP 3, transaction terminal 10 communicates a customer's card information data determined from a reading of the card and other transaction data to POS network 300. Transaction terminal 10 may also communicate PIN information of a customer to POS 300 as part of STEP 3. Also, a transaction terminal may communicate a captured signature to POS network 300 as part of STEP 3. More typically however, a signature may be captured by terminal 10 and transmitted to POS network 300 after authorization is complete as will be described herein. Signature data may be achieved for use in a signature recognition system by a retailer for recognition by a computer system of retailer POS Network 300 or as a third party, e.g. at a computer at 380. Transaction terminal 10 may also store signature data for later processing, which may be performed on a batch basis. Transaction terminal 10 may also archive other transaction data.

Figure 3B:
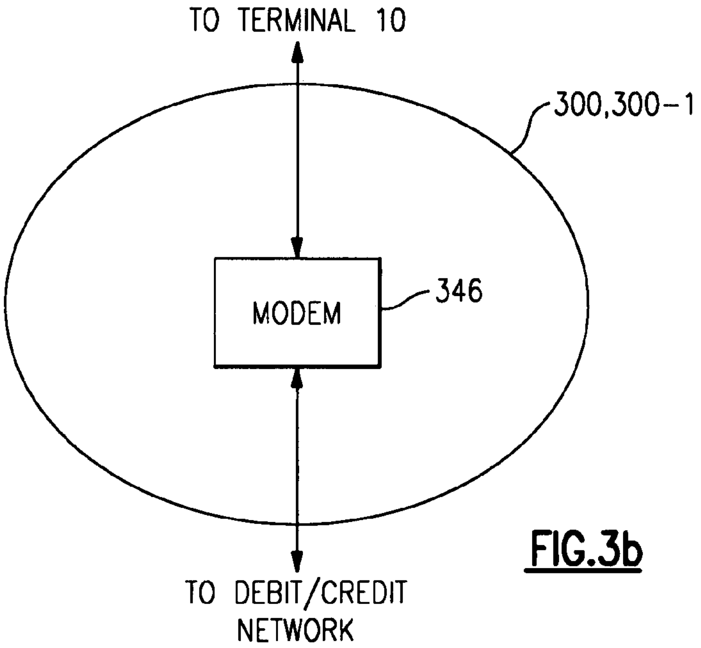
FIGS. 3*b*-3*e* show various embodiments of possible POS networks.

POS (Point-of Sale) Network 300, as is indicated in FIG. 3*a,* can take on a variety of forms. In any one of the layouts described, transaction terminal 10 can be considered part of POS network 300 once it is connected to POS network 300. In one simple form, as is indicated by FIG. 3*b,* POS Network 300 can comprise a modem 346 (e.g. cable or dial-up) or other communication device which provides communication debit network 320 or credit card network 322. Credit network 322 and debit network 320 may be the same network.

Figure 3C:
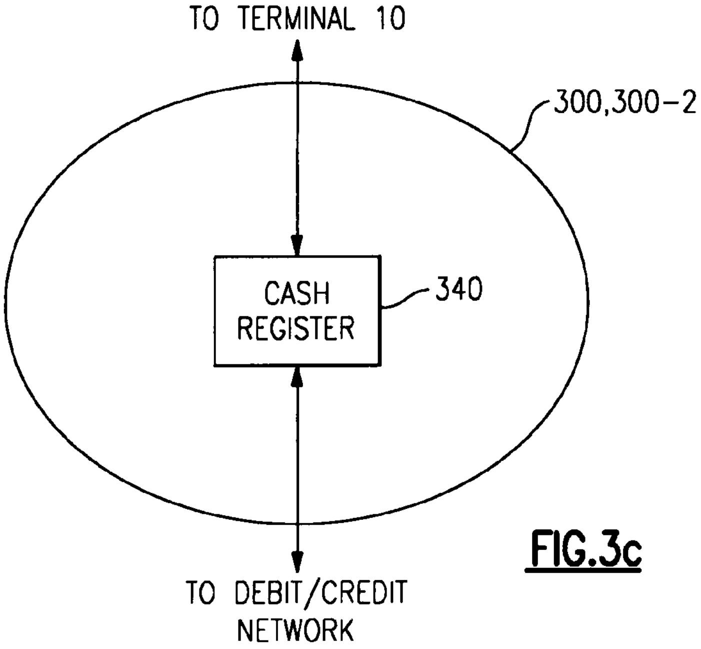
Figure 3D:
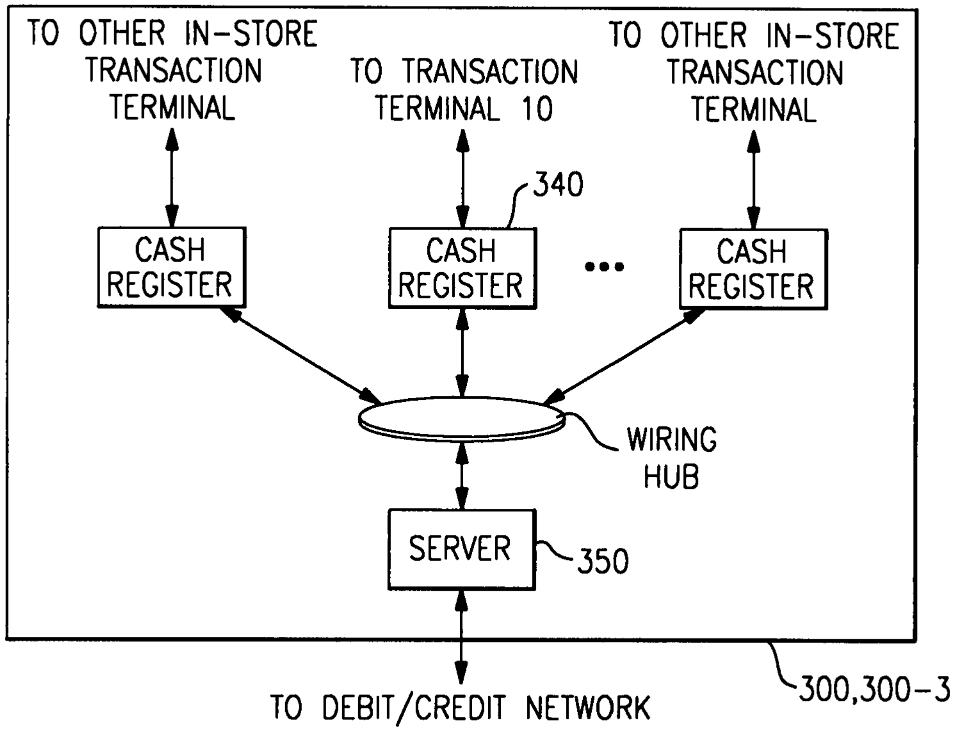
Figure 3F:
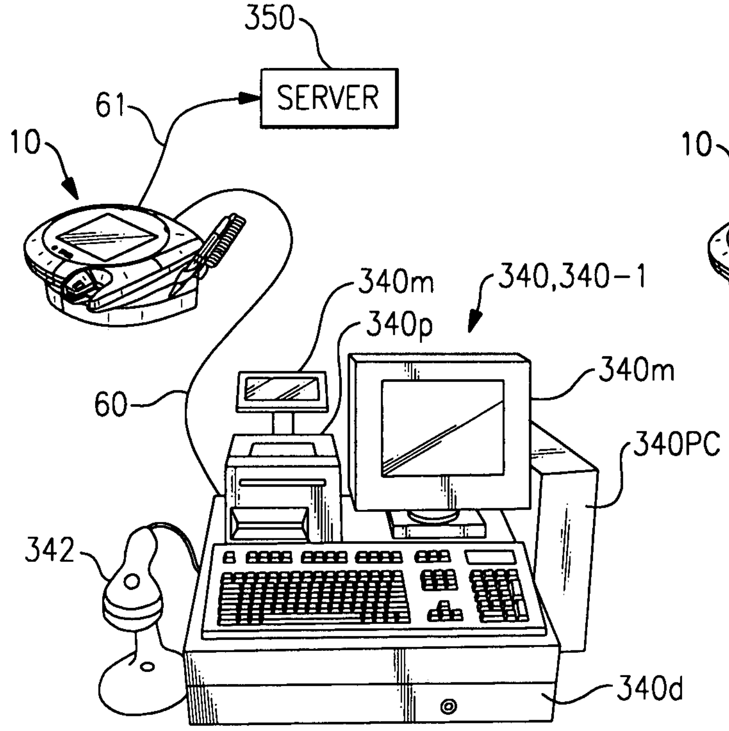
Figure 3G:
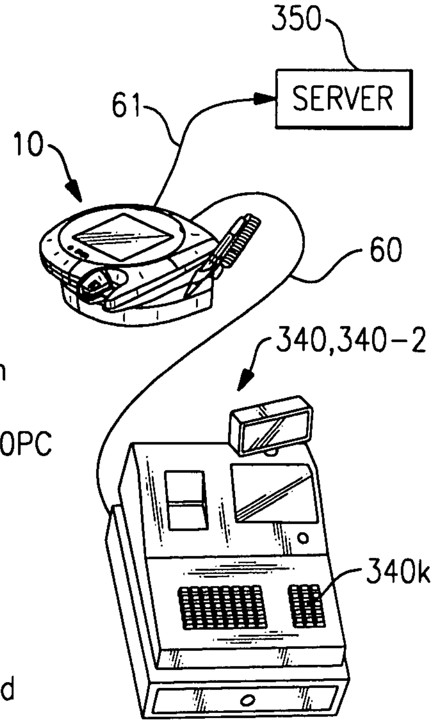
Figure 3E:
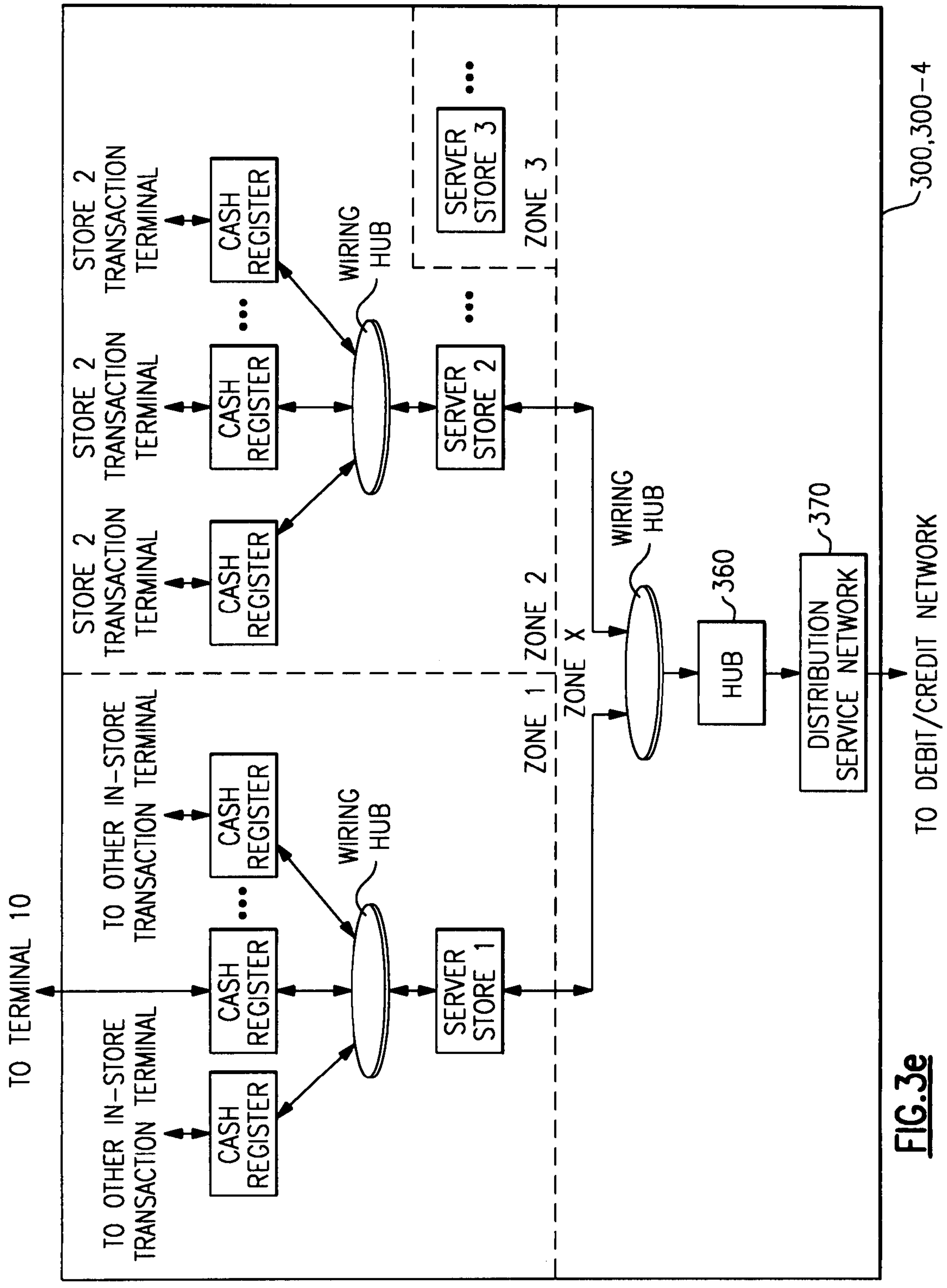

In another embodiment as indicated in FIG. 3*c,* POS network 300 and 300-2 may comprise a cash register 340. Cash registers are currently available in two popular forms. A PC POS system cash register 340 and 340-1, as shown in FIG. 3*d,* typically includes a personal computer housed in a standardly known PC housing 340PC and multiple interfacing or associated components including bar code reader 342, keyboard 340K, cash register drawer 340D, printer 340P, and monitors 340M. A dedicated POS Cash register, as shown in FIG. 3*g* includes the functionality of a PC and typically includes several of the above components (keyboard, monitor, printer, drawer) except that the components are housed in an integrated housing. Cash registers are equipped with communication interfaces e.g. dial-up or cable modem interfaces, USB interfaces, ethernet interfaces including wireless and non-wireless, which enable communication with external computer systems, including Terminal 10 and POS Network 300. In one embodiment, POS Network 300 comprises a cash register only and cash register 340 is adapted to communicate directly with a debit network 320 or credit card network 322.

Another embodiment of POS network 300 and 300-3 is shown in FIG. 3*c*. In the embodiment of FIG. 3*c* transaction terminal communicates with one cash register 340, while cash register 340 is one of several cash registers that is in communication with server 350, in an in-store local area network (LAN). In the embodiment of FIG. 3*c* in-store server 350 is in communication with debit network 320 and credit card network 322.

In yet another embodiment of POS network described with reference to FIG. 3*e,* POS Network 300 and 300-4 includes at least one computer system hub 360 which is under the control of a retailer yet located off-site with respect to transaction terminal and other in-store devices such as cash registers or other transaction terminals and servers. Hub 360 may be in communication with, and may be adapted to monitor and control financial data transaction emanating from a plurality of in-store servers. Hub 360 may be controlled by a retailer that operates several stores at several different locations e.g. Store 1, Store 2, and Store 3. Further, there may be more than a layer of hubs. A retailer may operate a local hub which receives transactional data from each of several in-store servers located at several different stores located in a given municipality. Several of these local hubs, in turn, may transmit transactional data to a regional hub. Several regional hubs may transmit transactional data to a centralized national hub. Several national hubs, in theory, can transmit transaction data to a single world-wide hub operated by a retailer having retail stores worldwide. It is seen that hubs and the layering of hubs provide a means for retailers to monitor transactions conducted throughout several retail stores. Hub 360 is often owned and operated by a retailer who owns or operates a retail store in which transaction Terminal 10 is located. However, Hub 360 may also be owned by a third party service provider, and the retail store owner may subscribe to a processing service provided by the third party. Such third-party operated hubs operated in the interest of a retailer shall herein be considered to be operated by a retailer. POS Network 300-4 of FIG. 3*e* is divided into zones. Zone 1 delineates the hardware components typically located in a first store, zone 2 delineates the network component typically located in a second store, zone 3, refers to components which are typically located at a third store, while zone x refers to components which are typically located off-site with respect to any store.

As indicated in the embodiment of FIG. 3*e* a POS Network 300 can also be considered to include various computer systems operated by parties other than a retailer or for example, a POS Network can include a Distribution Network 370. Distribution Network 370 refers to the computer systems operated by distribution service providers who receive transactional data from a retailer (e.g. from a computer system, a POS terminal such as terminal 10, a hub, a server, and a cash register) and evaluate the availability of several debit or credit card networks and route the data to one selected debit or credit card networks 320 or 322 based on an established criteria. Some transactions are processed without being routed through distribution networks and others are, normally dependent on the selection made by a retailer.

In a further aspect of POS Network 300, POS Network 300 can be in communication with another computer Network 380, which may be the Internet (World Wide Web). Connecting POS Network 300 to another Network 380 allows POS Network 300 to readily access information from a wide variety of computer databases, which information is pertinent to financial transactions. For example, by way of communication with Network 380, POS Network 380 can access such information as drive, license identification information, consumer credit rating information, consumer criminal record information, sales history information, consumer demographic data, and other consumer information. Aspects of the invention relating to access of information from Network 380 will be discussed in greater detail herein.

Continuing with reference to the transaction cycle flow diagram of FIG. 3*a,* at STEP 4, POS Network 300 routes transaction data either a debit network 320 or a credit card network 322 depending on the card type (debit or credit). Debit network 320 is a network of computer systems operated by a debit card agency. Credit card network 322, a network of computer systems operated by a credit card supplier, such as Visa or MasterCard or a retailer issued credit card. After a transaction is approved by an Issuing Bank, Network 300 notifies POS Network 300 of such approval.

At STEP 5 debit card or credit card network 320 and 322 transmit the transaction data to a computer system (or a network of computer systems) operated by an Issuing Bank 330. Issuing Bank 330 provides a number of important functions in relation to the transaction processing cycle. Issuing bank (1) makes sure that a customer's account has sufficient funds; (2) charges a customer's account for a transaction; (3) charges a customer's account for any applicable fees in relation to the transaction, and distributes the funds to appropriate parties (e.g. Distribution Network operators); and (4) monitors for card holder fraud, (5) may automatically preliminarily authorize small dollar transactions, and (6) may preliminarily authorize transactions based on risk calculations which cannot be authorized because of technical problems (e.g. Network 322 is down); (7) capture and store a data record of the transaction.

At STEP 6, Issuing Bank 330 debits a customer's account, and may, as part of STEP 6, initiate action to obtain payment of the debt (if credit card transaction from a customer). For example, Issuing Bank 330 may send a bill to a customer's home mailing address notifying a customer of an amount of a debt. As part of STEP 6, Issuing Bank 330 may automatically notify a customer of a debit via email communication to a customer's email address, or may post a notice on the Issuing Bank's website so that the notice is read when a customer opens his account information from the Issuing Bank's website.

At STEP 7, POS Network 300 sends transaction data to a computer system a network of computer systems operated by an Acquiring Bank and Acquiring Bank 332 appropriately credits a retailer's account by the amount of the transaction less any fees. Acquiring Bank (1) credits a retailer's account (2) charges the retailer any applicable fees and distributes these fees to appropriate entities involved in the transaction (e.g. Distribution network operators), (2) monitors for collection fraud, and (4) supplies information and customer service to a retailer, in part through communication with POS Network 300. Typically, STEP 7 is a batch process performed e.g. after business hours, whereas STEPS 1 through 6 described herein are all performed automatically after a transaction is initiated, within seconds of one another (except the nonelectronic mailing step described as part of STEP 6). In some instances STEP 7, is carried out with manual data entry and human observation of financial data records.

Some further aspects of possible transactions involving Terminal 10 can be understood with reference to the following examples, EXAMPLE I and EXAMPLE II, wherein the term "host" in Example I and Example II is used to refer to a computer system or network of computer systems interposed between a cash register and a debit/credit networks 320 and 322 as described above with reference to FIG. 3*a.,* e.g. a "server," or a "hub," or a network comprising a plurality of servers and/or hubs.

EXAMPLE I

Debit Transaction and Authorization

The purchaser may initiate the transaction or be prompted by the POS device. Electronic Benefits Transfer (EBT) using magnetic stripe cards or smart cards is similar to a debit transaction. Rules and exact procedures varies by State. Note: "Off-line debit" processes as if it were a credit card transaction. Ordering of steps:

(A) Associate 312 initiates a new sale and begins scanning items;

(B) Purchaser 310 selects their payment option=debit;

(C) Terminal 10 saves customer selection=debit;

(D) Purchaser 310 inserts their card on the terminal MSR/SCR;

(E) Terminal 10 stores the credit card track data;

(F) Terminal 10 request PIN;

(G) Purchase 310 enters PIN;

(H) Terminal 10 encrypts PIN block and stores the result;

(I) Terminal 10 waits for POS 340 terminal request;

(J) Associate 312 completes the sale;

(K) POS 340 sends sale total to Terminal 10, waits for reply;

(L) Terminal 10 displays total and prompts the purchase for "cash back";

(M) Purchaser 310 responds to cash back prompt, "yes"+ amount or "no"; Terminal 10 requests confirmation and displays new total;

(N) Terminal 10 replies to POS 340 with track data, PIN block and "debit" flag;

(O) POS 340 sends the amount(s), card data, PIN block, terminal ID, etc. to host 300;

(P) Host 300 adds merchant data and forwards to authorization Network 320;

(Q) Network 320 translates PIN block encryption to Zone key (Each network switch and processor translates the incoming PIN block to the encryption algorithm and key of the next zone);

(R) Network 320 examines card Bank ID Number (BIN) and routes to issuing bank;

(S) Issuer 330 checks account balance, account status, and fraud data;

(T) Issuer 330 verifies PIN;

(U) Issuer 330 replies "yes" or "no" for authorization or an error code;

(V) Network 320 sends issuer response to retailer host;

(W) Host 300 routes the issuer/network response to a POS terminal 340;

(X) POS 340 notifies associate of issuer response;

(Y) POS 340 sends message to Terminal 10 authorized or declined.

If authorized, the transaction is complete from the Terminal 10 point of view.

Note: All PIN-based payments are encrypted. Responses are not encrypted or secure.

End of Example I

EXAMPLE II

Credit Transaction and Authorization

The following describes typical credit card transaction flow in U.S. networks for transactions initiated on a connected POS terminal.

The purchaser may initiate the transaction or be prompted by the POS device.

(A) Associate 312 initiates a new sale and begins scanning items;

(B) Purchaser 310 selects their payment option=credit;

(C) Terminal 10 saves customer selection=credit;

(D) Purchaser 310 inserts their card on the terminal MSR/SCR;

(E) Terminal 10 stores the credit card track data, waits for POS terminal request;

(F) Associate 312 completes the sale;

(G) POS 340 sends a message to the Terminal 10="send data";

(H) Terminal 10 replies to POS with track data and "credit" flag;

(I) POS 340 sends transaction amount, card data, terminal ID, etc. to host along with merchant data;

(J) Host 300 adds merchant data and forwards to authorization to network;

(K) Network 320 examines card Bank ID Number (BIN) and routes to issuer;

(L) Issuer 330 checks account balance and fraud data;

(M) Issuer 330 replies "yes" or "no" for authorization or an error code;

(N) Network 320 sends issuer response to retailer host;

(O) Host 300 routes the issuer/network response to the POS terminal;

(P) POS 340 notifies associate of issuer response;

(Q) POS 340 sends message to Terminal 10, authorized or declined.

(R) Purchaser 310 signs signature on touch screen 320;

(S) Signature saved at terminal 10 and/or transmitted to POS for further processing (e.g. signature recognition).

If authorized, the transaction is complete from the Terminal 10 point of view.

Note: In the United States, credit transactions are not encrypted. Responses are not encrypted or secure. Credit transactions that are processed in Canada are encrypted and use MACing for data integrity.

End of Example II

Figure 2C:
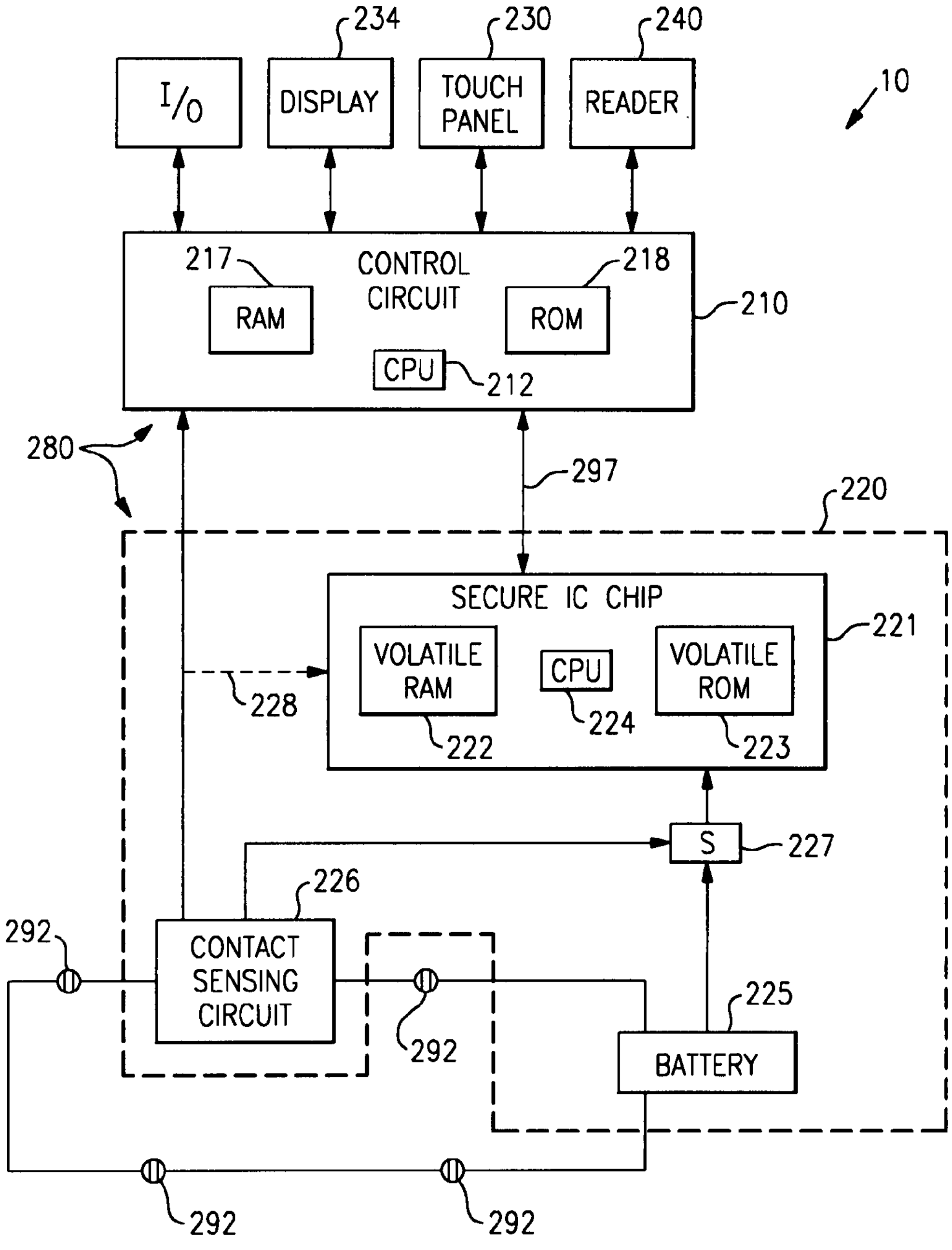
FIG. 2*c* is a functional electrical block diagram showing of a security block shown in the block diagram of FIG. 2*a;*
Figure 2D:
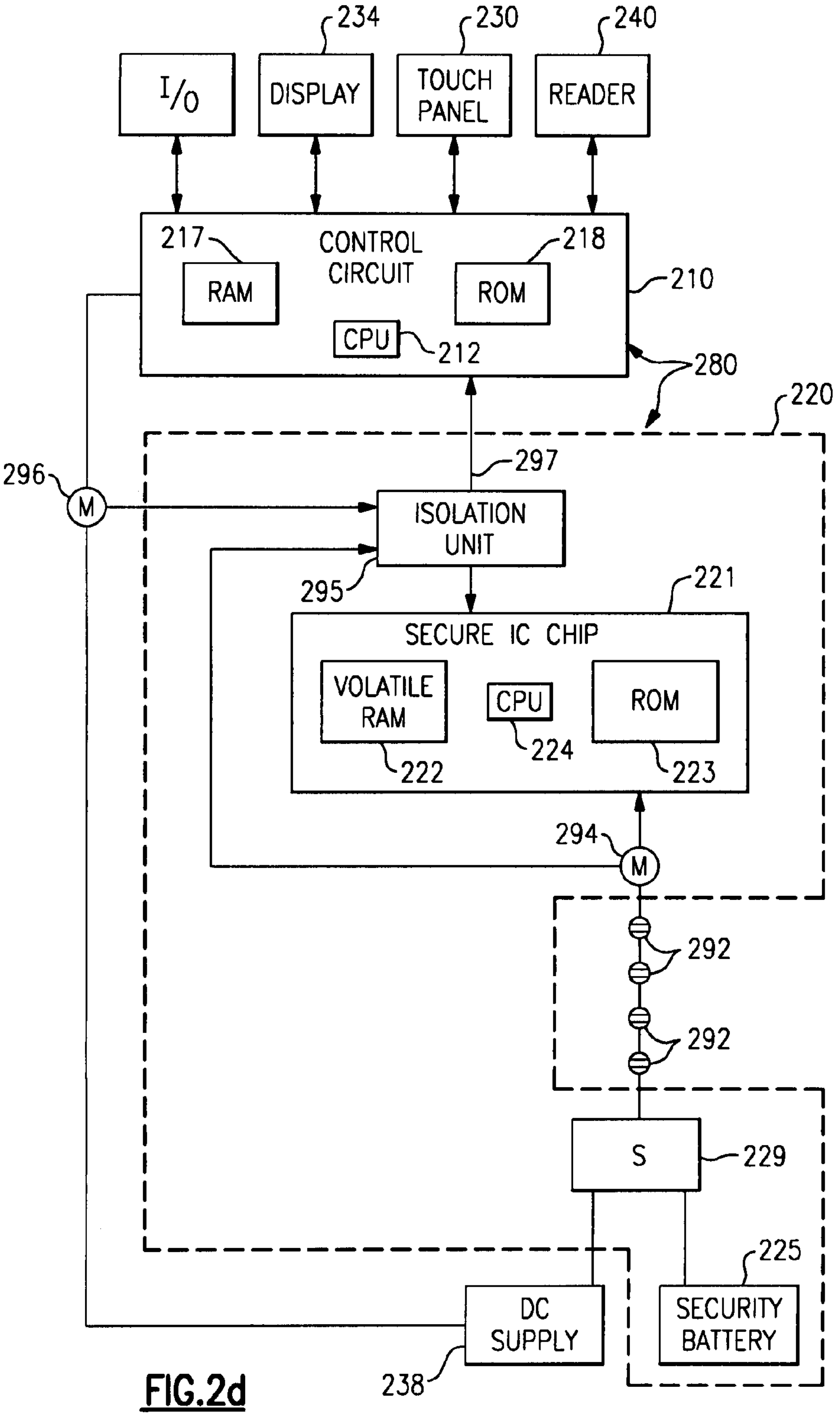
FIG. 2*d* shows an alternative embodiment of a security block according to the invention.
Figure 2E:
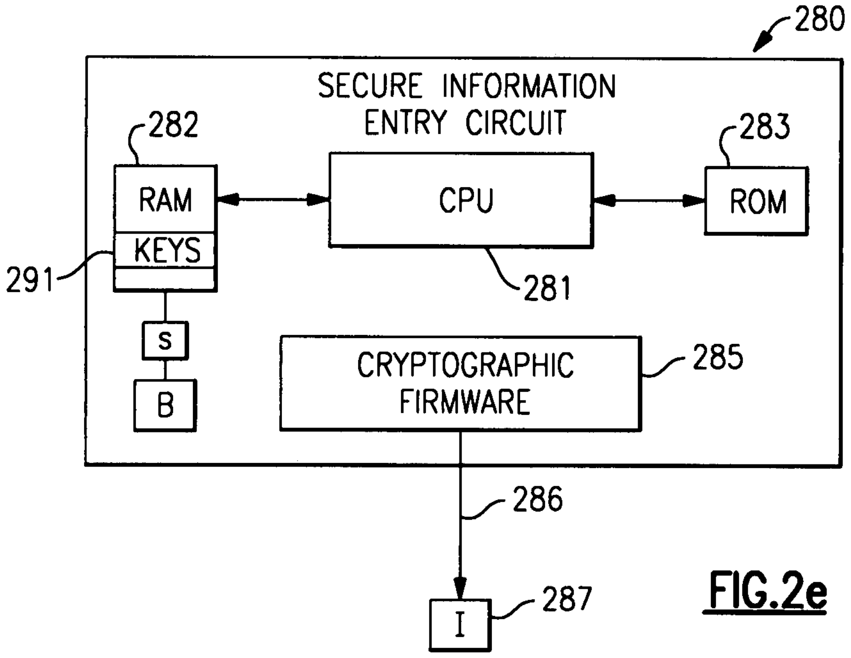
FIG. 2*e* shows a functional block diagram of a secure information entry circuit of the invention.
Figure 2F:
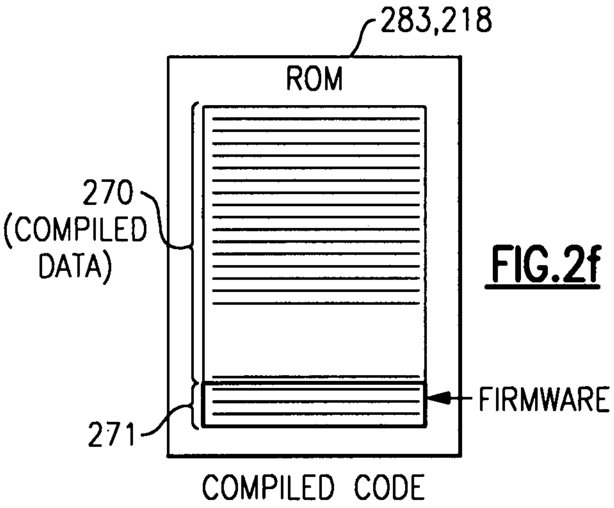
FIGS. 2*f* and 2*g* are memory maps illustrating just two of several possible embodiments of firmware.
Figure 2G:
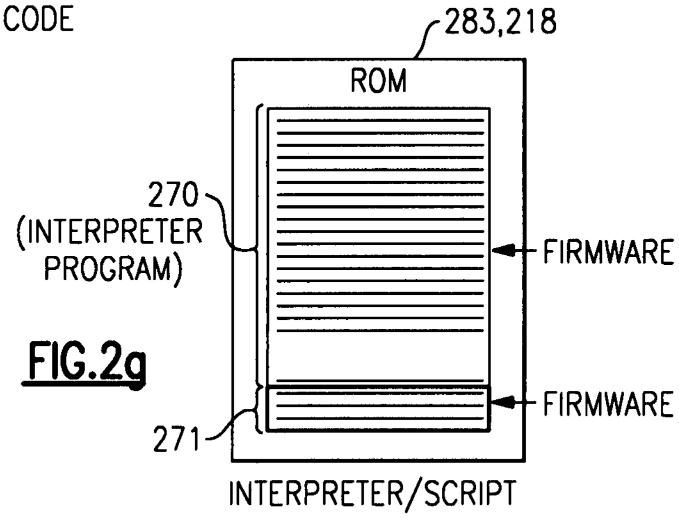
Figure 2H:
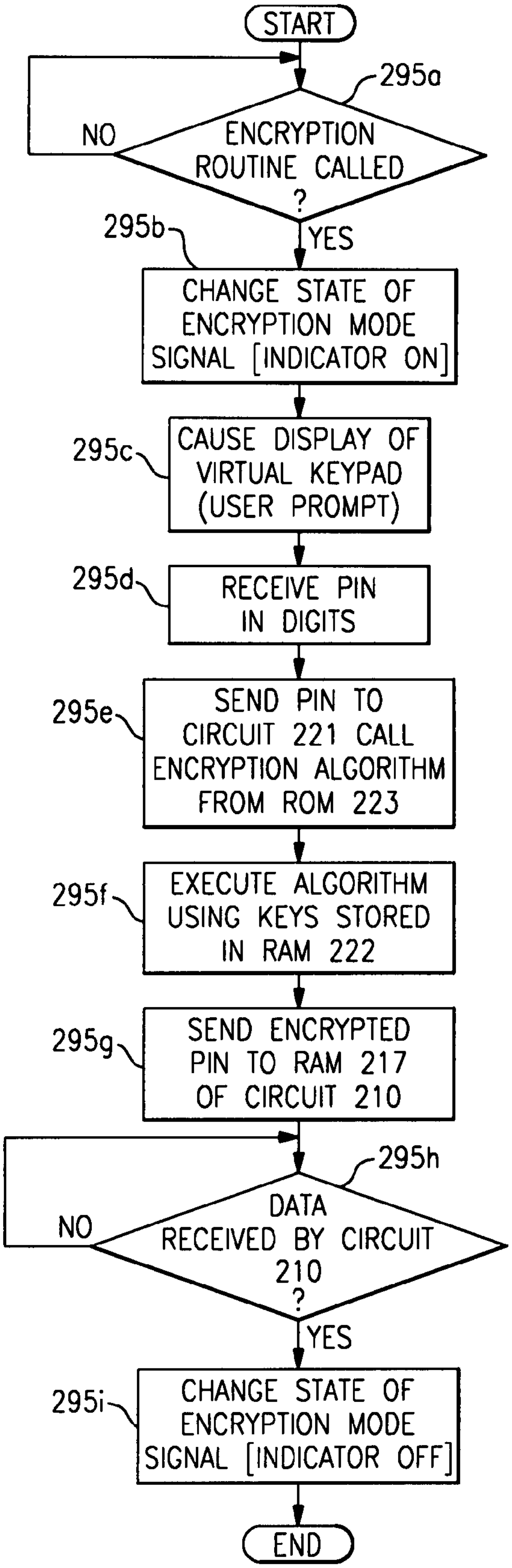
FIG. 2*h* is a flow diagram illustrating an encryption routine according to the invention.

Referring to further aspects of the invention, terminal 10 may be equipped with a variety of security features, which may take on a variety of forms. Referring to a first security feature, housing 11 is adapted so that if an unscrupulous party attempts to break into housing 11 to steal secure information from a storage device of terminal 10, the secure electronically stored information is automatically destroyed. Referring again to electrical block diagram 2*a* of FIG. 2*a,* terminal 10 includes a security circuit block 220, an embodiment of which is shown in greater detail in FIG. 2*c.* As shown in FIG. 2*c* security circuit block 220 may include in one embodiment, an integrated circuit chip 221 having volatile memory. In the embodiment shown, chip 221 has both a volatile RAM 222, a ROM 223, and includes a CPU 224. Secure chip 221 preferably includes submicron electrical connections rendering it extremely difficult to read information from chip 221 using electrical probes.

Transaction terminal 10 is adapted so that certain information previously designated as secure information is stored in a designated IC chip. Such information may include, for example, encryption keys or other information which may be designated as secure such as card identification numbers, signature information, fingerprint information, and retinal signature information, decoded-out message data decoded from e.g. an optical or RF card reader. In accordance with applicable banking standards (ANSI ISO), PIN information, when entered into a POS device such as transaction terminal 10 should be encrypted at terminal 10, as will be explained. From time-to-time, encryption keys stored in terminal 10 may be updated and replaced with new encryption keys. As will be described in further detail herein, transaction terminal 10 is adapted so that when a user enters PIN information in response to a prompt for PIN information displayed by terminal 10, an encryption algorithm stored in ROM 223 of secure chip 221 is called for execution by IC chip CPU 224 to encrypt the pin information in accordance with an encryption key stored in RAM 222. Encryption keys may be stored in other, mechanically and logically secure, preferably erasable, storage locations.

Encryption keys which terminal 10 may use for PIN encryption typically comprise one of two types: "master session" and DUKPT. Master session keys are used by a symmetrical encryption algorithm. The Data Encryption Standard (DES) is the most common form of master session keys. Under a master-session scheme, terminal 10 has a strong "master" key and a second "session" key. Typical implementations use a weaker session key. The session key is used to encrypt PIN blocks. The master key is used to secure replacement session keys. Terminal and the first computer (host) of POS Network 300 that receives and processes the encrypted PIN block must have the same key. POS Network 300, comprised of many "nodes" or computer systems connected by various communications links, translates the PIN from the key used by the sending device (terminal, host, etc.) to the encryption key and scheme used by the next node in the transmission chain. This repeats until the encrypted PIN block arrives at Issuing Bank 333. Accordingly, "security zones" are created which increase the difficulty of an unscrupulous party compromising the system. It also allows each zone to trust only the devices with which it directly communicates. It also greatly simplifies distribution of the symmetric keys. A given node must only deal with two other nodes rather than every node in the chain. Debit card Issuing Bank 333 does not convert the PIN block to clear data. Issuing Bank 330 submits the encrypted PIN block to a security device commonly called a Network Security Processor (NSP). The NSP verifies the PIN validity and returns a "yes" or "no" response. That response is utilized by issuing bank 330 for verifying the validity of the PIN entered on transaction terminal 10.

Figure 13:
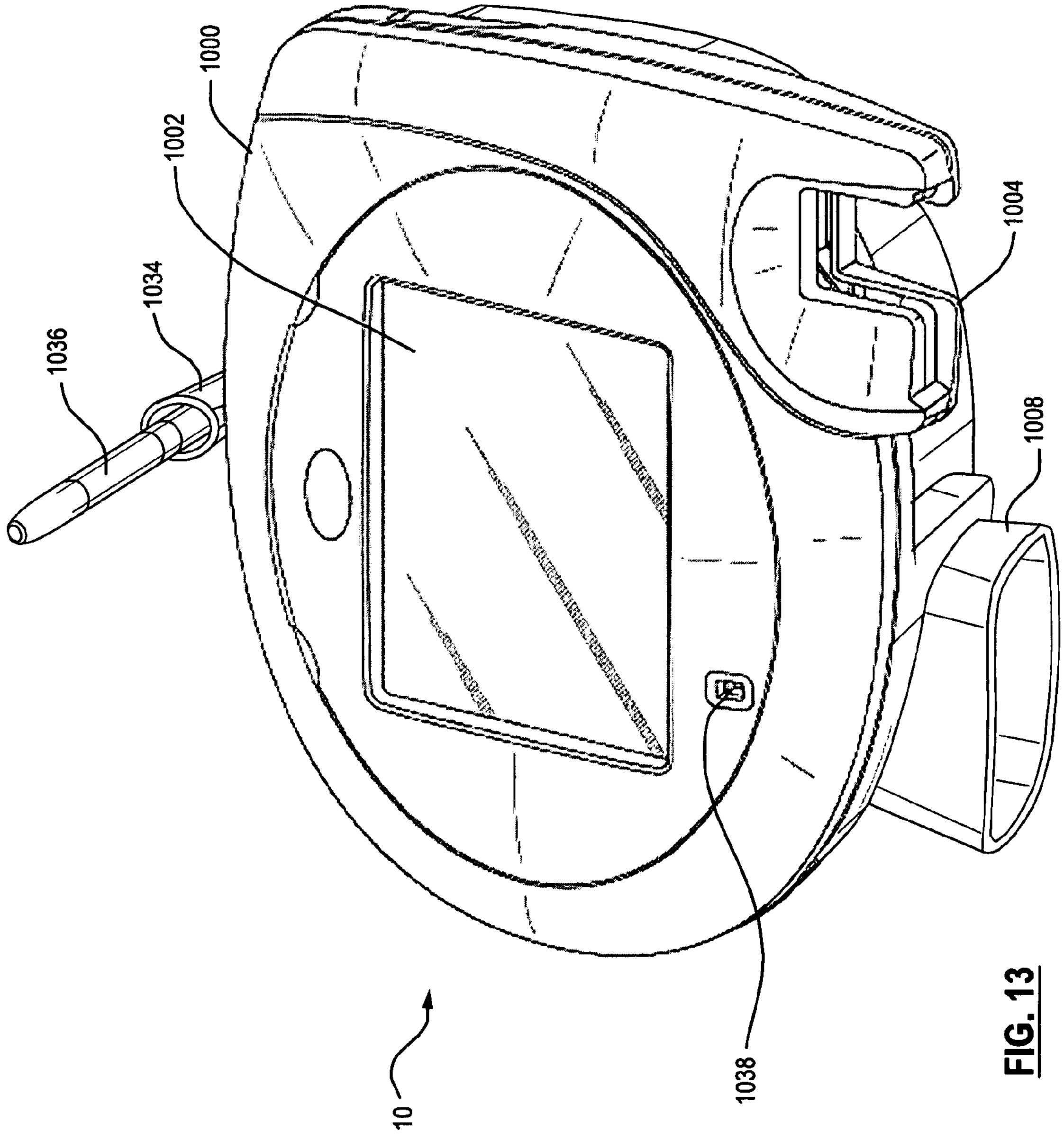
FIG. 13 is a perspective view of a transaction terminal in which the present invention is embodied.

An alternate embodiment of the transaction terminal 10 is shown in FIG. 13. The transaction terminal 10 includes a housing 1000, a display 234, a reader 1004 and an optical reader unit 1006. The transaction terminal 1000 further includes a luminiferous shroud 1008 extending outwardly from the optical reader unit 1006. The transaction terminal 10 also includes a control circuit 210, such as, for example a mother board. The control circuit 210 is in communication with the display 234, the reader 1004 and optical reader unit 1006.

The housing 1000 is made of a plastic material, such as, for example a durable, high impact plastic material. The housing 1000 includes a top 11*a*, a bottom 11*b*, a front 11*f*, and sides 11*s*.

The display 234 is preferably a LCD screen, such as, for example a 5.7", ¼ VGA (320×240) resolution color or monochrome LCD screen of the type available from Nan Ya Corporation. Display 334 may be driven by an on-chip LCD controller available on a microchip including circuit CPU 212 if circuit is appropriately selected, or in association with dedicated control circuit 235 as shown in FIG. 2*a*.

The reader 1004 configured to read data from a removable data carrier. The reader 1004 may be an insert style magnetic card reader, a hybrid magnetic stripe and smart card reader/writer or an RF ID reader. The reader 1004 may be disposed along an edge of the transaction terminal 10 as shown in FIG. 13. The reader 1004 may be, for example a ZU series reader of the type available from Matsushita of Japan, an ST-40 series hybrid reader available from Secure-Tech, or a hybrid reader of the type available from IDTECH. Hybrid reader unit 240 includes a mag stripe reader 241 in communication with magnetic control and decode circuit 242, and smart card reader/writer 243 in communication with smart card control and decode circuit 244.

Figure 14:
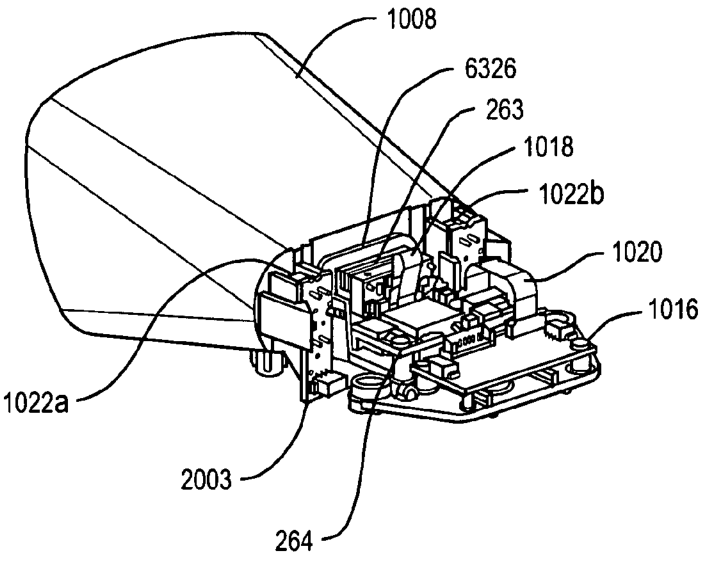
FIG. 14 is a perspective view of an optical reader embodiment of the present invertion.

The optical reader unit 1006 includes an imaging axis $a_i$ and a field of view 1010 that varies with distance along the imaging axis $a_i$. An example of an optical reader unit 1006 having the luminiferous shroud 1008 attached thereto is shown in FIG. 14. An example of how the field of view 1010 varies along the imaging axis $a_i$ for an optical reader unit 1006 having a rectangular field of view 1010 is found in table 1. The optical reader unit 1006 includes an imaging module 263 and a digital signal processing circuit or decode out circuit 264. The imaging module 263 is electrically connected to the decode out circuit 264. The imaging module 263 may be electrically connected to the decode out circuit 264 by a flex strip 1018.

The optical reader unit 1006 also includes an illumination controller 1016 alternatively, the illumination controller may be incorporated into the control circuit 210. The illumination controller 1016 is electrically coupled to the decode out circuit 264. The illumination controller 1016 may be electrically coupled to the decode out circuit 264 by a flex strip 1020. The illumination controller 1016 is electrically coupled to the control circuit 210 and a light source The optical reader unit 1006 is located so that the imaging axis $a_i$ and the field of view point 1008 outward from the housing 1000 of the transaction terminal 10. In the embodiment shown in FIG. W, the optical reader unit 1006 is disposed so that the imaging axis $a_i$ extends outward from the front 11*f* of the housing. When the transfer terminal 10 is installed in a vertical orientation the imaging axis $a_i$ is directed towards the floor. Alternatively, the optical reader unit 1006 may be disposed so that the optical axis $a_i$ extends outwardly from the top 11*a*, sides 11*s* bottom 11*b* or rear 11*r* of the housing 1000.

The optical reader unit 1006 includes an image sensor 263 such as, for example an IT4000 imaging module available from HHP, Inc. of Skaneateles Falls, N.Y. Such imaging modules are shown in FIG. 10*b*, FIG. 10*c* and FIG. 10*d* and are substantially described in application Ser. No. 10/092,789, filed Mar. 7, 2002, entitled "Optical Reader Imaging Module" incorporated herein by reference and application Ser. No. 10/093,136 filed Mar. 7, 2002, entitled "Optical Reader Comprising Multiple Color Illumination" also incorporated herein by reference. IT4000 imaging module may be better understood by referring to the exploded views of FIG.

10*g*, FIG. 10*h*, FIG. 10*i* and FIG. 10*j*. Imaging module 263 includes a support 6380 having a containment 6381 containing image sensor chip 6332, and a retainer section 6382 retaining a lens assembly 6340 shown as being provided by a lens barrel. Image sensor chip 6332 can be a gray scale image sensor chip or a color image sensor chip of the type described in application Ser. No. 09/904,697 filed Jul. 13, 2001, entitled "An Optical Reader Having a Color Imager", incorporated herein by reference. Lens assembly 6340 may include fixed optics configured so that imaging module 263 has a best focus receive distance of less than two feet (e.g. 3 in., 7 in., 9 in). Lens assembly 6340 can also include adjustable optics varying the best focus distance of module 263, or fixed optics such that a best focus receive distance of module 263 is more from about 15 inches to about 20 inches.

The transaction terminal 10 further includes an illumination unit 1012 disposed to illuminate at least a portion of the field of view 1010 of the optical reader unit 1006. The illumination unit 1012 may be a light source 1014 integrated into the optical reader unit 1006, such as, for example the LEDs 6318 of the imaging module 263. The light source may also include lamps and lasers. Alternatively, a light source 1014 may also include additional light sources 1022*a*, 1022*b* such as, for example a single or multiple LEDs, not integrated into the imaging module 263. The additional light sources 1022*a*, 1022*b* are disposed about the image sensor 263. The additional light sources 1022*a*, 1022*b* are electrically connected to the illumination controller 1016. The additional light sources 1022*a*, 1022*b* may be electrically connected to the illumination controller 1016 by a flex strip (not shown). In one embodiment, the illumination controller operates the additional light sources in unison, i.e., the additional light sources 1022*a*, 1022*b* are turned on and off together and operatively function as a single illumination unit. In an alternative embodiment, the additional light sources are grouped into multiple operating units. The illumination controller 1016 turns the operational units on and off according to a desired schedule. For example, in order to reduce the adverse effects of specular reflection of along the receive axis and thereby improve the quality of the image captured, it may be desirable to place additional light sources 1022*a*, 1022*b* on either side of the imaging module 263 and then alternate turning on and off the additional light sources 1022*a*, 1022*b* on either side of the imaging module 263. For example, if the additional light sources 1022*a*, 1022*b* are disposed to the opposite sides of the imaging module 263, the illumination controller 1016 may cyclically activate the additional light sources 1022*a*, 1022*b* such that illumination is provided from one side and then another, with illumination being provided from each side for a predetermined period of time.

The period of time that each operational grouping of additional light sources 1022*a*, 1022*b*, is on and off depends on the capture rate and illumination requirements of the imaging module 263. In an alternative embodiment, light source 1014 integrated into the optical reader unit 1006 may include multiple light sources, these multiple light sources may be operated in a similar out of phase manner by the illumination controller 1016 in order to reduce adverse effects of specular reflection. If these multiple light sources are disposed on either side and are proximate to the additional light sources 1022*a*, 1022*b* the multiple light sources may be operated in phase with the additional light sources 1022*a*, 1022*b*.

In an alternative embodiment, multiple light sources are disposed in four groups A, B, C, D around the imaging module 263. The illumination controller 1016 will cyclically instruct each group to provide illumination.

Figure 15:
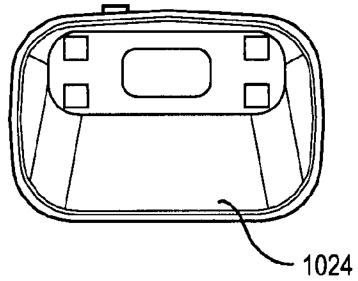
FIG. 15 is an end elevation view of the luminiferous shroud of FIG. 14.

The transaction terminal may also include an optical plate 6326 carrying aiming and illumination optics is disposed to receive light from the light source 1014 and the additional light sources 1022*a*, 102*b*. In one embodiment, the illumination optics of the optical plate 6326 include a plurality of optical elements for diffusing the light from the light source 1014 and directing at least a portion of the light from the light source 1014 onto a surface of the luminiferous shroud 1008. In one embodiment, the plurality of optical elements are prisms, such as, for example prisms disposed to align with the LEDs comprising the light source 1014, more specifically in one embodiment, as shown in one side of the prisms form a 4 degree angle respect to a surface of the optical plate 6326. As shown in FIG. 15, the optical plate 6326 may be integrally formed with luminiferous shroud 1008.

The transaction terminal further includes a luminiferous shroud 1008 extending outwardly from the optical reader unit 1006. The luminiferous shroud 1008 is made from a light transmissive material, such as for example a translucent plastic material, such as, for example a polycarbonate. The walls of the luminiferous shroud 1008 are angled with respect to the imaging axis $a_i$ of the optical reader 1006 and are disposed to closely follow the perimeter of the field of view of the optical reader 1006. The luminiferous shroud 1008 includes an inner surface 1024. The inner surface 1024 is configured such that at least a portion of light incident thereto enters the walls of the luminiferous shroud 1008. In one embodiment, the inner surface 1024 is a textured molded plastic surface, such as for example a surface having a MOLD-TECH® texture. A textured inner surface 1024 prevents hotspots in the light axially exiting the luminiferous shroud 1008 and keeps the axial exiting light diffused. Diffused light not only makes it easier for the optical reader 1006 to capture an image but also enhances the safety of the device. In one embodiment, some of the light entering the inner surface 1024 of the luminiferous shroud 1008 exits the luminiferous shroud peripherally through the outer surface 1026 of the luminiferous shroud 1008.

A portion of the light entering the inner surface 1024 of the luminiferous shroud 1008 is confined by total internal reflection to propagate within the volume defined by the inner surface 1024 and the outer surface 1026 of the luminiferous shroud 1008. In effect, the volume defined by the inner surface 1024 and the outer surface 1026 of the luminiferous shroud 1008 is a two-dimensional waveguide, or light pipe. The confined light exits the end 1028 of the luminiferous shroud 1008. As shown in FIG. 16, the end 1028 of the luminiferous shroud 1008 includes a chamfer 1030. The chamfer 1030 serves to redirect a portion of the light propagating within the walls 1032 of the luminiferous shroud 1008, the redirected light peripherally exits the luminiferous shroud 1008 in a relatively narrow band proximate to the end 1028 of the luminiferous shroud 10008. As will be appreciated by those skilled in the optical arts, the size and orientation of the chamfer 1030 with respect to the thickness of the walls 1032 control how much of the light is dispersed peripherally through the outer surface 1026 of the luminiferous shroud 1008. Preferably, the chamfer 1030 is sized and oriented so that the light dispersed peripherally in the region proximate to the end 1028 of the shroud is of greater intensity than that dispersed peripherally from the remainder of the luminiferous shroud 1008. The differences in light intensity produce a "glowing ring" around the open end 1034 of the luminiferous shroud 1008. The light ray diagram of FIG. 17 is illustrative of this phenomenon.

In one embodiment, the inner and outer surfaces are parallel to one another and the end forms an angle $\alpha_1$ with the inner surface 1024 of about one hundred fifty-one (151) degrees, the chamfer 1030 forms an angle $\alpha_2$ with the inner surface 1024 of about one hundred thirty-seven (137)_degrees and the chamfer extends for a distance $d_{c1}$ of about 0.045 inches along the inner surface 1024 and for a distance of about $d_{c1}$ of about 0.038 inches along the end 1028 as measured from the intersection of the inner surface 1024 and the end 1028.

In an alternative embodiment, a photo-luminescent material is applied to a portion of the luminiferous shroud 1008 proximate to the end 1030 of the luminiferous shroud 1008. The photo-luminescent material reacts to the light being peripherally dispersed by the chamfer 1030 thereby increasing the visual acuity of the luminiferous shroud 1008.

In an alternative embodiment, an end region of the inner surface 1024 and the end 1028 may be textured, such as may be accomplished by sanding, grinding, filing or molding thereby producing a light scattering surface producing a similar effect as that obtained by chamfering.

The end 1028 of the luminiferous shroud 1008 may be perpendicular to the imaging axis $a_i$ of the optical reader unit 1006. Additionally, as shown in FIG. 18, the end 1030 of the luminiferous shroud 1008 may be inclined with respect to the imaging axis $a_i$ of the optical reader unit 1006. Inclining the end 1028 of the luminiferous shroud 1008 with respect to the imaging axis $a_i$ of the optical reader unit 1006 has the effect of reducing adverse effects of specular reflection parallel to the imaging axis $a_i$ of the optical reader unit 1006.

Additionally, the outer surface 1026 of the luminiferous shroud 1008 may be placarded with icons or instructional text of a combination thereof as shown in FIG. 19 to instruct the user where to place the item to be scanned. The placards may be decals applied to the outer surface 1026 of may be molded into the outer surface 1026.

In an alternative embodiment, the transaction terminal 10 includes a user interface such as, for example a touch pad screen 20 including a display 234 and a touch pad overlay 230. Touch pad screen or "touch screen" 20 displays information to a user such as prompt information, a virtual keypad, and advertising messages, etc. Touch screen 20 also serves as a means to input data. Touch screen 20 may serve as both a virtual keypad and signature capture platform. The transaction terminal 10 equipped with a touch pad screen 20 may also include a holder 1034 for a stylus 1036. The stylus 1036 may be used to actuate the touch pad screen 20.

In an alternative embodiment, the transaction terminal 1000 includes a biometric sensor (not shown), such as, for example a retinal scanner, a finger print scanner or an epidermal topographical scanner.

In an alternative embodiment, the transaction terminal 1000 includes a secure mode indicator 1038.

Figure 20:
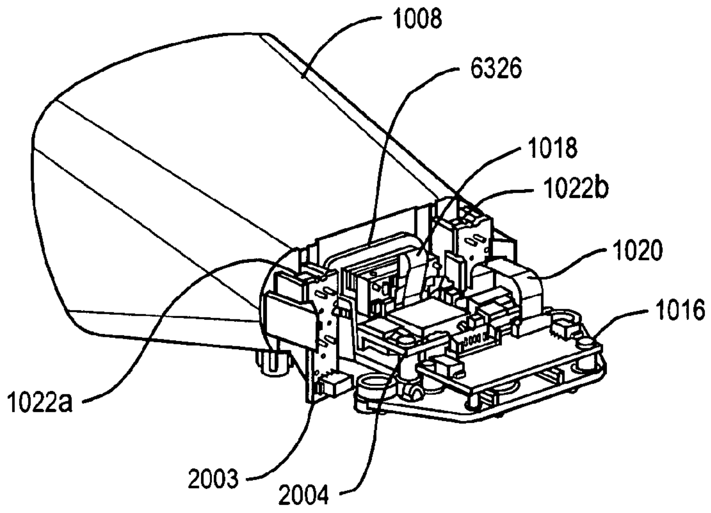
FIG. 20 is a perspective view of an optical reader embodiment of the present invention.

FIG. 20 shows an embodiment of the optical reader 2000 of the present invention. The optical reader 2000 includes a photoelectric conversion unit 2002, a light source 1022, and a luminiferous shroud 1008

The photoelectric conversion unit 2002 includes an image sensor 263 such as, for example an IT4000 imaging module available from HHP, Inc. of Skaneateles Falls, N.Y. Such imaging modules are shown in FIG. 10*b*, FIG. 10*c* and FIG. 10*d* and are substantially described in application Ser. No. 10/092,789, filed Mar. 7, 2002, entitled "Optical Reader Imaging Module" incorporated herein by reference and application Ser. No. 10/093,136 filed Mar. 7, 2002, entitled "Optical Reader Comprising Multiple Color Illumination" also incorporated herein by reference. IT4000 imaging module may be better understood by referring to the exploded views of FIG. 10*g*, FIG. 10*h*, FIG. 10*i* and FIG. 10*j*. Imaging module 263 includes a support 6380 having a containment 6381 containing image sensor chip 6332, and a retainer section 6382 retaining a lens assembly 6340 shown as being provided by a lens barrel. Image sensor chip 6332 can be a gray scale image sensor chip or a color image sensor chip of the type described in application Ser. No. 09/904,697 filed Jul. 13, 2001, entitled "An Optical Reader Having a Color Imager", incorporated herein by reference. Lens assembly 6340 may include fixed optics configured so that imaging module 263 has a best focus receive distance of less than two feet (e.g. 3 in., 7 in., 9 in). Lens assembly 6340 can also include adjustable optics varying the best focus distance of module 263, or fixed optics such that a best focus receive distance of module 263 is from about 15 inches to about 20 inches. A first circuit board 6314*a* carrying image sensor chip 6332 and aiming LEDs 6318 is mounted to a back end of support 6380 while a front circuit board 6314*b* carrying illumination LEDs 6316 is mounted to a front end of support 6380. Supporting the various components of imaging module 263 are a plurality of conductive support posts 6384. Imaging module 263 can include mounting wings 6380*w* for aiding in the installation of imaging module 263 in a device housing. Imaging module 263 has a form factor of about 2.0 cm by 1.2 cm by 1.2 cm.

The photoelectric conversion unit 2002 also includes a digital signal processing unit 2004. The digital signal processing unit 2004 is electrically connected to imaging module 263. The digital signal processing unit 2004 may be electrically connected to imaging module 263 by a flex strip 1018. The imaging module 263 The digital signal processing unit 2004 processes electrical signals generated by the image sensor 263 thereby decoding optical indicia.

In an alternative embodiment, the photoelectric conversion unit 2002 includes a plurality of image sensors 263. The image sensors may be synchronized to simultaneously capture images or the image sensors 263 may be synchronized to capture images at different times. Because each of the plurality of image sensors 263 possesses it own imaging axis, the use of multiple imagers increases the likelihood of reduced adverse effects of specular reflection along one of those imaging axes, thereby improving the reliability of the optical reader 2000.

The photoelectric conversion unit 1004 may also be of a ID image sensor or a laser sweeping scan engine.

An example of the variation of the field of view of an image sensor is contained in Table 1. The imager sensor has a narrow axis and a wide axis, thereby producing a rectangular field of view that increases with distance from the imager.

TABLE 1

| Distance from Imager (inches) | Narrow Axis Field of View Dimension (inches) | Wide Axis Field of View Dimension (inches) |
|---|---|---|
| 1 | 0.44 | 0.61 |
| 2 | 0.89 | 1.22 |
| 3 | 1.33 | 1.83 |
| 4 | 1.77 | 2.45 |
| 5 | 2.22 | 3.06 |
| 6 | 2.66 | 3.67 |
| 7 | 3.10 | 4.28 |
| 8 | 3.55 | 4.89 |
| 9 | 3.99 | 5.50 |
| 10 | 4.43 | 6.11 |
| 11 | 4.88 | 6.73 |
| 12 | 5.32 | 7.34 |
| 13 | 5.76 | 7.95 |

The optical reader 2000 further includes light source 2003 disposed to illuminate at least a portion of the field of view 1010 of the photoelectric conversion unit 1006. The light source 2003 may include a plurality of light sources 1022*a*, 1022*b* such as, for example a single or multiple LEDs. The plurality of light sources 1022*a*, 1022*b* are disposed about the image sensor 263. The additional light sources 1022*a*, 1022*b* are electrically connected to the illumination controller 1016. The additional light sources 1022*a*, 1022*b* may be electrically connected to the illumination controller 1016 by a flex strip (not shown). In one embodiment, the illumination controller operates the additional light sources in unison, i.e., the additional light sources 1022*a*, 1022*b* are turned on and off together and operatively function as a single illumination unit. Additionally, the light source 2003 may include light sources integrated into the photoelectric conversion unit 2002, such as, for example the LEDs 6318 of the imaging module 263.

In an alternative embodiment, the additional light sources are grouped into multiple operating units. The illumination controller 1016 turns the operational units on and off according to a desired schedule. For example, in order to reduce adverse effects of specular reflection along the receive axis and thereby improve the quality of the image captured, it may be desirable to place additional light sources 1022*a*, 1022*b* on either side of the imaging module 263 and then alternate turning on and off the additional light sources 1022*a*, 1022*b* on either side of the imaging module 263. For example, if the additional light sources 1022*a*, 1022*b* are disposed to the opposite sides of the imaging module 263, the illumination controller 1016 may cyclically activate the additional light sources 1022*a*, 1022*b* such that illumination is provided from one side and then another, with illumination being provided from each side for a predetermined period of time.

The period of time that each operational grouping of additional light sources 1022*a*, 1022*b*, is on and off depends on the capture rate and illumination requirements of the imaging module 263. In an alternative embodiment, light source 1014 integrated into the optical reader unit 1006 may include multiple light sources, these multiple light sources may be operated in a similar out of phase manner by the illumination controller 1016 in order to reduce adverse effects of specular reflection. If these multiple light sources are disposed on either side and are proximate to the additional light sources 1022*a*, 1022*b* the multiple light sources may be operated in phase with the additional light sources 1022*a*, 1022*b*.

In an alternative embodiment, multiple light sources are disposed in four groups A, B, C, D around the imaging module 263. The illumination controller 1016 will cyclically instruct each group to provide illumination.

The optical reader 2000 may also include an optical plate 6326 carrying aiming and illumination optics is disposed to receive light from the light source 1014 and the additional light sources 1022*a*, 102*b*. In one embodiment, the illumination optics of the optical plate 6326 include a plurality of optical elements for diffusing the light from the light source 1014 and directing at least a portion of the light from the light source 1014 onto a surface of the luminiferous shroud 1008. In one embodiment, the plurality of optical elements are prisms, such as, for example prisms disposed to align with the LEDs comprising the light source 1014, more specifically in one embodiment, as shown in one side of the prisms form a 4 degree angle respect to a surface of the optical plate 6326. As shown in FIG. 15, the optical plate 6326 may be integrally formed with luminiferous shroud 1008.

The luminiferous shroud 1008 extends outwardly from the photoelectric conversion unit 2002. The luminiferous shroud 1008 is made from a light transmissive material, such as for example a translucent plastic material. The walls of the luminiferous shroud 1008 are angled with respect to the imaging axis $a_i$ of the photoelectric conversion unit 2002 and are disposed to closely follow the perimeter of the field of view of the photoelectric conversion unit 2002. The luminiferous shroud 1008 includes an inner surface 1024. The inner surface 1024 is configured such that at least a portion of light incident thereto enters the walls of the luminiferous shroud 1008. In one embodiment, the inner surface 1024 is a textured molded plastic surface, such as for example a mold tech plastic surface. A textured inner surface 1024 prevents hotspots in the light axially exiting the luminiferous shroud 1008 and keeps the axial exiting light diffused. Diffused light not only makes it easier for the photoelectric conversion unit 2002 to capture an image but also enhances the safety of the device. In one embodiment, some of the light entering the inner surface 1024 of the luminiferous shroud 1008 exits the luminiferous shroud peripherally through the outer surface 1026 of the luminiferous shroud 1008.

A portion of the light entering the inner surface 1024 of the luminiferous shroud 1008 is confined by total internal reflection to propagate within the volume defined by the inner surface 1024 and the outer surface 1026 of the luminiferous shroud 1008. In effect, the volume defined by the inner surface 1024 and the outer surface 1026 of the luminiferous shroud 1008 is a two-dimensional waveguide. The confined light exits the end 1028 of the luminiferous shroud 1008. As shown in FIG. 16, the end 1028 of the luminiferous shroud 1008 includes a chamfer 1030. The chamfer 1030 serves to redirect a portion of the light propagating within the walls 1032 of the luminiferous shroud 1008, the redirected light peripherally exits the luminiferous shroud 1008 in a relatively narrow band proximate to the end 1028 of the luminiferous shroud 10008. As will be appreciated by those skilled in the optical arts, the size and orientation of the chamfer 1030 with respect to the thickness of the walls 1032 control how much of the light is dispersed peripherally through the outer surface 1026 of the luminiferous shroud 1008. Preferably, the chamfer 1030 is sized and oriented so that the light dispersed peripherally in the region proximate to the end 1028 of the shroud is of greater intensity than that dispersed peripherally from the remainder of the luminiferous shroud 1008. The differences in light intensity produce a "glowing ring" around the open end 1034 of the luminiferous shroud 1008. The light ray diagram of FIG. 17 is illustrative of this phenomenon.

In one embodiment, the inner and outer surfaces are parallel to one another and the end forms an angle $\alpha_1$ with the inner surface 1024 of about one hundred fifty-one (151) degrees, the chamfer 1030 forms an angle $\alpha_2$ with the inner surface 1024 of about one hundred thirty-seven (137)_degrees and the chamfer extends for a distance $d_{c1}$ of about 0.045 inches along the inner surface 1024 and for a distance of about $d_{c1}$ of about 0.038 inches along the end 1028 as measured from the intersection of the inner surface 1024 and the end 1028.

In an alternative embodiment, a photo-luminescent material is applied to a portion of the luminiferous shroud 1008 proximate to the end 1030 of the luminiferous shroud 1008. The photo-luminescent material reacts to the light being peripherally dispersed by the chamfer 1030 thereby increasing the visual acuity of the luminiferous shroud 1008.

The end 1028 of the luminiferous shroud 1008 may be perpendicular to the imaging axis $a_i$ of the optical reader unit 1006. Additionally, as shown in FIG. 18, the end 1030 of the luminiferous shroud 1008 may be inclined with respect to the imaging axis $a_i$ of the optical reader unit 1006. Inclining the end 1028 of the luminiferous shroud 1008 with respect to the imaging axis $a_i$ of the optical reader unit 1006 has the effect of reducing the adverse effects of specular reflection of parallel to the imaging axis $a_i$ of the optical reader unit 1006.

Additionally, the outer surface 1026 of the luminiferous shroud 1008 may be placarded with icons or instructional text of a combination thereof as shown in FIG. 19 to instruct the user where to place the item to be scanned. The placards may be decals applied to the outer surface 1026 of may be molded into the outer surface 1026.

In an alternative embodiment, the luminiferous shroud 1008 includes opaque regions (not shown). Such as for example, having an outer surface 1026 that is opaque except for a region proximate to the open end of the luminiferous shroud 1008, thereby providing a "glowing ring" effect. Regions of the luminiferous shroud 1008 may be made opaque by applying paint, a shield, a shielding agent, covering with a pliable material, increasing the surface roughness or by a double shot molding process.

In an alternative embodiment, the optical reader 2000 includes light sources (not shown) that are optically coupled into the luminiferous shroud 1008. The light sources optically coupled into the luminiferous shroud 1008 provide the optical energy dispersed by the luminiferous shroud 1008.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A transaction terminal comprising:

a housing;

a display;

a reader, said reader configured to read data from a removable data carrier;

an optical reader unit, said optical reader unit having an imaging axis and a field of view that varies with distance along the imaging axis;

an illumination unit disposed to illuminate at least a portion of the field of view of said optical reader unit; and a luminiferous shroud extending outwardly from said optical reader unit, said luminiferous shroud disposed perimeterly around the field of view of said optical reader unit, said luminiferous shroud allowing a portion of the incident light emitted from said illumination unit to be transmitted through said luminiferous shroud and dispersed in peripheral directions, said luminiferous shroud having a first end and a second end.

2. The transaction terminal of claim 1, wherein said luminiferous shroud is made of plastic.

3. The transaction terminal of claim 1, wherein said illumination unit includes a plurality of light sources.

4. The transaction terminal of claim 1, wherein said luminiferous shroud includes a textured inner surface.

5. The transaction terminal of claim 4, wherein said optical reader unit includes a scanning laser.

6. The transaction terminal of claim 4, wherein said optical reader unit includes an image sensor.

7. The transaction terminal of claim 4, wherein said illumination unit includes a plurality of light sources.

8. The transaction terminal of claim 7, wherein said plurality of light sources includes at least one light emitting diode.

9. The transaction terminal of claim 1, wherein said illumination unit includes a light diffusing optical element.

10. The transaction terminal of claim 9 where said light diffusing optical element includes a lens.

11. The transaction terminal of claim 9, where said light diffusing optical element includes a prism.

12. An optical reader comprising:

a luminiferous shroud including a first end and a second end;

a photoelectric conversion unit adapted to read an image, said photoelectric conversion unit disposed proximate to said first end of said luminiferous shroud, said photoelectric conversion unit having a field of view; and a light source disposed proximate to said first end, said light source providing light of a predetermined intensity and energy density;

wherein said luminiferous shroud is disposed perimeterly around the field of view of said photoelectric conversion unit;

wherein said luminiferous shroud includes a partially reflective inner surface;

wherein said partially reflective inner surface reflects a portion of the light incident thereon; and wherein said partially reflective inner surface allows a portion of the light incident thereto to be transmitted through said luminiferous shroud and dispersed in peripheral directions.

13. The optical reader of claim 12, wherein said partially reflective inner surface includes a textured region.

14. The optical reader of claim 12, further including an optical element disposed proximate to said light source, wherein said optical element directs at least a portion of the light emitted from said light source onto said partially reflective inner surface.

15. The optical reader of claim 14, wherein said light source includes a plurality of light emitting diodes.

16. The optical reader of claim 15, wherein said optical element includes a plurality of lenses, each of said plurality of lenses disposed proximate to at least one of said plurality of light emitting diodes.

17. The optical reader of claim 15, wherein said plurality of light emitting diodes are disposed about said photoelectric conversion element.

18. The optical reader of claim 17, further including a control circuit coupled to said plurality of light emitting diodes said control circuit selectively turning on and off at least one of said plurality of light emitting diodes according to a predetermined schedule thereby reducing the adverse effects of specular reflection from a target object as seen by the imager.

19. The optical reader of claim 12, wherein the photoelectric conversion unit includes a laser sweeping across a target object.

20. The optical reader of claim 12, wherein the photoelectric conversion unit includes an image sensor.

21. The optical reader of claim 20, wherein the image sensor includes a linear array of photodetectors.

22. The optical reader of claim 20, wherein said image sensor includes a two-dimensional array of photodetectors.

23. The optical reader of claim 12, wherein said partially reflective inner surface is disposed proximate to the boundaries of the field of view of said photoelectric conversion unit.

24. The optical reader of claim 23, wherein said luminiferous shroud is configured such that the intensity of light dispersed in peripheral directions is greater in intensity in a region proximate to a second end of said luminiferous shroud.

25. The optical reader of claim 12, wherein said second end of said luminiferous shroud is disposed a predetermined distance from said photoelectric conversion unit.

26. The optical reader of claim 25, wherein said predetermined distance is at least great enough to allow said photoelectric conversion unit to capture an image of an object placed against said second end.

27. The optical reader of claim 12, further including a user interface.

28. The optical reader of claim 27, further including control circuitry in communication with said user interface and said photoelectric conversion unit.

29. The optical reader of claim 28, wherein said user interface includes a touch screen.

30. The optical reader of claim 27, further including a card reader, said card reader configured to extract data from at least one of a magnetic stripe and smart card data.

31. The optical reader of claim 12, wherein said photoelectric conversion unit includes a plurality of photodetector arrays.

32. The optical reader of claim 31, wherein each of said plurality of photodetector arrays captures an image at a different time.

33. The optical reader of claim 12, wherein said photoelectric conversion unit further includes an imaging axis, wherein the second end of said luminiferous shroud is inclined with respect to said imaging axis.

34. An optical reader comprising:

a shroud, said shroud including:

a partially reflective inner surface; and an outer surface, said outer surface including opaque regions and light dispersing regions;

a photoelectric conversion unit adapted to read an image, said photoelectric conversion unit disposed proximate to a first end of said shroud, said photoelectric conversion unit having a field of view; and a light source disposed proximate to said first end, said light source providing light of a predetermined intensity and energy density;

wherein said shroud is disposed perimeterly around the field of view of said photoelectric conversion unit;

wherein said partially reflective inner surface reflects a portion of the light incident thereon;

wherein said partially reflective inner surface allows a portion of the light incident thereto to be dispersed in peripheral directions through said light dispersing regions.

35. A transaction terminal comprising:

a motherboard;

a display coupled to said motherboard;

a removable data carrier reader coupled to said motherboard;

an optical reader coupled to said motherboard, said optical reader having a field of view;

a user interface coupled to said motherboard; and a shroud disposed proximate to said optical reader, said shroud emitting light.

36. The transaction terminal of claim 35, wherein said shroud includes:

an inner surface;

a first end disposed proximate to said optical reader; and a second end;

wherein said inner surface allows at least a portion of the light incident thereto to propagate through said shroud and be dispersed in peripheral directions;

wherein a portion of the light propagating through said shroud is confined to propagate to said second end where the light exits said second end; and wherein the light exiting said second end is dispersed peripherally; and wherein light dispersed peripherally from said second end has a greater intensity than light dispersed peripherally from the remainder of said shroud.

37. The transaction terminal of claim 36, wherein said inner surface is a partially reflective surface.

38. The transaction terminal of claim 37, wherein said inner surface includes a textured region.

39. The transaction terminal of claim 36, wherein said shroud is made from a plastic material.

40. The transaction terminal of claim 39, wherein at least a portion of said plastic material is a translucent plastic material.

41. The transaction terminal of claim 40, wherein said translucent plastic includes a filler material for enhancing the light scattering properties of said translucent plastic.

42. The transaction terminal of claim 36, wherein said removable data carrier reader is configured to read a magnetic stripe card.

43. The transaction terminal of claim 36, wherein said removable data carrier reader is configured to read a smart card.

44. The transaction terminal of claim 36, wherein said removable data carrier reader is configured to read a non-contact data carrying object.

45. The transaction terminal of claim 36, wherein said removable data carrier reader is configured to read an RE ID object.

46. The transaction terminal of claim 36, wherein said user interface includes a touch pad.

47. The transaction terminal of claim 36, wherein said user interface includes a keypad.

48. The transaction terminal of claim 36, wherein said display is an LCD display.

49. The transaction terminal of claim 36, further including a biometric reader.

50. The transaction terminal of claim 36, wherein said optical reader includes:

a photoelectric conversion unit adapted to read an image, said photoelectric conversion unit disposed proximate to said first end of said shroud, said photoelectric conversion unit having a field of view; and a light source disposed proximate to said first end, said light source providing light of a predetermined intensity.

51. The transaction terminal of claim 50, further including:

a digital signal processing module coupled to said photoelectric conversion unit; and an illumination controller coupled to said light source.

52. The transaction terminal of claim 51, wherein said light source includes a first light source and a second light source disposed apart from one another.

53. The transaction terminal of claim 52, wherein said illumination controller selectively tums on and off said first light source and said second light source.

54. The transaction terminal of claim 53, wherein said illumination controller cyclically tums on said first light source, tums off said first light source, tums on said second light source and tums off said second light source.

55. The transaction terminal of claim 53, wherein said first light source includes at least one light emitting diode.

56. The transaction terminal of claim 55, wherein said second light source includes at least one light emitting diode.

57. The transaction terminal of claim 53, wherein said second light source includes at least one light emitting diode.

58. The transaction terminal of claim 53, wherein said first light source includes a plurality of light emitting diodes.

59. The transaction terminal of claim 58, wherein said second light source includes a plurality of light emitting diodes.

60. The transaction terminal of claim 53, wherein said second light source includes a plurality of light emitting diodes.

61. The transaction terminal of claim 52, wherein said first light source includes at least one light emitting diode.

62. The transaction terminal of claim 52, wherein said second light source includes at least one light emitting diode.

63. The transaction terminal of claim 51, wherein said photoelectric conversion unit includes an imaging module.

64. The transaction terminal of claim 63, wherein said imaging module includes a two dimensional array of photodetectors.

65. The transaction terminal of claim 51, wherein said photoelectric conversion unit includes a linear array of photodetectors.

66. The transaction terminal of claim 51, wherein said photoelectric conversion unit includes a laser sweeping scan engine.

67. The transaction terminal of claim 51, wherein said photoelectric conversion unit includes a plurality of image sensors.

68. The transaction terminal of claim 67, wherein said plurality of image sensors includes a near field imager and a far field imager.

69. The transaction terminal of claim 50, wherein said shroud is a luminiferous shroud, said luminiferous shroud extending outwardly from said optical reader unit, said luminiferous shroud disposed perimeterly around the field of view of said optical reader unit, said luminiferous shroud allowing a portion of the incident light emitted from said illumination unit to be transmitted through said luminiferous shroud and dispersed in peripheral directions.

70. The transaction terminal of claim 69, further including a light diffusing optical element disposed proximate to said first end of said luminiferous shroud and optically coupled to said light source.

71. The transaction terminal of claim 70, where said light diffusing optical element includes a lens.

72. The transaction terminal of claim 70, where said light diffusing optical element includes a prism.

* * * * *